United States Patent [19]
Van De Veen

[11] Patent Number: 5,943,643
[45] Date of Patent: Aug. 24, 1999

[54] LANGUAGE PROCESSING METHOD AND APPARATUS

[75] Inventor: Evelyn Van De Veen, London, United Kingdom

[73] Assignee: Canon Kabushiki Kaisha, Tokyo, Japan

[21] Appl. No.: 08/566,170

[22] Filed: Dec. 1, 1995

[30] Foreign Application Priority Data

Apr. 13, 1995 [GB] United Kingdom .................. 9507774

[51] Int. Cl.⁶ ........................................... G06F 15/38
[52] U.S. Cl. ................................. 704/2; 704/9
[58] Field of Search ..................... 704/1, 2, 4, 7, 704/9

[56] References Cited

U.S. PATENT DOCUMENTS

| 5,101,349 | 3/1992 | Tokuume et al. ........................... 704/1 |
| 5,289,375 | 2/1994 | Fukumochi et al. ........................ 704/2 |
| 5,299,124 | 3/1994 | Fukumochi et al. ........................ 704/2 |
| 5,321,607 | 6/1994 | Fukumochi et al. ........................ 704/4 |
| 5,386,556 | 1/1995 | Hedin et al. ................................ 704/9 |
| 5,587,902 | 12/1996 | Kugimiya .................................... 704/2 |
| 5,640,575 | 6/1997 | Maruyama et al. ......................... 704/2 |
| 5,644,774 | 7/1997 | Fukumochi et al. ........................ 702/2 |

FOREIGN PATENT DOCUMENTS

| 0381288 | 8/1990 | European Pat. Off. ........ G06F 15/38 |
| 0473864 | 3/1992 | European Pat. Off. ........ G06F 15/38 |
| 0590332 | 4/1994 | European Pat. Off. ........ G06F 15/38 |

OTHER PUBLICATIONS

IBM Technical Disclosure Bulletin, vol. 28, No. 12, May (1986) pp. 5284–5286 "Interactive Author–Assistance Tool".

IBM Technical Disclosure Bulletin, vol. 31, No. 5, Oct. (1988) pp. 407–408 "Structured Universal Natural–Language Generator for Sophisticated Target–Language Generation in Machine Translation Systems".

Patent Abstracts of Japan, vol. 17, No. 311 (P–1556) published Jun. 14, 1993, Abstract of Japanese Patent No. 05–028185.

Primary Examiner—Forester W. Isen
Assistant Examiner—Patrick N. Edouard
Attorney, Agent, or Firm—Fitzpatrick, Cella, Harper & Scinto

[57] ABSTRACT

A data processing apparatus for generating from a plurality of data units corresponding to a string of elements of a first language, a string of elements of a second language representative of the meaning of the string of elements of the first language. Each data unit is indicative of the meaning of a corresponding element of the first language and includes one or more identifiers related to one or more identifiers of one or more other data units. The generator includes an instructor for storing processing instructions dependent on grammatical rules of the second language, and a processor for providing the elements of the second language in dependence upon the meaning indicated by the data units. The processor also orders the elements in the string of elements in the second language in dependence upon the meaning indicated by the data units, upon the related identifiers and upon the instructions stored in the instructor.

27 Claims, 35 Drawing Sheets

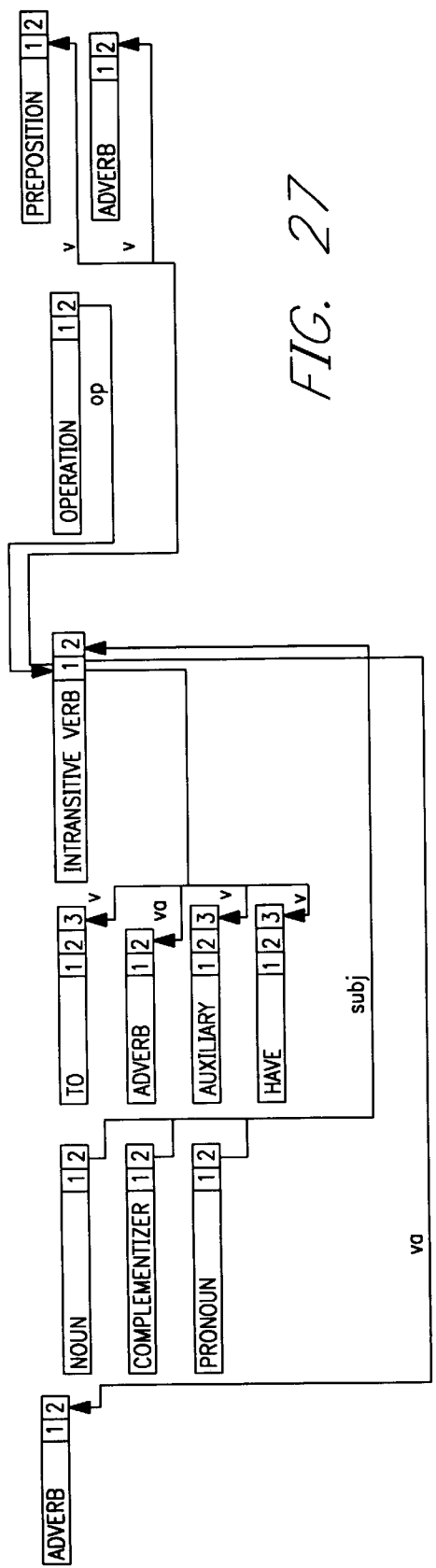
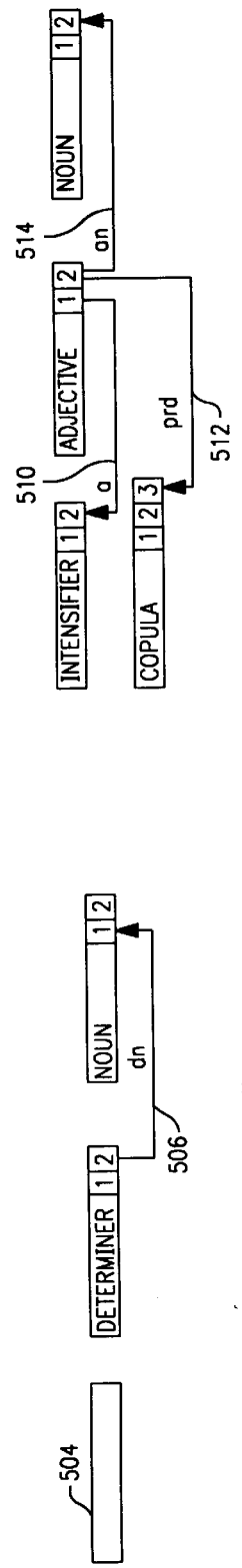
FIG. 27
FIG. 28
FIG. 29

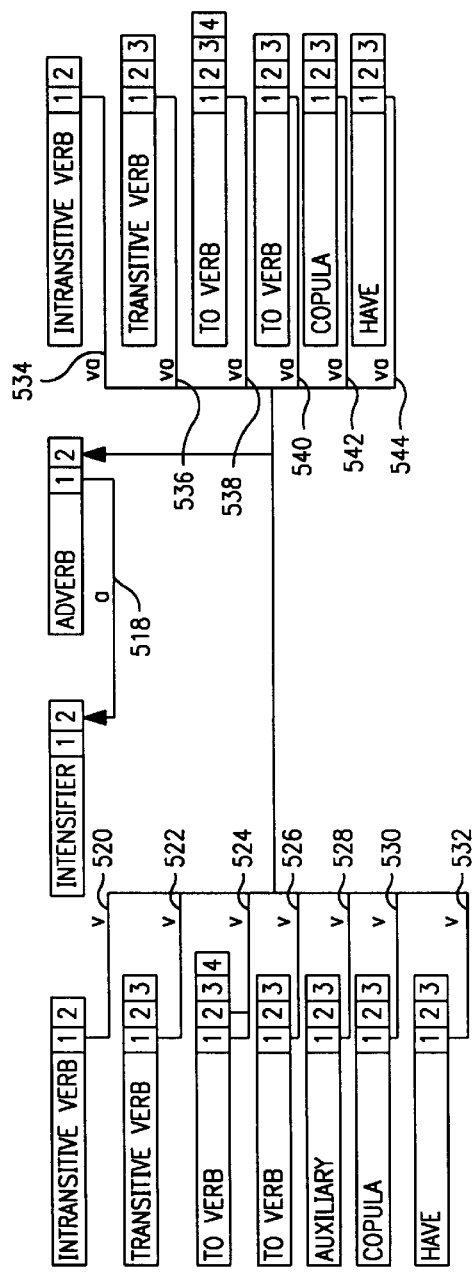
FIG. 30
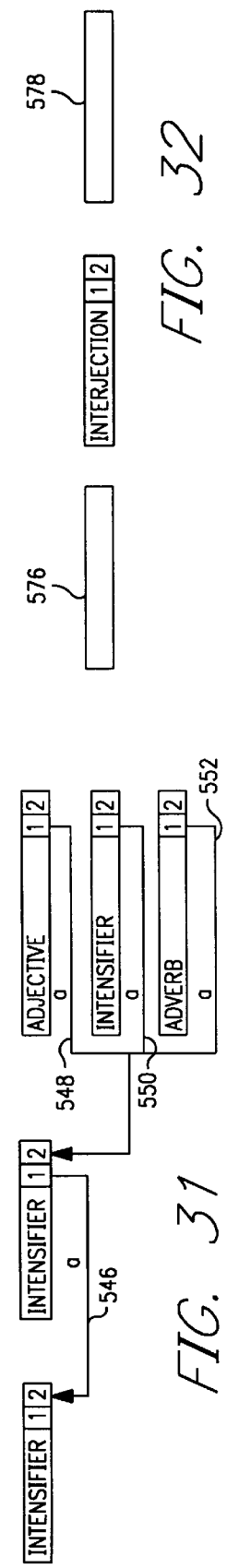
FIG. 31
FIG. 32

FIG. 41(a)
FIG. 41(b)
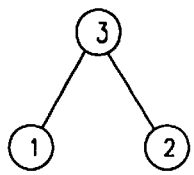
FIG. 41(c)
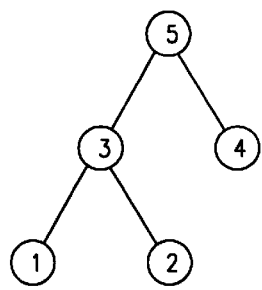
FIG. 41(d)
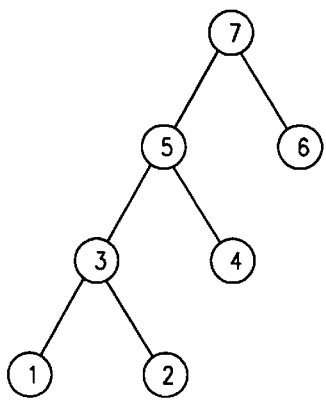
FIG. 41(e)
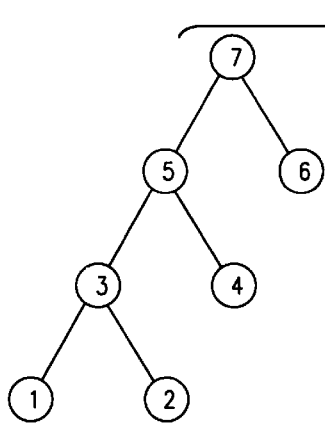
FIG. 41(f)(i)
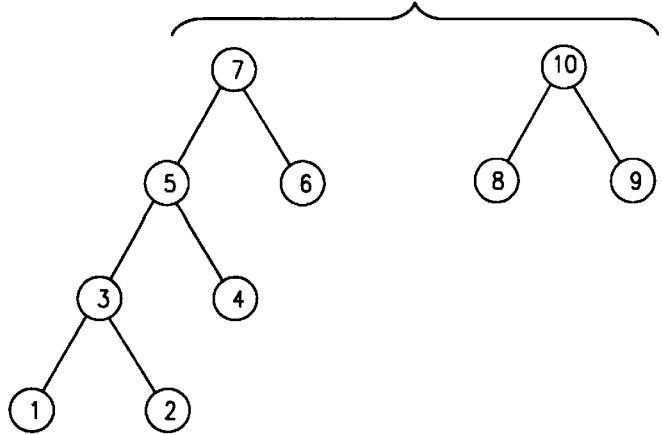

FIG. 41(f)(ii)
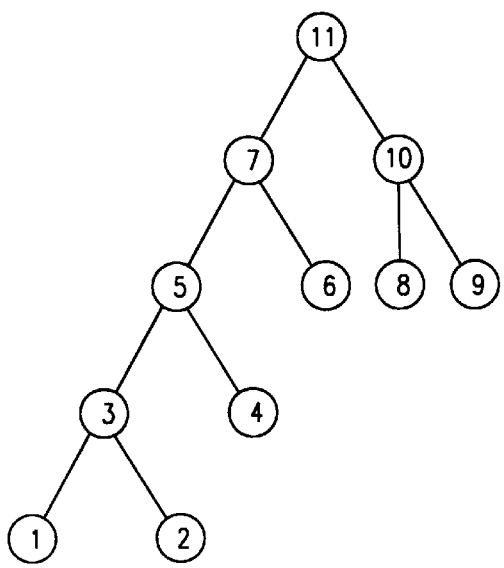
FIG. 41(g)
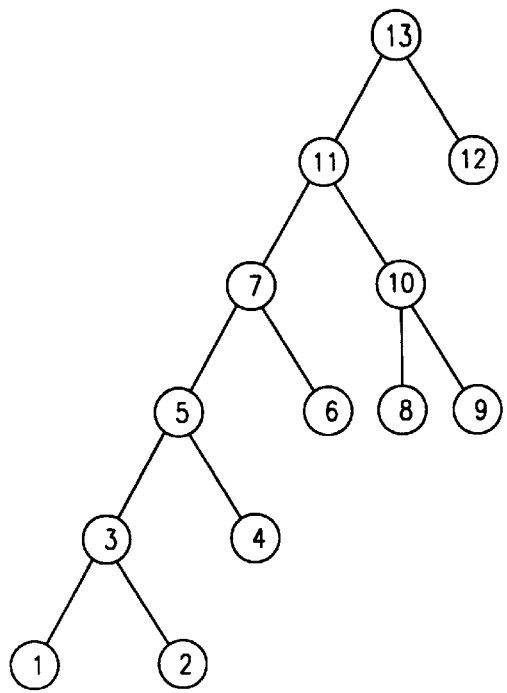
FIG. 41(h)
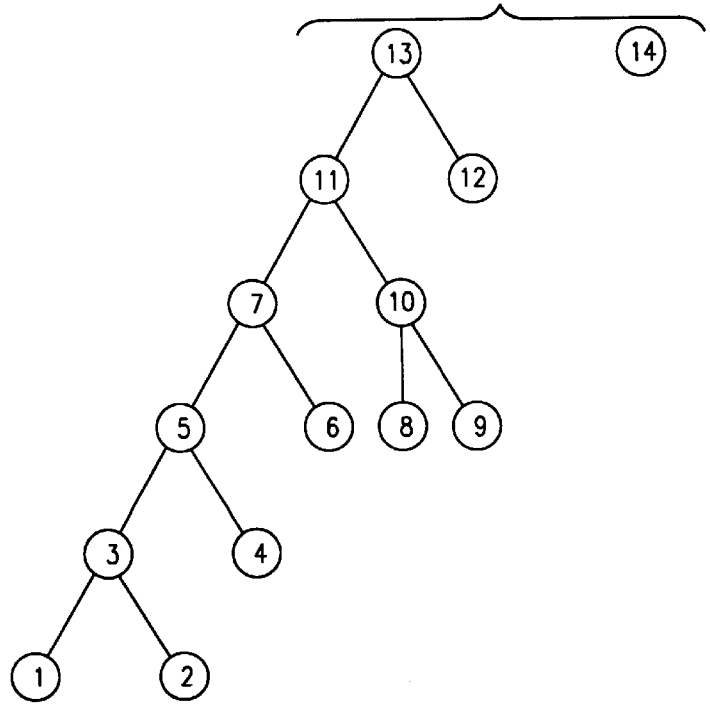

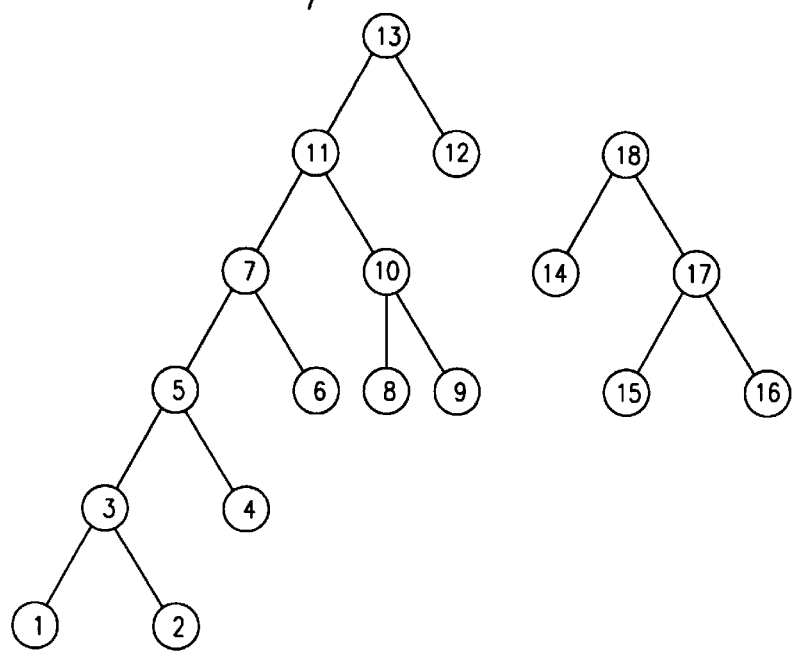
FIG. 41(j)(ii)
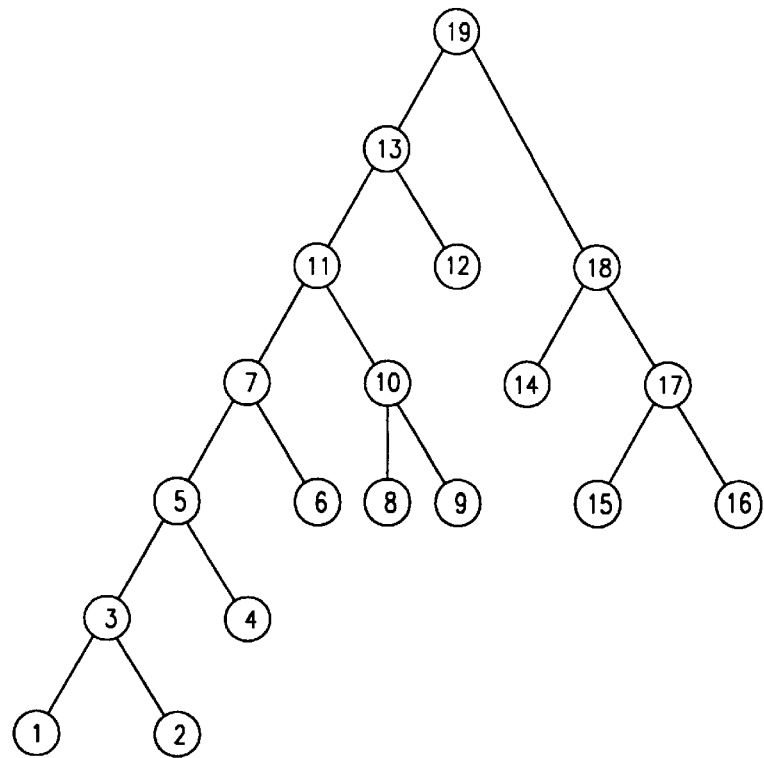
FIG. 41(j)(iii)

FIG. 42(a)
①
FIG. 42(b)
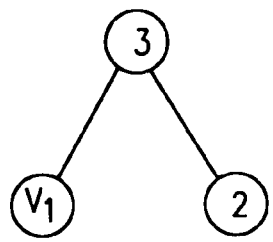
FIG. 42(c)
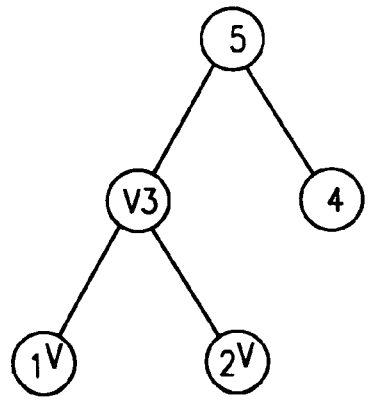

FIG. 43(a)

(i) ①ᵛ CAMERA (ii) ③ᴿ — ② THE — ①ᵛ CAMERA

FIG. 43(b)

(i) ①ᵛ THE   ②ᵛ QUICKLY (ii) ④ᴿ — ①ᵛ THE — ② SWITCH     ②ᵛ QUICKLY

FIG. 43(c)

(i) ①ᵛ THE   ②ᵛ IN (ii) ①ᵛ THE    ④ — ②ᵛ IN — ③ BASEMENT (iii) ④ᴿ — ② IN — ⑤ — ①ᵛ THE — ③ BASEMENT

FIG. 43(d)

(i) ③ᵛ — ①ᵛ SWITCH — ②ᵛ QUICKLY     ④ᵛ THE (ii) ③ᵛᴿ — ⑦ — ①ᵛ SWITCH — ⑥ — ④ᵛ THE — ⑤ LIGHT     ②ᵛ QUICKLY

FIG. 43(e)
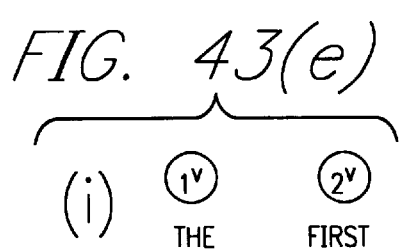
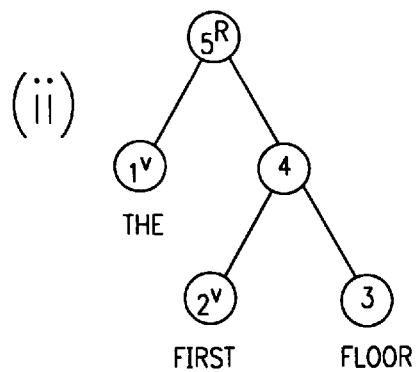
FIG. 43(f)
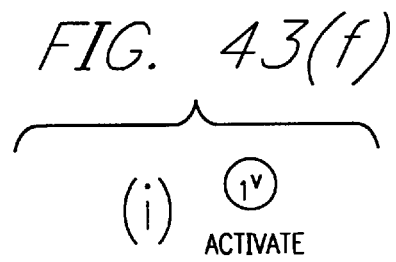
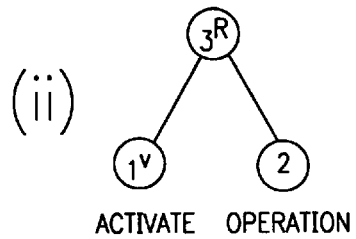
FIG. 43(g)
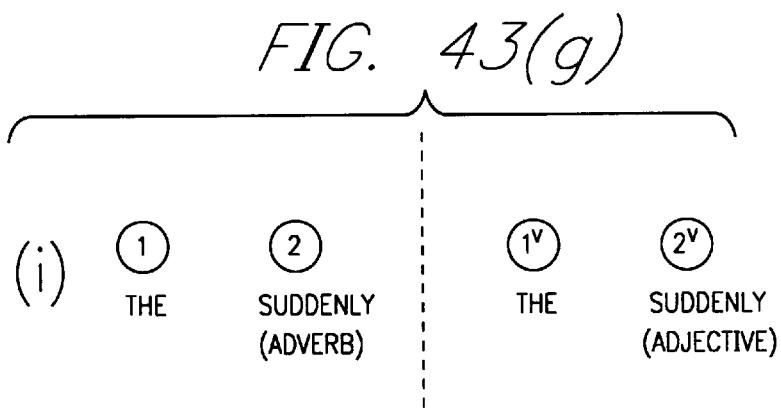
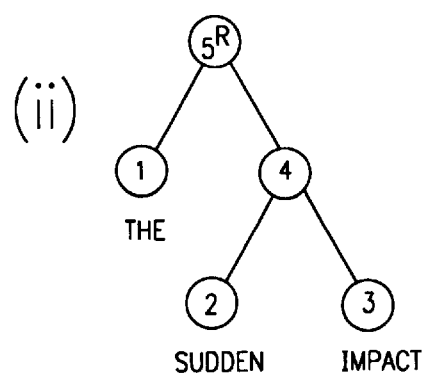

LANGUAGE PROCESSING METHOD AND APPARATUS

This invention relates to a method and apparatus for language processing. The invention is particularly but not exclusively applicable for converting input from a form in which the meaning of groups of words or other elements of an input language is represented, especially a natural language, to output in a form representing individual words or other elements of an output language, which may be a natural language.

DESCRIPTION OF THE BACKGROUND ART

Although computer systems are currently in commercial use in a wide variety of different applications, such as for controlling industrial processes or for information storage for retrieval as in the creation and searching of databases, and network communications, many current systems provide output in a form dictated by the system itself rather than in the language of the user. Similarly current systems may also require instructions and information to be input in a form which is again dictated by the system itself rather than the language of the user.

A prerequisite for a computer system which can process natural language as output and/or input is an efficient language processing method for converting a representation of the meaning of an output in a natural language to an output in that language, and preferably an efficient processing method for converting input in the input language into a representation of the meaning thereof. Although considerable research has been carried out in this area, the prior art has proposed systems known as language interfaces which have failed to meet the above indicated requirements.

SUMMARY OF THE INVENTION

An object of the invention is to provide an efficient language processing method and apparatus which is particularly but not exclusively suitable for the above indicated purposes.

In one aspect the invention provides a method and apparatus for generating a string of elements in an output language in response to a plurality of data units which are indicative of meaning and which include identifiers related to identifiers of other said data units.

In another aspect, the invention provides a method and apparatus for generating a string of elements in an output language in which, in response to input data indicative of meaning, nodes are created containing search codes dependent upon lexical categories of elements of the output language, and the ordering of the elements of the output language is established by searching said nodes utilising said search codes and in dependence upon identifiers or pointers contained in said data.

The invention is useful, for example, for translating from one natural language to another or for generating an output language in response to data representative of meaning obtained from some data source such as a database or obtained from some processing operation.

Although the invention has wide application, a single embodiment of the invention will be described while illustrating the manner in which the invention may be put into practice. It should be understood, however, that the invention is applicable to more complex systems.

The invention is described further by way of example with reference to the accompanying drawings, in which:

BRIEF DESCRIPTION OF THE DRAWINGS

FIGS. 3 to 20 are diagrams to assist the understanding of the processing, in the preferred embodiment of the invention, of signals derived from words of a number of different categories;

FIGS. 21 to 39 are diagrams to assist the understanding of the processing, in the preferred embodiment of the invention, of words derived from signals of a number of different categories;

FIGS. 40 to 43 are diagrams to assist the understanding of the processing, in the preferred embodiment of the invention, of particular examples of input.

OVERVIEW OF THE EMBODIMENT

Figure 1:
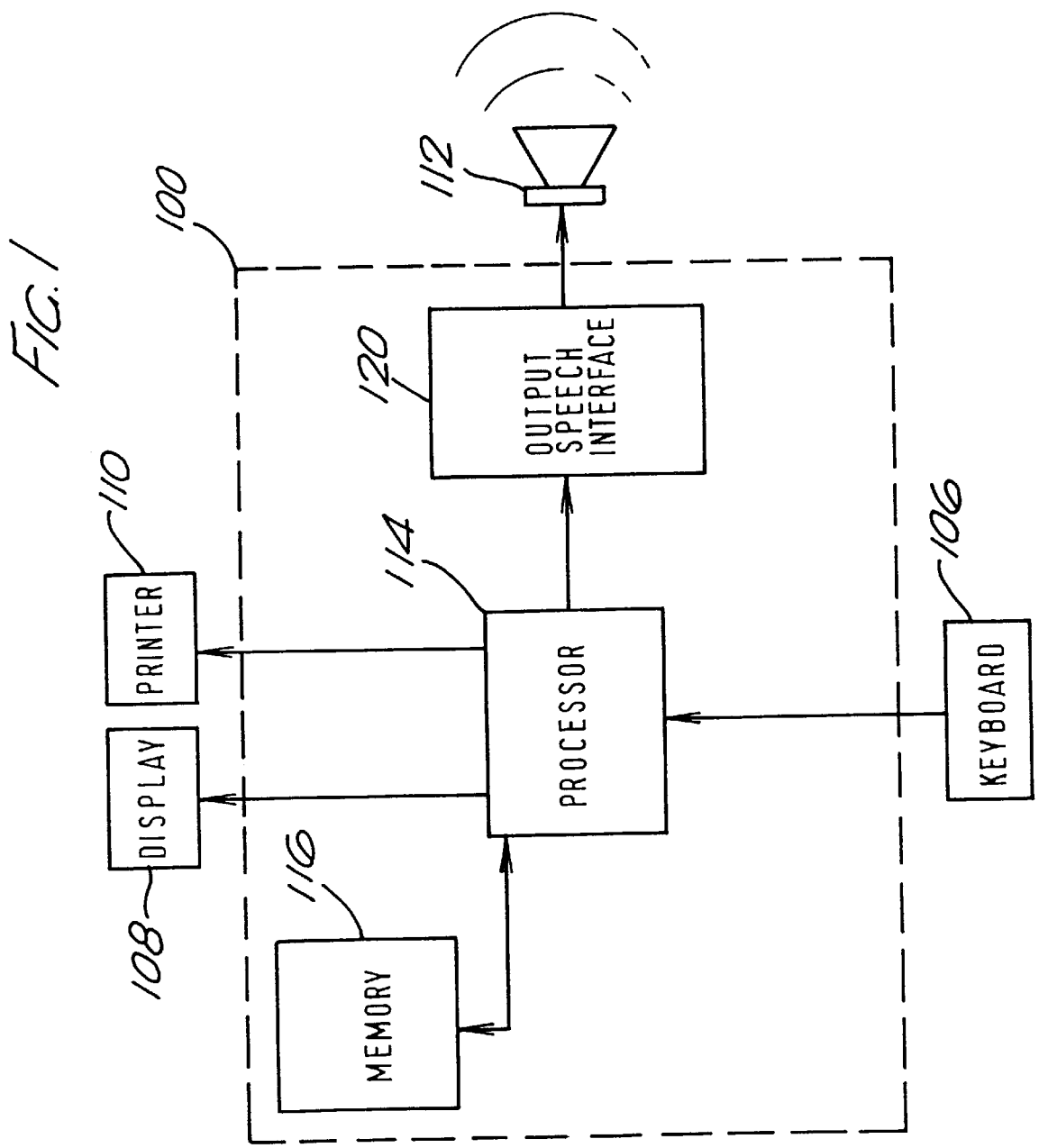
FIG. 1 is a block diagram of an apparatus for translating from one natural language to another natural language and which incorporates a preferred embodiment of the invention.

The apparatus of FIG. 1 comprises a computer system 100 connected to a keyboard 106 for inputting data or commands to the computer system 100. The computer system 100 is also connected to a display (VDU) 108, a printer 110 and a loudspeaker 112 for providing output from the system in visual and audio form respectively.

The computer system 100 comprises a processor 114, memory 116 which stores programmes and data for the operation of the system and provides working memory space and an output speech interface 120 for converting the output from the processor in the form of text into an electrical signal representing speech for supply to the loudspeaker 112.

The computer system 100 is arranged so that the operator of the system may input, to the keyboard 116 in a natural language, which in this embodiment is English. The memory 116 stores data and programs causing the processor 114 to process the signals which are derived from the keyboard 106 and which represent the input natural language, to produce output which represents the meaning of the input natural language in an output natural language for displaying in text form on either the display 108 or the printer 110 or, alternatively, supply to the output speech interface 120.

In the processing of input language from the keyboard 106, the computer system 100 carries out the following two basic processes:

1) In the first process, the parsing process, a set of signals is produced which is dependent, firstly, on the words which are input and, secondly, upon the relationships or links which may exist between them having regard to the grammar of the input language used. This set of signals is also dependent upon any ambiguities which may arise in the input words, as a result of which the input words may have different possible interpretations. The computer system 100 operates, at this point, to produce a representation of the meaning of the input language having established a relationship, or a link between words in the input sentence.

2) In the second process, the generating and verbalising process, the representation of the meaning which was obtained by the first process is then processed with respect to an output language lexicon and output language grammar which define the words and word order appropriate for conveying the meaning represented by the meaning representation in the output language.

Figure 2:
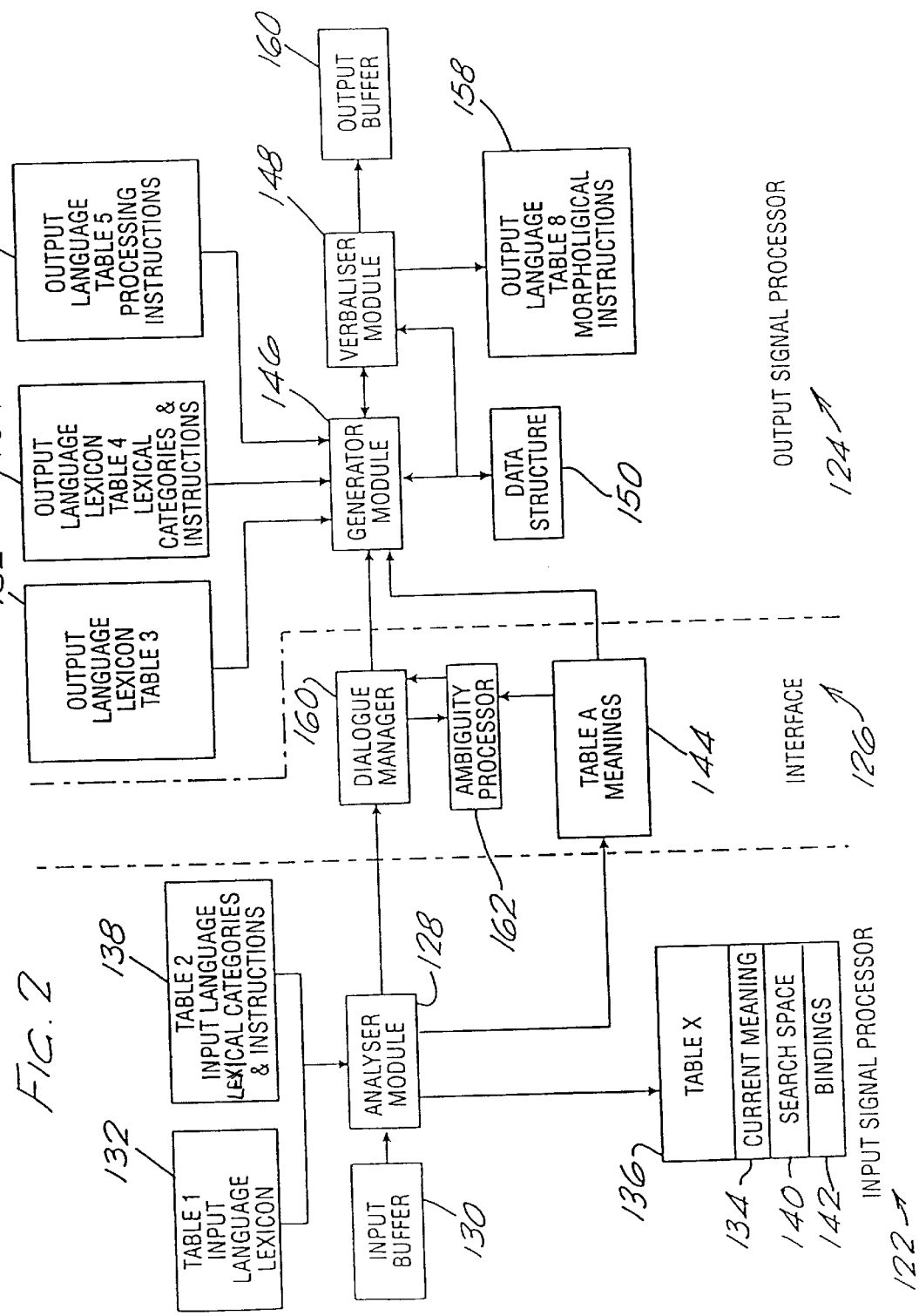
FIG. 2 is a diagram illustrating in block form the contents of a computer memory included in the system of FIG. 1 for processing of words or other units from the input natural language to provide output representative of the meaning thereof and to generate therefrom words or other units in an output natural language.

FIG. 2 represents in block form program modules and data structures in the form of tables which are provided in memory 116 for performing the above two processes. These are divided in FIG. 2 into an input signal processor 122 which performs the first process, an output signal processor 124 which performs the second process and an interface section 126 for interfacing between the input signal processor 122 and the output signal processor 124. The input signal processor 122 and the interface 126 will be described first. Thereafter, the output signal processor 124 will be described.

Input Signal Processor 122

The input signal processor 122 comprises an analyser program module 128 which obtains each incoming word in turn from an input buffer 130 and, upon obtaining each such word, first refers to a look-up table 132 herein termed an input language lexicon. The input language lexicon 132 contains a list of all the words which may be processed upon input via the keyboard 116 and defines the grammatical categories of those words i.e. whether they are nouns, prepositions, transitive verbs etc. In this embodiment although the input language lexicon may only contain relatively few words and may only utilize words in a few categories, the input signal processor 122 is preferably arranged as a general purpose system which can be used in many different applications. For this purpose, the input language lexicon 132 is preferably structured for containing words of the following categories:

Nouns,

Prepositions,

Auxiliary verbs,

Negation,

Transitive verbs,

Intransitive verbs,

Determiners,

Adjectives,

Adverbs,

Intensifiers,

"to" (the infinitival particle),

Copulas,

Pronouns,

Interjections, and the verbs "have", "promise" and "persuade" as categories in themselves.

The above categories will be adequate for many applications. However, other categories of words may be provided for if desired.

In addition to containing an indication of the categories of input words which may be processed, the input language lexicon 132 contains a representation of the meaning of each of the input words. Each representation is in the form of a predicate with one or more arguments, the number of arguments provided being dependent upon the category of the input word.

By way of example, the contents of input language lexicon 132 may be as set out below in Table 1.

TABLE 1

| INPUT WORD | INPUT WORD CATEGORY | MEANING |
| --- | --- | --- |
| arrive | intransitive verb | arrive(1,2) |
| bark | intransitive verb | bark(1,2) |
| die | intransitive verb | die(1,2) |
| disappear | intransitive verb | disappear(1,2) |
| duck | intransitive verb | ducking(1,2) |
| go | intransitive verb | go(1,2) |
| hear | intransitive verb | hear(1,2) |
| jump | intransitive verb | jump(1,2) |
| laugh | intransitive verb | laugh(1,2) |
| look | intransitive verb | look(1,2) |
| roar | intransitive verb | roar(1,2) |
| ran | intransitive verb | run(1,2) past(_,1) |
| run | intransitive verb | run(1,2) perf(_,1) |
| run | intransitive verb | run(1,2) |
| walk | intransitive verb | walk(1,2) |
| yawn | intransitive verb | yawn(1,2) |
| activate | transitive verb | activate(1,2,3) |
| activated | transitive verb | activate(1,2,3) past(_,1) |
| change | transitive verb | change(1,2,3) |
| close | transitive verb | close(1,2,3) |
| cut | transitive verb | cut(1,2,3) |
| deactivate | transitive verb | deactivate(1,2,3) |
| extinguish | transitive verb | extinguish(1,2,3) |
| illuminate | transitive verb | illuminate(1,2,3) |
| lock | transitive verb | lock(1,2,3) |
| secure | transitive verb | secure(1,2,3) |
| see | transitive verb | see(1,2,3) |
| saw | transitive verb | see(1,2,3) past(_,1) |
| seen | transitive verb | see(1,2,3) perf(_,1) |
| show | transitive verb | show(1,2,3) |
| turn | transitive verb | turn(1,2,3) |
| unlock | transitive verb | unlock(1,2,3) |
| can | auxiliary | can(1,2,3) |
| will | auxiliary | will(1,2,3) |
| would | auxiliary | would(1,2,3) |
| be | copula | copula(1,2,3) |
| persuade | persuade | persuade(1,2,3,4) |
| promise | promise | promise(1,2,3,4) |
| to | to | comp(1,2,3) |
| very | intensifier | very(1,2) |
| blue | adjective | blue(1,2) |
| first | adjective | first(1,2) |
| infrared | adjective | infrared(1,2) |
| main | adjective | main(1,2) |
| new | adjective | new(1,2) |
| red | adjective | red(1,2) |
| second | adjective | second(1,2) |
| small | adjective | small(1,2) |
| sudden | adjective | sudden(1,2) |
| third | adjective | third(1,2) |
| suddenly | adverb | sudden(1,2) |
| afternoon | noun | afternoon(1,2) |
| alarm | noun | alarm(1,2) |
| basement | noun | basement(1,2) |
| basements | noun | basement(1,2) several(_,1) |
| camera | noun | camera(1,2) |
| cameras | noun | camera(1,2) several(_,1) |
| female | noun | female(1,2) |
| floor | noun | floor(1,2) |
| floors | noun | floor(1,2) several(_,1) |
| guard | noun | guard(1,2) |
| historian | noun | historian(1,2) |
| light | noun | light(1,2) |
| machine | noun | machine(1,2) |
| male | noun | male(1,2) |
| midnight | noun | midnight(1,2) |
| morning | noun | morning(1,2) |
| noon | noun | noon(1,2) |
| octopus | noun | octopus(1,2) |

TABLE 1-continued

| INPUT WORD | INPUT WORD CATEGORY | MEANING |
|---|---|---|
| owl | noun | owl(1,2) |
| ox | noun | ox(1,2) |
| person | noun | person(1,2) |
| sensor | noun | sensor(1,2) |
| sensors | noun | sensor(1,2) |
|  |  | several(_,1) |
| situation | noun | situation(1,2) |
| state | noun | state(1,2) |
| video | noun | video(1,2) |
| videos | noun | video(1,2) |
|  |  | several(_,1) |
| at | preposition | at(1,2,3) |
| by | preposition | by(1,2,3) |
| for | preposition | for(1,2,3) |
| in | preposition | in(1,2,3) |
| near | preposition | near(1,2,3) |
| of | preposition | of(1,2,3) |
| on | preposition | on(1,2,3) |
| with | preposition | with(1,2,3) |
| not | negation | NEG(1,2) |
| have | have | have(1,2,3) |
| a | determiner | a(1,2) |
| an | determiner | a(1,2) |
| the | determiner | the(1,2) |
| it | pronoun | entity(1,2) |
|  |  | the(_,1) |
| she | pronoun | female(1,2) |
|  |  | the(_,1) |
| he | pronoun | male(1,2) |
|  |  | the(_,1) |
| something | noun | something(1,2) |
| everything | noun | everything(1,2) |
| hi | interjection | hi(1,2) |
| hello | interjection | hello(1,2) |
| that | complementizer | entity_relation(1,2) |

It will be evident from inspection of the above Table 1 that the left hand column contains a list of the words which, when input through the keyboard 116, may be processed by the system 100, the middle column contains the category of each word and the right hand column contains the meanings of the input words. It will be noted that although the vocabulary of the input language lexicon is relatively small, it nevertheless contains a variety of words which are not necessarily directed to a specific application of the system. The purpose of including a variety of words applicable to different applications is to illustrate the generality of the system according to the present invention. Thus, it is possible, in accordance with the invention, to provide if convenient a large vocabulary in the input language lexicon so that a particular embodiment of the invention may be used in a number of different applications, each of which might use a different part of the common vocabulary.

The output signal processor 124 is arranged to recognise the representations of meaning which are contained in the third column of the input language lexicon. Although the names of the predicates of some of the representations of meaning in Table 1 are the same as the corresponding input words themselves, it is not essential but is merely for convenience of description. It should thus be understood that any convenient representations of meanings may be used in practice.

The English language includes a number of further word categories in addition to those as indicated above. Other embodiments may use only some of the above categories or may use more categories than the above as already indicated.

As each input word is obtained by the analyser module 128 from the input buffer 130, the analyzer module 128 searches the words shown in the left hand column of Table 1 for the same word and, when this is found, obtains the corresponding meaning shown in the third column of Table 1, assigns unique values to the arguments and inserts that meaning with the values assigned to the arguments into the section 134 of memory 136, which is initially empty, thus building in section 134 a list of the meanings. The values are assigned as a continuous sequence of numbers from one word to the next. In this embodiment, it will be assumed that the sequence of values begins at the number 900. Thus, if the first input word is a noun, which category has two arguments in its meaning, its meaning is assigned the values 900 and 901. If the next input word is a transitive verb, which category requires three values, its meaning is assigned values 902, 903 and 904. If the input word after that is a determiner, which category requires two values, its meaning is assigned values 905 and 906, and so on.

From consideration of Table 1, it can be seen that if the sentence "activate the camera on the third floor" is input via the keyboard, the following will be stored in section 134 of Table X:

activate(900,901,902)
the(903,904)
camera(905,906)
on(907,908,909)
the(910,911)
third(912,913)
floor(914,915).

In the above example, the meaning of each of the input words as obtained from the lexicon consists of a single predicate. Inspection of Table 1, however, shows that the meanings of a number of the input words comprise two or more predicates each being provided with arguments. When words having more than one predicate are processed, all of the predicates are stored in the current meaning section 134 of Table X. The value of the arguments is determined by taking the first of the predicates shown in the input language lexicon as relating to the particular input word, assigning to its arguments the next two or three numbers in the sequence of values (as the case may be) and putting the same values in the arguments of the other predicates relating to that input word as indicated by the numbers 1 or 2 etc. in the arguments of those other predicates. This will be understood by considering the processing of the words "the guard activated it".

The corresponding entries in the meaning column of the lexicon together with the values assigned to the arguments are indicated below with the input words in the left hand column below and the meanings and arguments in the right hand column below:

| the | the(900,901)0 |
|---|---|
| guard | guard(902,903) |
| activated | activate(904,905,906) |
|  | past(_,904) |
| it | entity(907,908) |
|  | the(_,907) |

In any language, the grammar defines the different categories of words which may qualify each other and the order in which the words are spoken or written to convey the required meaning. For example, in the English language, an adjective precedes a noun which it qualifies. An adverb may precede or succeed the verb which it qualifies. A noun may be the subject or object of a verb which qualifies the noun. If a noun is the subject of a transitive verb, the noun usually precedes the verb. If a noun is the object of a transitive verb, the verb normally precedes the noun. A transitive verb may thus qualify both a preceding noun which forms the subject of the verb and a succeeding noun which forms the object. A noun which is qualified by an adjective and which forms the subject or object of a transitive verb is connected both to the adjective and to the transitive verb. Thus, as a phrase, clause or sentence is spoken or written each new word may qualify or be qualified by a previous word or words and/or may have the potential for qualifying or being qualified by a future word or words which have not yet been written, typed or spoken. Where one word qualifies or is qualified by another, the two words will be referred to herein as linked to each other. This linking is represented by means of a binding between arguments of the predicate representing the meaning of each of the words.

In the present embodiment, these bindings are stored in the form of equations by which the value of a selected argument of the meaning of the current word is equated to the value of a selected argument of the meaning of a previously received word which qualifies or is qualified by the current word. If the current word qualifies the preceding word, the selected value of the meaning of the current word is placed on the left-hand side of the equation and that of the preceding word is placed on the right-hand side of the equation. If the current word is qualified by the preceding word, the selected value of the meaning of the current word is placed upon the right-hand side of the equation and that of the preceding word is placed upon the left-hand side of the equation. Thus, taking the words "the camera" from the first of the above examples, the binding $$904=905$$

is formed since the determiner "the" qualifies the noun "camera". As another example, taking the words "camera on" the binding $$908=906$$

is formed on the basis that the preposition "on" qualifies the noun "camera".

The input signal processor 122 includes a table 138 which contains instructions for establishing connections or bindings between the meanings of the current word and of a preceding word or words dependent upon the categories of the current and preceding words and the grammar of the language. This processing involves:

a) Storing in search space 140 of memory area 136 a search code or codes dependent upon the category of the current word and storing, with each search code, the value of a selected argument of the meaning of the current word.

b) Carrying out a search in the search space 140 for one or more occurrences of a previously stored search code or search codes, the search carried out being dependent upon the category of the current word.

c) Where the search is successful, defining a binding utilising the value stored with the previously stored search code found in the search and a value assigned to a selected argument of the meaning of the current word, and storing the binding in section 142 of memory area 136.

d) In the case of certain categories of word, removing from search space 140 certain previously stored search codes to prevent those search codes being found in a subsequent search.

The following Table 2 represents the instructions stored in table 138:

TABLE 2

| CURRENT INPUT WORD CATEGORY | CODES TO BE SEARCHED FOR | ARGUMENT OF MEANING OF CURRENT WORD TO BE USED IF SEARCH SUCCESSFUL | WHETHER ARGUMENT OF MEANING OF CURRENT WORD TO BE PLACED ON RIGHT OR LEFT OF BINDING | SEARCH CODE AND ARGUMENT OF MEANING OF CURRENT WORD TO BE STORED | PREVIOUSLY STORED SEARCH CODE TO BE REMOVED |
|---|---|---|---|---|---|
| noun | an | 2 | R | n/2 | |
| | dn | 1 | R | subj/2 | |
| | obj | 2 | R | | |
| | prd | 2 | L | | |
| preposition | v | 2 | L | obj/3 | dn/x |
| | n | 2 | L | | prd/2 |
| | dn | x | | | |
| | prd | 2 | L | | |
| auxiliary | aux | 1 | R | v/1, aux/3, subj/2 | subj/2 |
| | adv | 1 | R | | |
| | subj | 2 | R | | |
| negation | v | 2 | L | | v/2 |
| to | to | 1 | R | v/3, sto/2 | to/1, subj/x, |
| | sto | 2 | R | | sto/2 |
| | subj | x | | | |
| transitive verb | aux | 1 | R | v/1, obj/3 | subj/2, sto/2, |
| | adv | 1 | R | | n/x |
| | subj | 2 | R | | |
| | sto | 2 | R | | |
| | whobj | 3 | R | | |
| | n | x | | | |
| intransitive verb | aux | 1 | R | v/1 | subj/2, |
| | adv | 1 | R | | sto/2, n/x |
| | subj | 2 | R | | |
| | sto | 2 | R | | |
| | n | x | | | |
| determiner | — | — | — | dn/2 | |
| adjective | a | 1 | R | an/2 | a/1 |
| | prd | 2 | L | | |
| adverb | a | 1 | R | adv/2 | a/1 |

TABLE 2-continued

| CURRENT INPUT WORD CATEGORY | CODES TO BE SEARCHED FOR | ARGUMENT OF MEANING OF CURRENT WORD TO BE USED IF SEARCH SUCCESSFUL | WHETHER ARGUMENT OF MEANING OF CURRENT WORD TO BE PLACED ON RIGHT OR LEFT OF BINDING | SEARCH CODE AND ARGUMENT OF MEANING OF CURRENT WORD TO BE STORED | PREVIOUSLY STORED SEARCH CODE TO BE REMOVED |
|---|---|---|---|---|---|
| | v | 2 | L | | |
| intensifier | a | 1 | R | a/2 | a/1 |
| promise verb | aux | 1 | R | v/1, obj/3, sto/2, to/4 | subj/2 |
| | adv | 1 | R | | |
| | subj | 2 | R | | |
| | sto | 2 | R | | |
| | whobj | 3 | R | | |
| copula | aux | 1 | R | v/1, prd/3 | subj/2 |
| | adv | 1 | R | | |
| | subj | 2 | R | | |
| | sto | 2 | R | | |
| pronoun | obj | 2 | R | n/2, subj/2 | |
| | prd | 2 | L | | |
| persuade verb | aux | 1 | R | v/1, obj/3, sto/3, to/4 | subj/2 |
| | adv | 1 | R | | |
| | subj | 2 | R | | |
| | sto | 2 | R | | |
| | whobj | 2 | R | | |
| interjection | — | — | — | — | — |
| have | aux | 1 | R | v/1, obj/3, aux/3, subj/2 | subj/2 |
| | adv | 1 | R | | |
| | subj | 2 | R | | |
| | sto | 2 | R | | |
| | whobj | 3 | R | | |
| complementizer | n | 2 | R | whobj/2, subj/2 | |

As can be seen, the first column of Table 2 lists the word categories. The second column lists the previously stored search codes which are searched for when processing a word of the categories shown in the first column. The third column indicates the argument of the meaning of the current word which will be used in the binding to be formed if the search is successful. The fourth column indicates whether that binding is to be placed on the right hand side or the left hand side of the equation which forms the binding. This, as already indicated, is dependent upon whether the current input word being processed is qualified by or qualifies the previous word in response to the processing of which the search code searched for was stored. The fifth column lists the search codes to be stored in search space 140 when processing the current word and the argument of the current word whose value is to be stored with that search code. The sixth column of Table 2 indicates the previously stored search codes to be removed from the search space when found by a search performed in response to the processing of the current word. The storage of the codes and arguments shown in the fifth column of Table 2 takes place after the searching described with reference to the second column and the removal described with reference to the sixth column.

The searches which are performed start at the latest stored search code and work backwards from that. Where the search is for a code stored in response to a previous word of a category which will qualify the current word, the searching is terminated upon finding the latest occurrence of that search code. Thus, the designation "R" in the fourth column of Table 2 indicates not only which way the binding is to be recorded but also indicates that the searching is to be terminated upon finding the first (i.e. the latest stored) occurrence of the related code. Where the search is for a code stored in response to processing of a previous word of a category such that the current word qualifies the preceding word, the search is for all occurrences of the relevant code which are currently in the search space 140. Thus the instruction "L" in the fourth column of Table 2, in addition to indicating the direction of the binding to be formed, also indicates that all occurrences of the relevant code should be searched for and that bindings should be formed upon the finding of each occurrence of that code.

The manner in which words of different categories are processed in accordance with the instructions of Table 2 to establish the bindings will be understood from the following detailed description of the processing of each word category with reference to Table 2 and FIGS. 3 to 20. In each of these drawings, the highlighted block indicates the category of the current word being processed, the blocks to the left of that indicate the categories of previously received words which may qualify or may be qualified by the current word category and the blocks to the right of that indicate the categories of future words which may qualify or be qualified by the current category of word. The blocks also indicate by the numbers 1, 2, 3 and 4 the arguments of the meanings of the words which fall into those categories respectively. The arrows indicate which of the arguments are used for defining the bindings and the direction of the arrows indicates whether the current word is qualified by or qualifies the words of the other categories. An arrow pointing to the current word category indicates that it is qualified by the other word. An arrow pointing away from the current word category indicates that the current word qualifies the other word. Selection of the number of arguments for each category may be made taking into account the requirement for the provision of independent bindings between the current word and the words qualified by or qualifying it.

From the above description, it will be understood that the direction of the arrows in FIGS. 3 to 20 between the current input word category and the previous word categories indicates whether the search for the particular code in question is terminated upon finding the latest occurrence thereof or whether the search continues to find all occurrences thereof. An arrow pointing from the current category to the previous category, indicates that the current word qualifies the previous word and thus also indicates that the search will continue for all occurrences of the relevant code. An arrow pointing from the category of a previous word to the category of the current word indicates that the current word is qualified by the previous word and that the search will be terminated upon finding the first occurrence (i.e. the latest stored occurrence) of the relevant search code. The search codes which are searched for to form the bindings indicated by the arrows are marked on FIGS. 3 to 20. The position of each arrow marked in FIGS. 3 to 20 indicates the argument whose value is stored in the search space 140 with the respective code.

Figure 3:
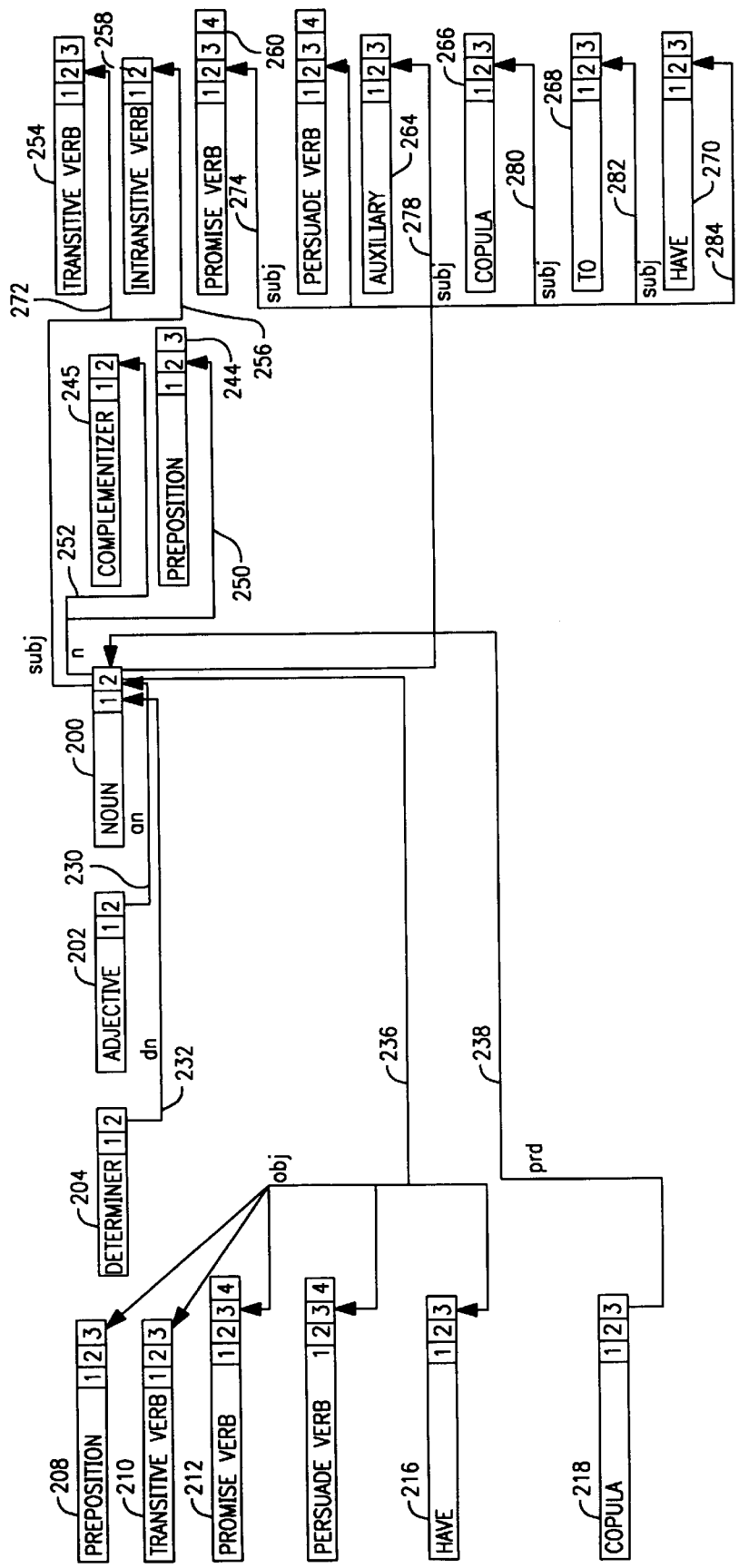

Noun—FIG. 3

In the input language grammar of the present embodiment, nouns may be qualified by previous adjectives or determiners and may qualify previous prepositions, transitive verbs, promise verbs, persuade verbs, "have" or copulas. Thus, in FIG. 3, block 200, representing the meaning of a noun and its arguments, is positioned to the right of blocks 202 to 228 each of which represents the meaning of a word of the type indicated therein. As shown in column 5 of Table 2 above, processing of an adjective results in the search code "an" together with the second argument of the meaning of the adjective being stored in search space 140, processing of a determiner results in the code "dn" together with the second argument of the meaning thereof being stored in search space 140, processing of a preposition, transitive verb, promise verb, persuade verb or "have" results in search code "obj" together with the third argument of the meaning of the respective word being stored in the search space 140 and processing of a copula results in the search code "prd" together with the third argument of the meaning of the copula being stored in the search space. Thus when a noun is processed and following assignment of the values of the first and second arguments of the meaning of the noun, searches for the code "an", "dn", "obj" and "prd" are carried out in the search space 140, as indicated by the instruction for nouns in the second column of Table 2.

If the search with the code "an" is successful, a binding is formed between the variable forming the second argument of the meaning of the noun, as indicated in the third column of Table 2 and the variable stored with a search code "an" which variable is that which forms the second argument of the meaning of the previously processed adjective. Since the noun is qualified by the adjective, rather than vice versa, column 4 of Table 2 indicates that the variable assigned to the second argument of the meaning of the noun should be placed on the right hand side of the equation constituting the binding and this is represented by the direction of arrow 230 which represents the relevant binding in FIG. 3. If there is more than one occurrence of the code "an" in the search space 140, the search is terminated upon finding the first occurrence. As already explained, the codes stored in each search space 140 are searched in reverse order starting from the last code inserted and thus if there is more than one occurrence of any search code, the binding is formed with the latest stored occurrence.

The second search performed when processing a noun is for the code "dn" and, as shown by arrow 232 in FIG. 3, and by the instructions in the third and fourth columns of Table 2, if the search is successful, a binding is formed between the variable forming the first argument of the meaning of a noun and that associated with the code "dn" which is the variable which forms the second argument of the meaning of the determiner. Again the direction of the arrow 232 and the instruction "R" in the fourth column of Table 2 indicates that the noun is qualified by the determiner and thus the search is terminated at this point.

The arrow 236 in FIG. 3 indicates a binding which may be formed as a result of the third search performed when processing nouns, namely the search for the code "obj". As indicated, this code is stored in the search space 140 in response to processing of prepositions, transitive verbs, promise verbs, persuade verbs or "have". The arrow 238 in FIG. 3 indicates a binding which may be formed as a result of the fourth search performed when processing nouns, namely the search for the code "prd". As indicated, this code is stored in search space 140 in response to processing of copulas. As indicated by the direction of the arrow 236 and by the instruction "L" in the fourth column of Table 2, the noun qualifies each of the categories 208 to 218 and therefore the search will continue to find each occurrence of the relevant search code. As indicated by the direction of the arrow 238 and determined by the instruction "R" in the fourth column of Table 2, the noun is qualified by the category 218 and therefore this search will terminate when a binding has been formed with the first occurrence of the relevant search code. Thus, it can be seen from the left hand side of FIG. 3 that when a noun is processed, the number of bindings stored in section 140 of memory 126 is dependent upon the categories of words previously processed. One of the bindings may be between the value assigned to the second argument of the meaning of the noun and the value assigned to the second argument of the meaning of the last received adjective, another being between the value assigned to the first argument of the meaning of the noun and the value assigned to the second argument of the meaning of the last received determiner and further binding may be between the value assigned to the second argument of the meaning of the noun and the values assigned to the third arguments of the meanings of each previously processed word category of the types indicated in blocks 208 to 218.

The fifth column of Table 2 indicates that when a noun is processed the code "n" together with the value assigned to the second argument of the meaning of the noun is stored in search space 140. As indicated in the second column of Table 2, the code "n" is searched for by prepositions and complementizers. Thus, if at a future stage in the processing, a preposition is received, the search performed in response to the preposition may find the code "n" and a binding consequently performed between the value assigned to the second argument of the meaning of the preposition and that assigned to the second argument of the meaning of the noun. Similarly, bindings may be formed between the second argument of the meaning of a future complementizer and the second argument of the meaning of the noun. This is indicated in the right hand side of FIG. 3, in which reference numbers 244 to 246 indicate respectively blocks representing future processing of prepositions and complementizers. Arrows 250 and 252 represent bindings between the second argument of the meaning of future prepositions and complementizers respectively and the second argument of the meaning of the noun, with the noun qualifying the preposition or complementizer.

Also, as indicated in the fifth column of Table 2, when a noun is processed the search code "subj" together with the value assigned to the second argument of the meaning of the noun is stored in the search space 140. As indicated in the second column of Table 2, the code "subj" is searched for by transitive verbs, intransitive verbs, promise verbs, persuade verbs, auxiliary verbs, copulas, "have" and "to". Thus, if at a future stage in the processing a intransitive verb is received the search performed in response to the intransitive verb may find the code "subj" and a binding would be formed between the value assigned to the second argument of the meaning of the intransitive verb and that assigned to the second argument of the meaning of the noun. This is indicated in the right hand side of FIG. 3, in which reference number 254 indicates a block representing a future processed intransitive verb and arrow 256 represents a binding between the second argument of the meaning of the future intransitive verb and the second argument of the meaning of the noun, with the noun qualifying the intransitive verb. Similarly, bindings may be formed between the meaning of future processed word categories represented by blocks 258 to 270, with arrows 272 to 284 representing those bindings between the second arguments of the meaning of the future word categories and the second argument of the meaning of the noun, the noun qualifying each such future word category.

Although FIG. 3 indicates bindings that may be performed between the meaning of a noun and a meaning of future word categories in addition to indicating bindings which may be performed between a noun and a previously received word categories, it should be understood that the preferred embodiment of the invention operates by searching the search space 140 only for codes stored in response to processing of previous words.

Figure 4:
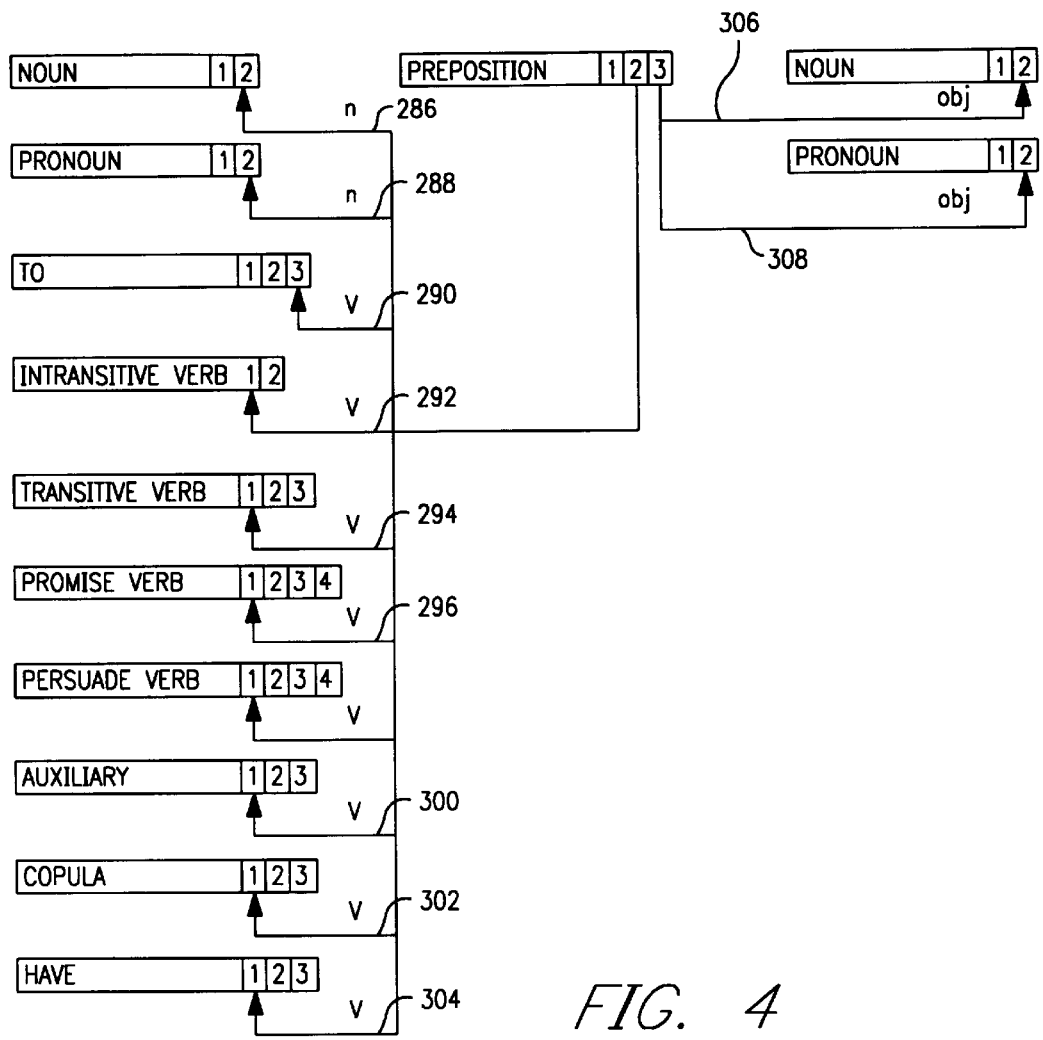

Prepositions—FIG. 4

In accordance with the input language grammar of the preferred embodiment, prepositions can qualify previous nouns, pronouns, transitive verbs, intransitive verbs, promise verbs, persuade verbs, auxiliaries, copulas, "to" and "have". As shown in Table 1, the meanings of prepositions have three arguments, and Table 2 shows that searches for the codes "v", "n" and "prd" are carried out, in response to prepositions. As seen from the fifth column of Table 2, the code "n" would have been stored in space 140 in response to the processing of a previous noun or pronoun together with a variable assigned to the second argument of the meaning thereof, the code "v" may have been stored in response to the processing of any previous transitive verbs, intransitive verbs, promise verbs, persuade verbs, auxiliary verbs, copulas, "to" or "have" together with a variable assigned to the first argument of the meaning thereof and the code "prd" may have been stored in response to the processing of any previous copula together with a variable assigned to the third argument of the meaning thereof.

Arrows 286 and 288 in FIG. 4 indicate that the variable assigned to the second argument of the meaning of the current preposition and a variable assigned to the respective second arguments of the meaning of the preceding nouns or pronouns are used to define a binding indicating that those preceding word categories are qualified by the current preposition. Such bindings are established as a consequence of a search for the code "n". Arrows 290 to 304 indicate that the value assigned to the second argument of the meaning of the preposition is also used, with the first argument of the meaning of any preceding transitive verb, intransitive verb, promise verb, persuade verb, auxiliary verb, copula or "have" to define bindings with the meaning of words of those categories. Arrow 305 indicates that the value assigned to the second argument of the meaning of the preposition is also used, with the third argument of the meaning of any preceding copula to define a binding with the meaning of a word of that category. As will be clear from the above description, searching for the codes "n", "v" and "prd" are terminated only upon finding each occurrence of each code.

As indicated in the instructions for prepositions in the second column of Table 2, a search for the code "dn" is also performed when processing a preposition. However, no binding is formed if the search code is found. As indicated by column 6 of Table 2, the code "dn" is removed. This prevents a binding being formed between variables of a noun and a preceding determiner where there is a preposition in between. In addition, if an occurrence of the search code "prd" is found in the search described above then this is removed from the search space 140 as indicated by column 6 of Table 2.

As indicated in the instructions for processing prepositions in the fifth column of Table 2, when a preposition is processed, the code "obj" together with a value assigned to the third argument of the current preposition is stored in the search space 140. Arrows 306 and 308 in FIG. 4 indicate that a search is performed in response to the processing of a future noun or pronoun respectively, which search would find the code "obj" and result in the formation of a binding between the value assigned to the meaning of the third argument of the meaning of the preposition and the value assigned to the second argument of the meaning of the future noun, or pronoun. Arrow 306 is thus consistent with the branch of arrow 236 which leads to block 208 in FIG. 3. Arrows 306 and 308 indicate that the preposition qualifies future nouns and pronouns.

Having described the processing of nouns and prepositions in detail with reference to Table 2 and FIGS. 3 and 4, the processing by the analyser of the remaining categories of word will be broadly understood from the consideration of Table 2 and FIGS. 5 to 20 and thus only a brief description of the processing of the remaining categories will be given.

Figure 5:
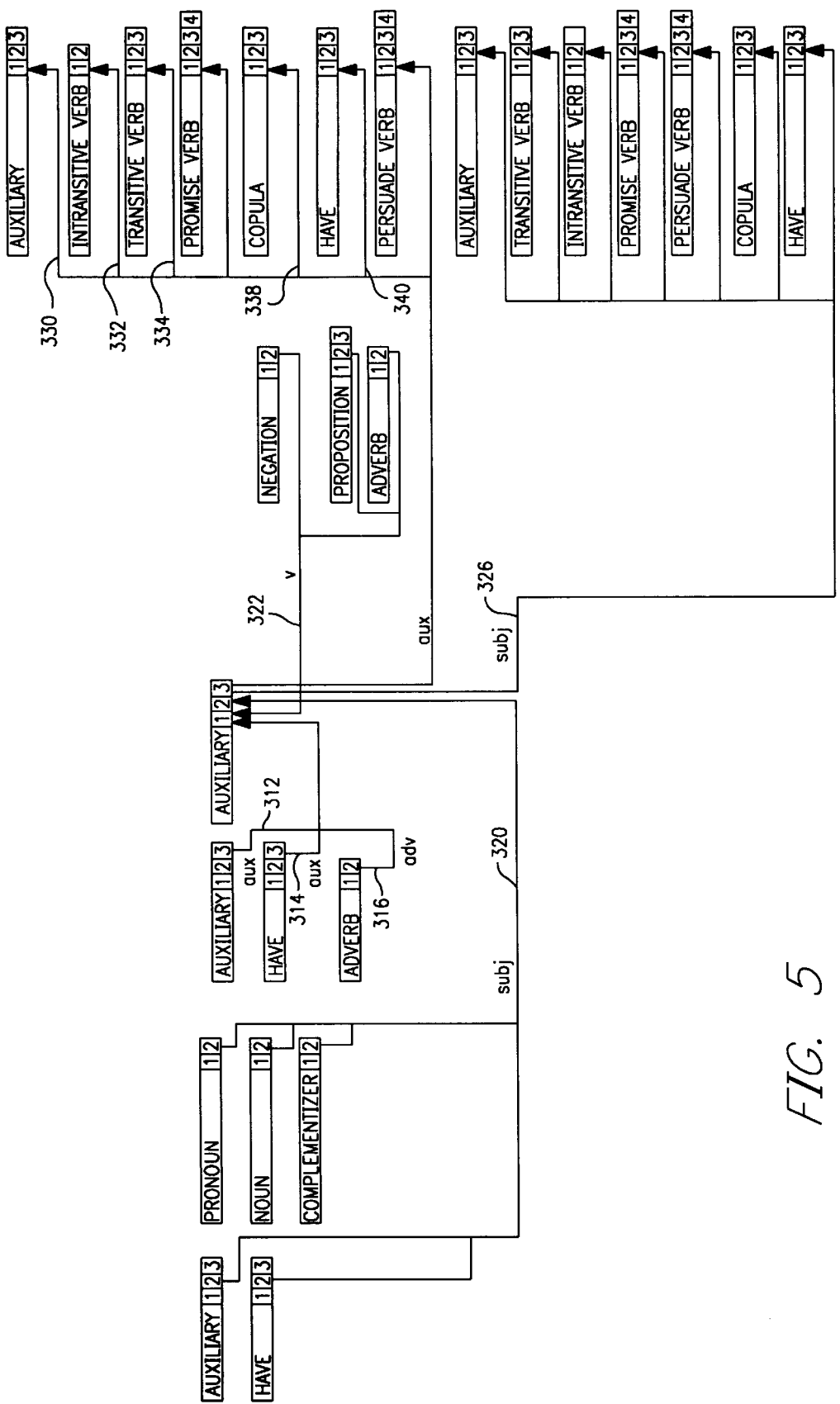

Auxiliary Verbs—FIG. 5

As can be seen from consideration of FIG. 5 and Table 2, auxiliary verbs initiate a search for the code "aux". The categories of words which store this code in search space 140 are auxiliary verbs and "have". Arrows 312 and 314 respectively indicate that if a search initiated by a current auxiliary verb is successful in finding an occurrence of this code, a binding between the third argument assigned to the meaning of the previous auxiliary or "have" is formed, the current auxiliary being qualified by the previous auxiliary or "have". The search will be terminated when the first occurrence of "aux" has been found.

Auxiliary verbs also initiate a search for the code "adv" which is stored in search space 140 by adverbs. Arrow 316 indicates that if a search initiated by the current auxiliary verb is successful in finding an occurrence of this code, a binding between the second argument assigned to the meaning of the previous adverb is formed with the current auxiliary verb being qualified by the adverb. The search will be terminated when the first occurrence of "adv" has been found.

Auxiliary verbs also initiate a search for the code "subj" which is stored in the search space 140 by pronouns, nouns, "have", complementizers and auxiliary verbs. Arrow 320 indicates that if a search initiated by the current auxiliary verb is successful in finding this code, a binding between the second argument assigned to the meaning of the previously processed relevant category and the second argument of the meaning of the current auxiliary verb is formed, the current auxiliary verb being qualified by the previous pronoun, noun, "have", complementizer or auxiliary verbs. The search is terminated when each stored occurrence of "subj" has been found.

When an auxiliary verb is processed, the code "subj" with the second argument of the meaning thereof, the code "v" with the first argument thereof and the code "aux" with the third argument of the meaning thereof are stored in the search space 140.

Prepositions, negations and adverbs initiate a search for the code "v" when processed. Arrow 322 in FIG. 5 indicates that a binding may be formed between the second argument of the meaning of a future preposition, negation or adverb and the first argument of the current auxiliary verb. The direction of the arrow in FIG. 5 indicates that the current auxiliary verb would be qualified by any such future words.

The arrow 326 in FIG. 5 indicates bindings which may be formed between the second argument of the meaning of the current auxiliary verb and the second argument of the meaning of a future auxiliary verb, transitive verb, intransitive verb, promise verb, persuade verb, copula or "have" as a result of a future search for the code "subj". The direction of the arrow indicates that the current auxiliary verb would qualify the future words of those categories.

The arrow 330 indicates a binding which may be formed between the third argument of the meaning of the current auxiliary verb and the first argument of the meaning of a future auxiliary verb as a result of a search by that future auxiliary verb for the code "aux", the direction of the arrow indicating that the future auxiliary verb will be qualified by the current auxiliary verb. The arrows 332 to 340 in FIG. 5 indicate a binding which may be formed between the third argument of the current auxiliary verb and the first argument of the meaning of a future intransitive verb, transitive verb, promise verb, persuade verbs, copulas or "have", again as a result of a search by a future word of one of those categories for the code "aux", the direction of these arrows indicating that the latter will be qualified by the current auxiliary verb.

Although the arrows 322 to 340 indicate the possibility of many bindings, it will be understood that in practice only one, or a small number, of the possible bindings may be formed even though, for example, the current auxiliary verb may be followed by words of several categories which may qualify or be qualified by it. The number of bindings formed will depend upon the order of the future words, whether searches in response to the future words are terminated as soon as the relevant code is found and whether the relevant codes are removed when processing such future words.

Figure 6:
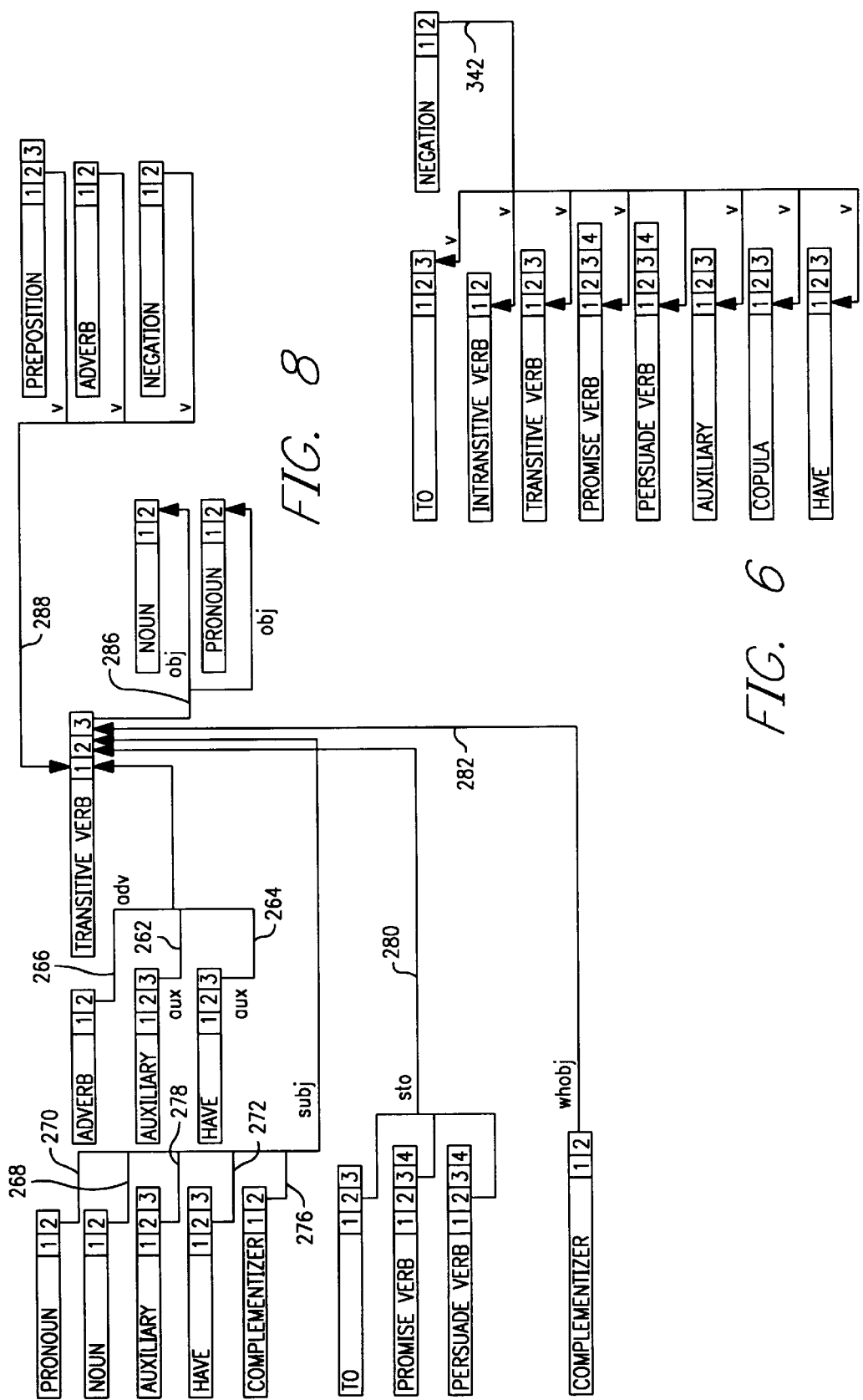

Negation—FIG. 6

A negation initiates a single search in the search space 140 for the code "v". That code is stored in response to the processing of auxiliary verbs, copulas, transitive verbs, intransitive verbs, promise verbs, persuade verbs, "to" or "have" and thus the arrow 342 in FIG. 6 indicates a possible binding being formed in response to the processing of a current negation. Searching will be terminated when each occurrence of the code has been found and any corresponding binding or bindings will be formed. Any occurrence of the code "v" located in search space 140 will be removed in accordance with the instruction in column 6 of Table 2.

A negation does not store any code in the search space 140 and therefore no bindings are created between any future words and the current negation.

Figure 7:
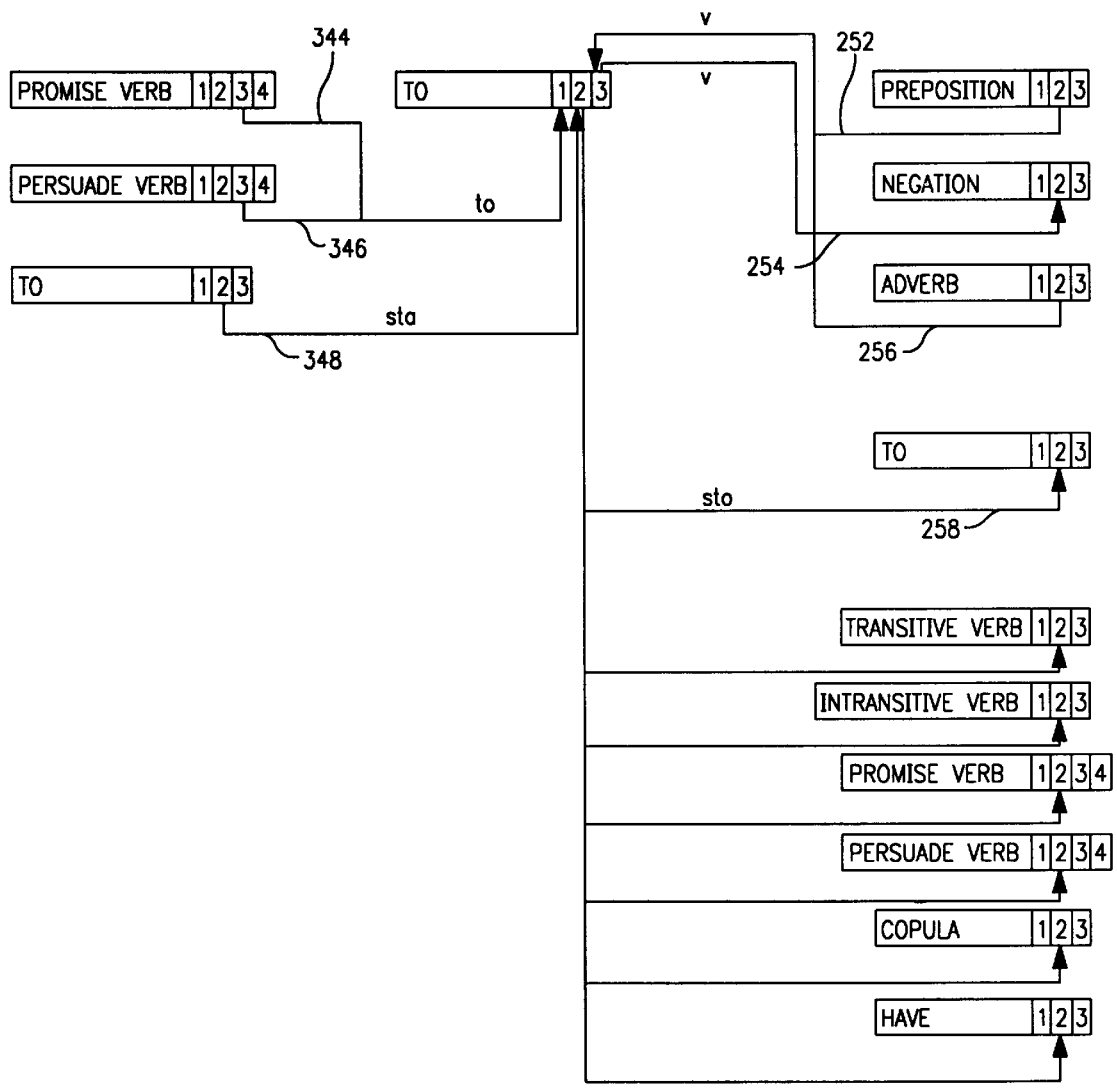

"To" (The Infinitival Particle)—FIG. 7

Processing of the word "to" (the infinitival particle not the preposition) initiates a search for the code "to". The categories of word which initiate storage of this code are promise verbs and persuade verbs along with the third argument of the meaning of each such category. In FIG. 7, the arrows 344 and 346 indicate that a search is performed to find an occurrence of the code "to" and a corresponding binding is formed. Processing of the word "to" also initiates a search for the code "sto" which is stored by a previously processed occurrence of the word "to" along with the second argument of the meaning thereof. In FIG. 7, the arrow 348 indicates that search continues to find the first occurrence of the code "sto" and a corresponding binding is formed. When the word "to" is processed, the code "v" with the third argument of the meaning thereof is stored in the search space 140. The categories of word which carry out searches for this code have been indicated above in the description of FIG. 5. Thus, in FIG. 7, the arrow 252 to 256 indicate bindings which may be formed with those categories of future words, with the directions of the arrows 252 to 256 indicating that the current word "to" is qualified by those future words. Also, when the word "to" is processed, the code "sto" with the second argument of the meaning thereof is stored in search space 140. As described above this search code is searched for by the word "to" and all verbs except auxiliary verbs, and bindings formed accordingly. In FIG. 7, the arrow 258 indicates such a binding.

As indicated in the instruction for "to" in the column 2 of Table 2, a search for the code "subj" is also performed when processing the word "to". However, no binding is formed if the search code is found. However, as indicated in column 6 in Table 2, the code "subj" is removed. In addition, any occurrence of the codes "to" and "sto" located in the searches described above for those codes will also be removed from the search space.

Transitive Verbs—FIG. 8

Arrows 262 and 264 indicate bindings which may be formed between the meaning of a previous auxiliary verb or "have" and a current transitive verb as a result of the search for the code "aux" initiated in response to processing of the current transitive verb. Searching for the code "aux" is terminated when the latest occurrence of the code has been found. Arrow 266 indicates a binding which may be formed between the meaning of a previous adverb and the current transitive verb as a result of a search for the code "adv". Searching for the code "adv" is terminated following finding the latest occurrence thereof. Arrows 268 to 272 indicate bindings which may be formed between the meaning of previous nouns, "have", pronouns, complementizers or auxiliary verbs and the current transitive verb as a result of the search for the code "subj". Searching for the code "subj" is terminated upon finding the latest occurrence thereof. Arrow 280 indicates bindings which may be formed between the meaning of previous "to", promise verbs or persuade verbs as a result of the search for the code "sto". Searching for the code "sto" is terminated upon finding the latest occurrence thereof. Arrow 282 indicates the binding which may be formed between a previous complementizer as a result of the search for the code "whobj" initiated in response to the processing current transitive verb. Searching for the code "whobj" is terminated upon finding the latest occurrence thereof.

As indicated in the sixth column of Table 2 a search for the code "n" is also performed when processing a transitive verb. However, no binding is formed if the search code is found. However, as indicated in column 6 of Table 2, the code "n" is removed. In addition, either of the codes "subj" or "sto" found in the searches described above are also removed from the search space 140 as indicated by column 6 of Table 2.

Arrow 286 indicates a possible future binding between the meaning of the current transitive verb and the meaning of a future noun or pronoun as a result of a search for the code "obj". Arrow 288 indicates a binding which may be formed between the meaning of a current transitive verb and the meaning of a future preposition, negation or adverb as a result of searches initiated by these word categories for the code "v" which is stored in response to the processing of transitive verbs. As will be apparent from the above description, whether or not one or more of these bindings is formed will depend upon the order of the future word categories.

Figure 9:
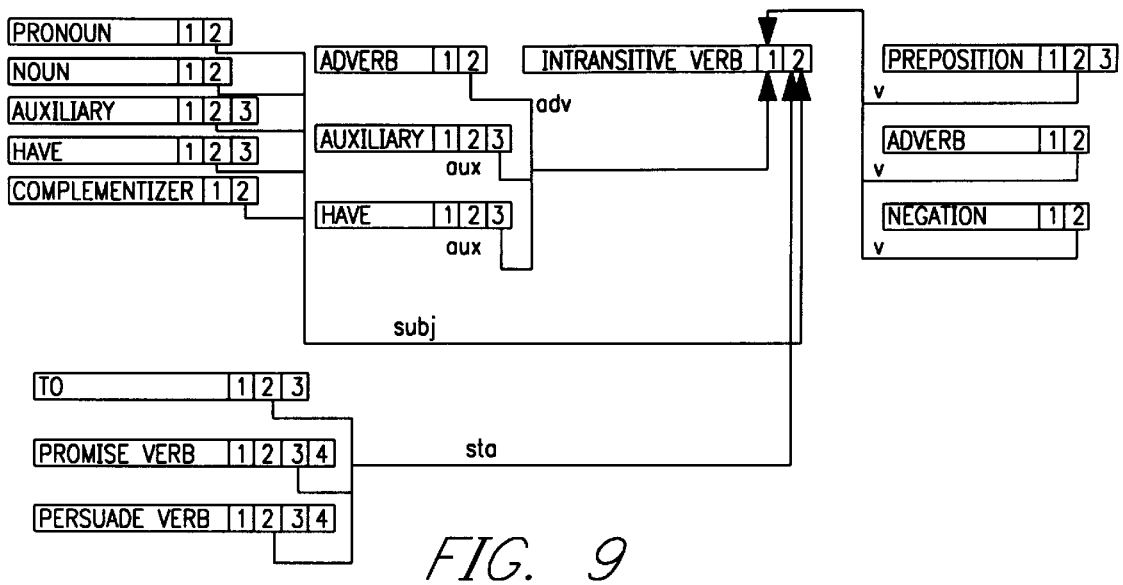

Intransitive Verbs—FIG. 9

Processing of intransitive verbs is identical to that of transitive verbs described above with reference to FIG. 8 except that the processing of intransitive verbs does not involve searching for the code "whobj" in the search space 140 or in the storage of the code "obj" in the search space 140, as is the case with transitive verbs.

Figure 10:
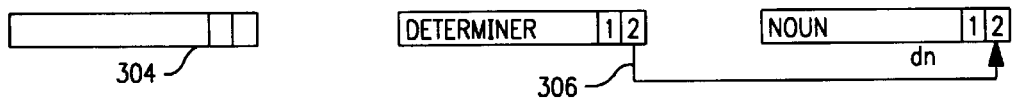

Determiners—FIG. 10

In FIG. 10, the empty block 304 indicates that when a determiner is processed, no searches in search space 140 are performed and therefore no bindings with the meanings of previous words can be performed when processing determiners and no search codes are removed from the search space 140.

Processing of determiners results in the storage of the code "dn" in search space 140. Arrow 306 indicates a possible future binding as a result of searches for the code "dn" performed during future processing of nouns.

Figure 11:
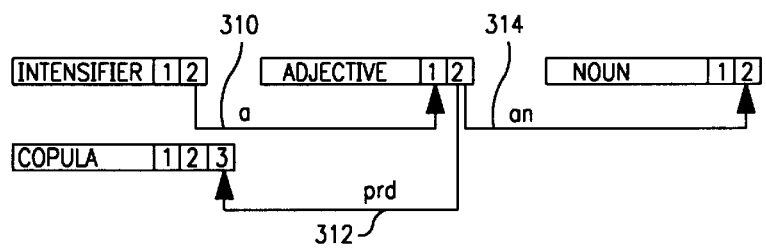

Adjectives—FIG. 11

Arrow 310 indicates a binding which may be formed between the meaning of a current adjective and that of a previous intensifier as a result of a search on the code "a" performed when processing an adjective. As is clear from Table 2, if such a search is successful, the code "a" is removed from the search space 140 thereafter so that a further binding with that code cannot be formed even if a further adjective or future adverb is processed.

Searching is terminated on finding the latest occurrence of "at". Arrow 312 indicates a binding which may be formed between the meaning of a current adjective and that of a previous copula as a result of a search for the code "prd" performed when processing the current adjective.

The processing of an adjective results in the storage of the code "an" in search space 140 and arrow 314 in FIG. 11 indicates a binding which may be formed between the meaning of the current adjective and the meaning of a future noun which searches for the code "an" in the search space 140 when it is processed.

Figure 12:
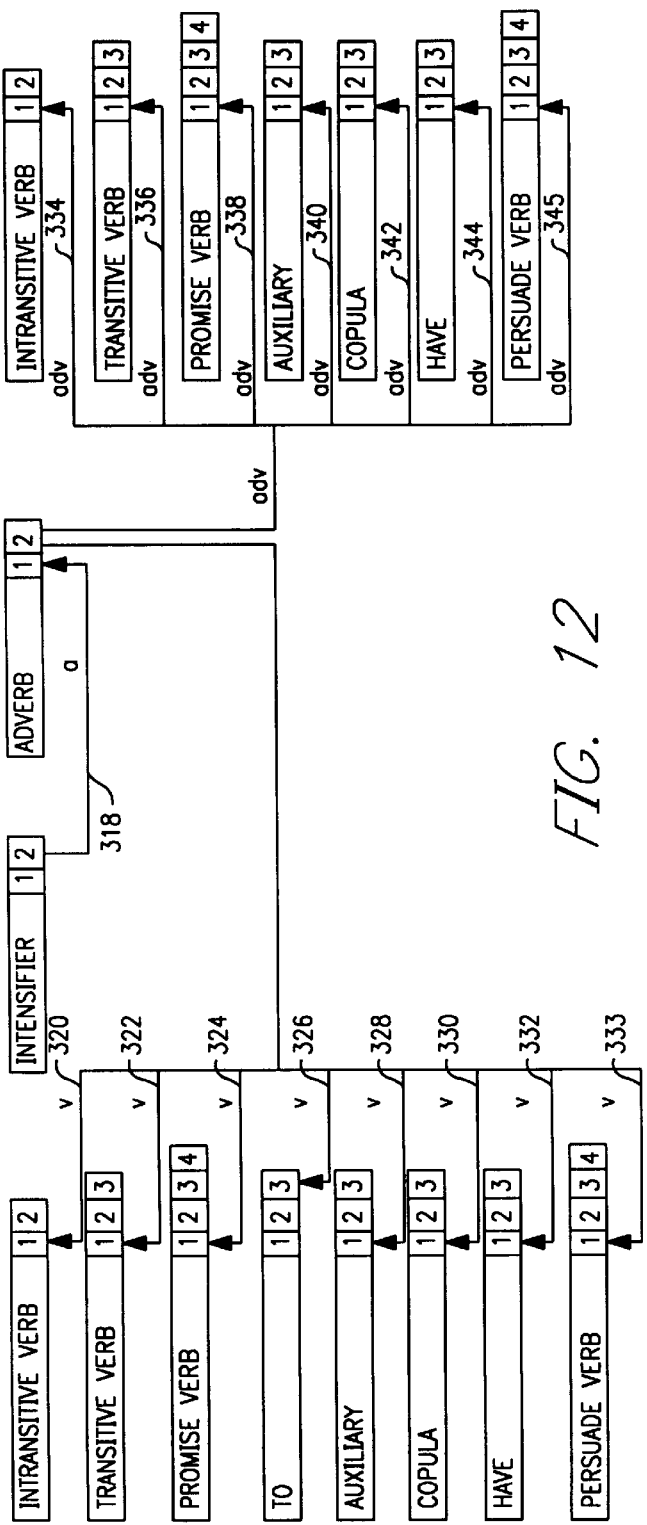

Adverbs—FIG. 12

Arrows 318 to 333 indicate bindings which may be formed between the meaning of a current adverb and the meanings of previous words as a result of searches for the codes "a" and "v" performed in response to the processing of the current adverb. If the search for the code "a" is successful, that code is removed as indicated in the sixth column of Table 2. Searching is terminated upon finding the latest occurrence of "a". The search for the code "v" is stopped upon finding each occurrence. The finding of the code "v" in this search does not cause its removal.

The processing of adverbs results in the storage of the code "adv" in the search space 140. Arrows 334 to 345 represent possible future bindings as a result of searches for this code by future words of the different categories indicated.

Figure 13:
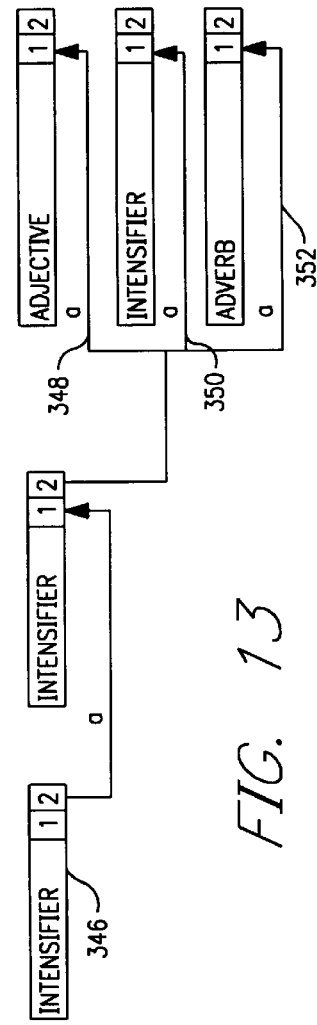

Intensifiers—FIG. 13

Arrow 346 in FIG. 13 indicates a binding which may be formed between the meaning of a current intensifier and a meaning of a previous intensifier as a result of a search for the code "a" performed in response to the processing of the current intensifier. The processing of intensifiers results in the storage in search space 140 of the code "a". Arrows 348, 350 and 352 in FIG. 13 indicate a possible future binding being performed upon processing a future adjective, intensifier or adverb.

Figure 14:

Interjection—FIG. 14

The blank blocks 376 and 378 shown in FIG. 14 indicate that no searching of the search space takes place, no codes are removed from the search space 140 and no codes are stored in the search space 140 as a result of the processing of an interjection.

Figure 15:
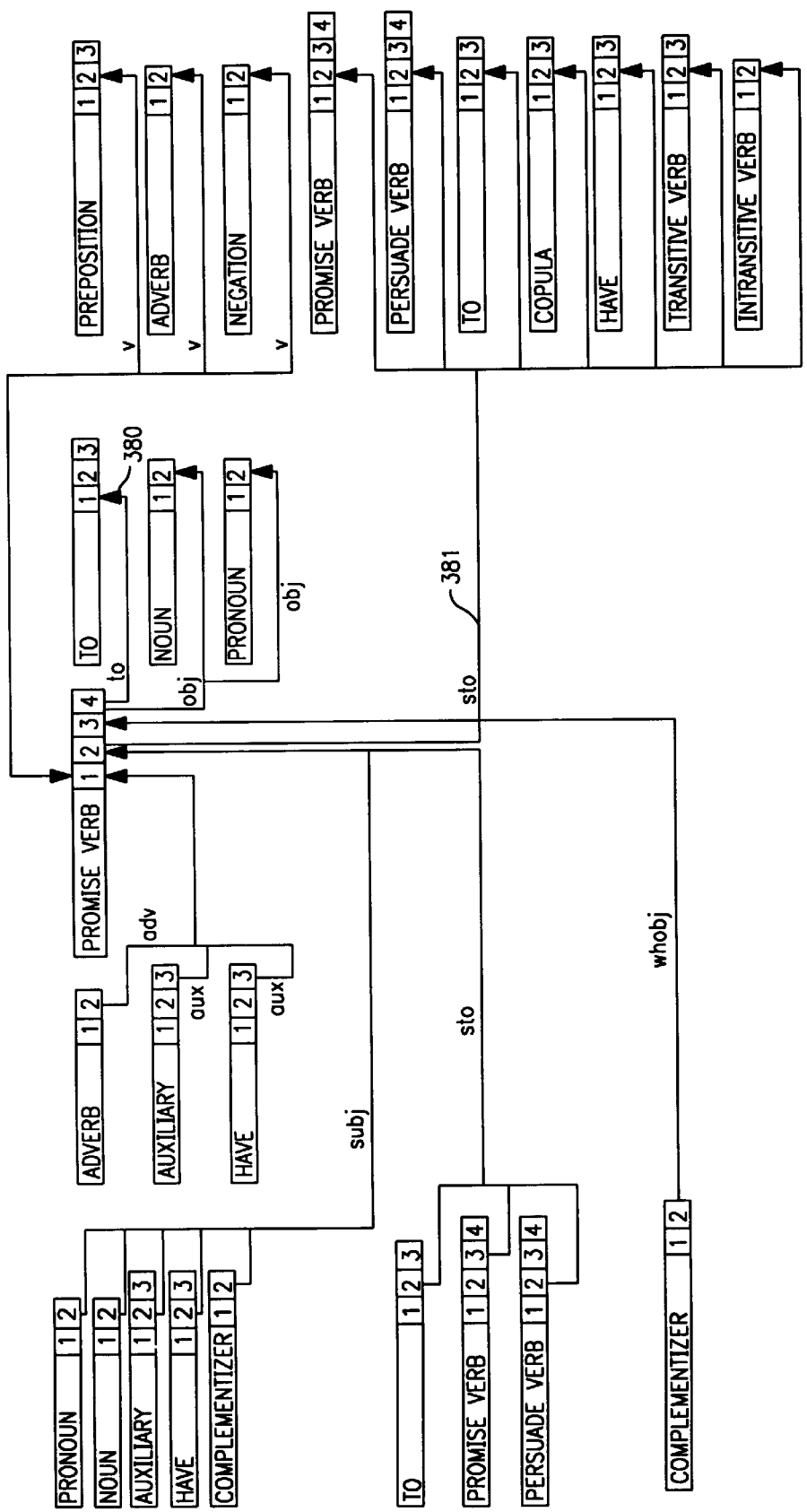

Promise Verbs—FIG. 15

The processing of promise verbs is identical to that of transitive verbs described above with reference to FIG. 8 except that the processing of a promise verb results in the storage of the codes "to" and "sto" in addition to the codes stored as a result of the processing of a transitive verb. Arrow 380 and 381 represent possible future bindings as a result of searches for the codes by future words indicated in FIG. 15.

Figure 16:
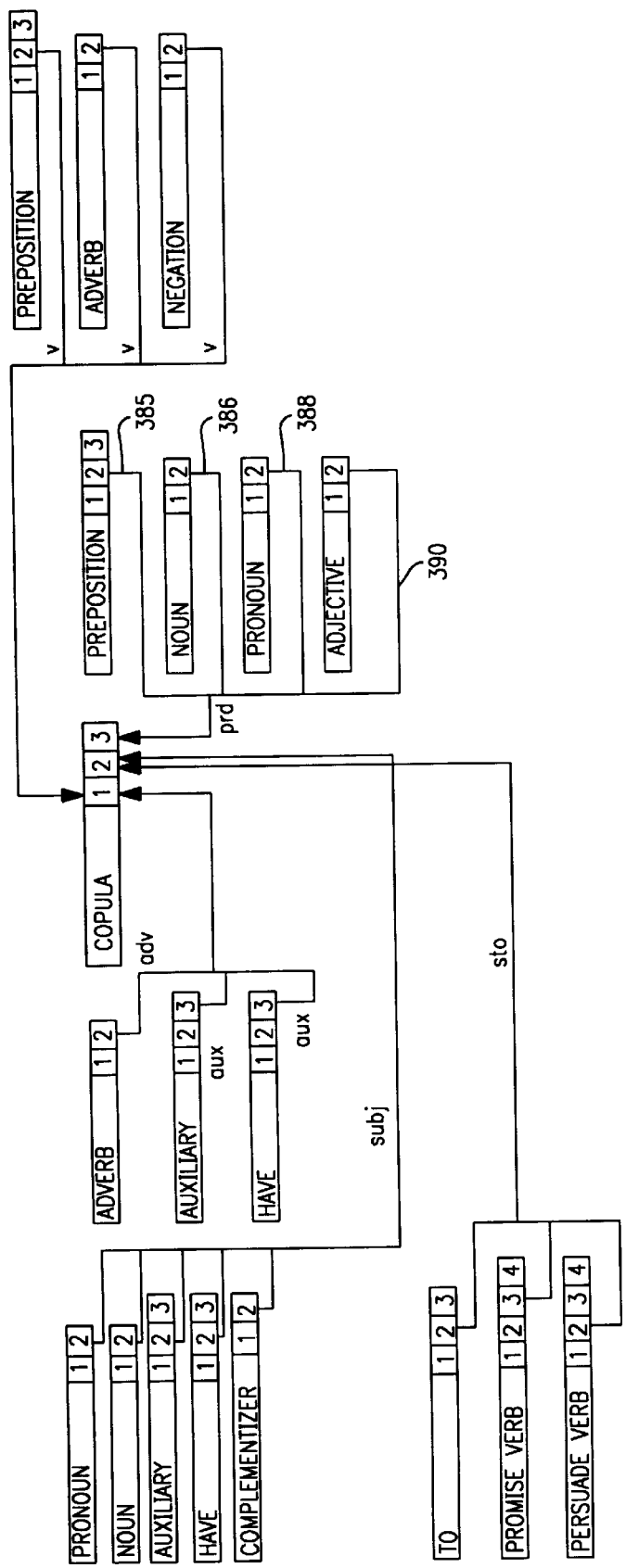

Copula—FIG. 16

The processing of a copula is similar to that of a transitive verb as described above with reference to FIG. 8, there being two differences. The first difference is that in the searching carried out during the processing of a copula, no search is made for the code "whobj".

The second difference is that the processing of copulas results in the storage of the code "prd" instead of the code "obj" as stored as a result of the processing of a transitive verb. Arrows 385 to 390 represent possible future bindings as a result of the searches for these codes by future words of the different categories indicated.

Figure 17:
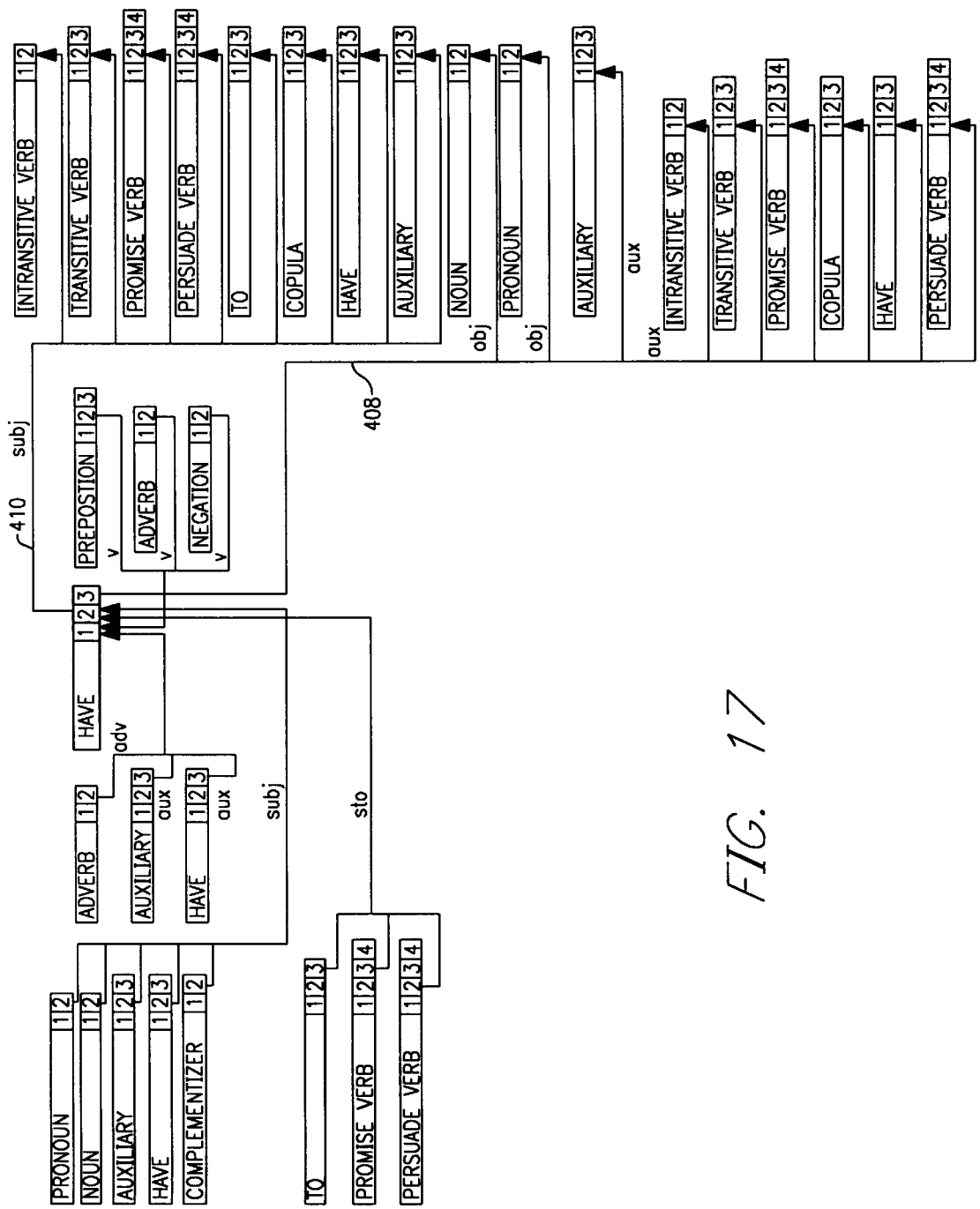

"Have"—FIG. 17

The processing of the word "have" is similar to that of a transitive verb as described above with reference to FIG. 8. The difference is that the processing of "have" results in the additional storage of the codes "subj" and "aux" in the search space 140. Arrows 408 and 410 represent possible future bindings as a result of the searches for this additional code by future words of the different categories indicated.

Figure 18:
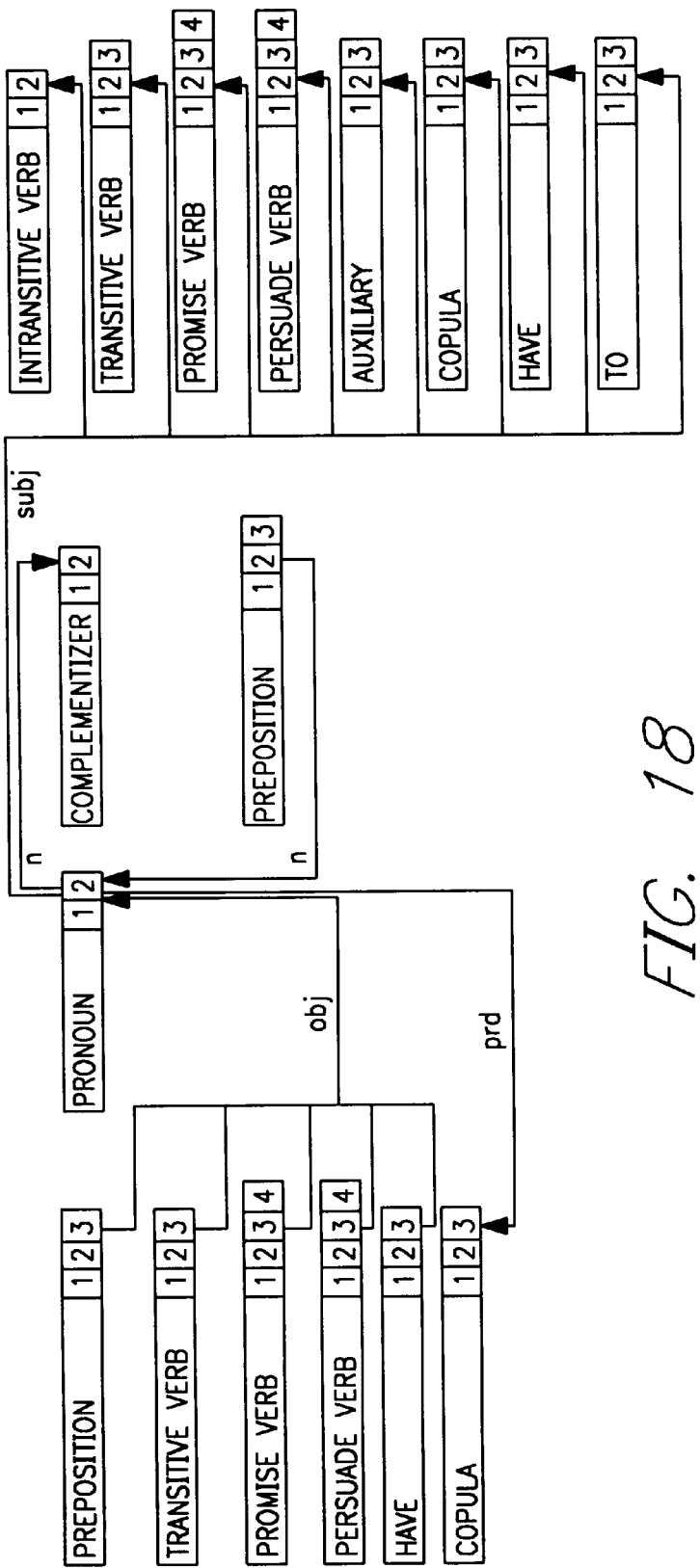

Pronouns—FIG. 18

The processing of pronouns is similar to that of nouns described above with reference to FIG. 3 except that the searches for the codes "an" and "dn" carried out when processing a noun are omitted when processing a pronoun.

Figure 19:
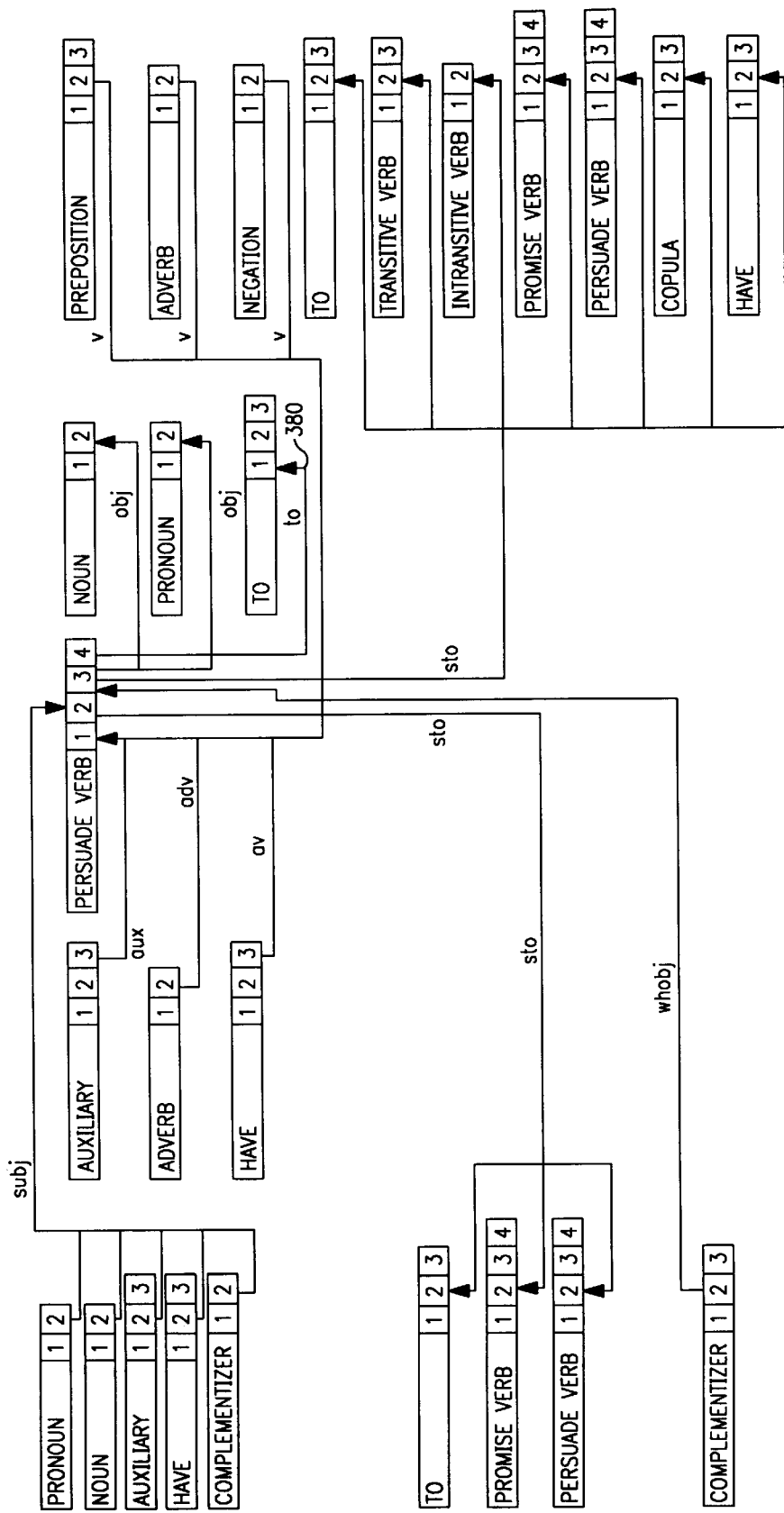

Persuade Verbs—FIG. 19

Processing of a persuade verb is similar to that of a promise verb described above with reference to FIG. 15, the only difference being that in the case of persuade verbs the search code "sto" is associated with the third argument of the meaning of the persuade verb when placed in the search space 140 rather than the second argument thereof as is the case with promise verbs.

Figure 20:
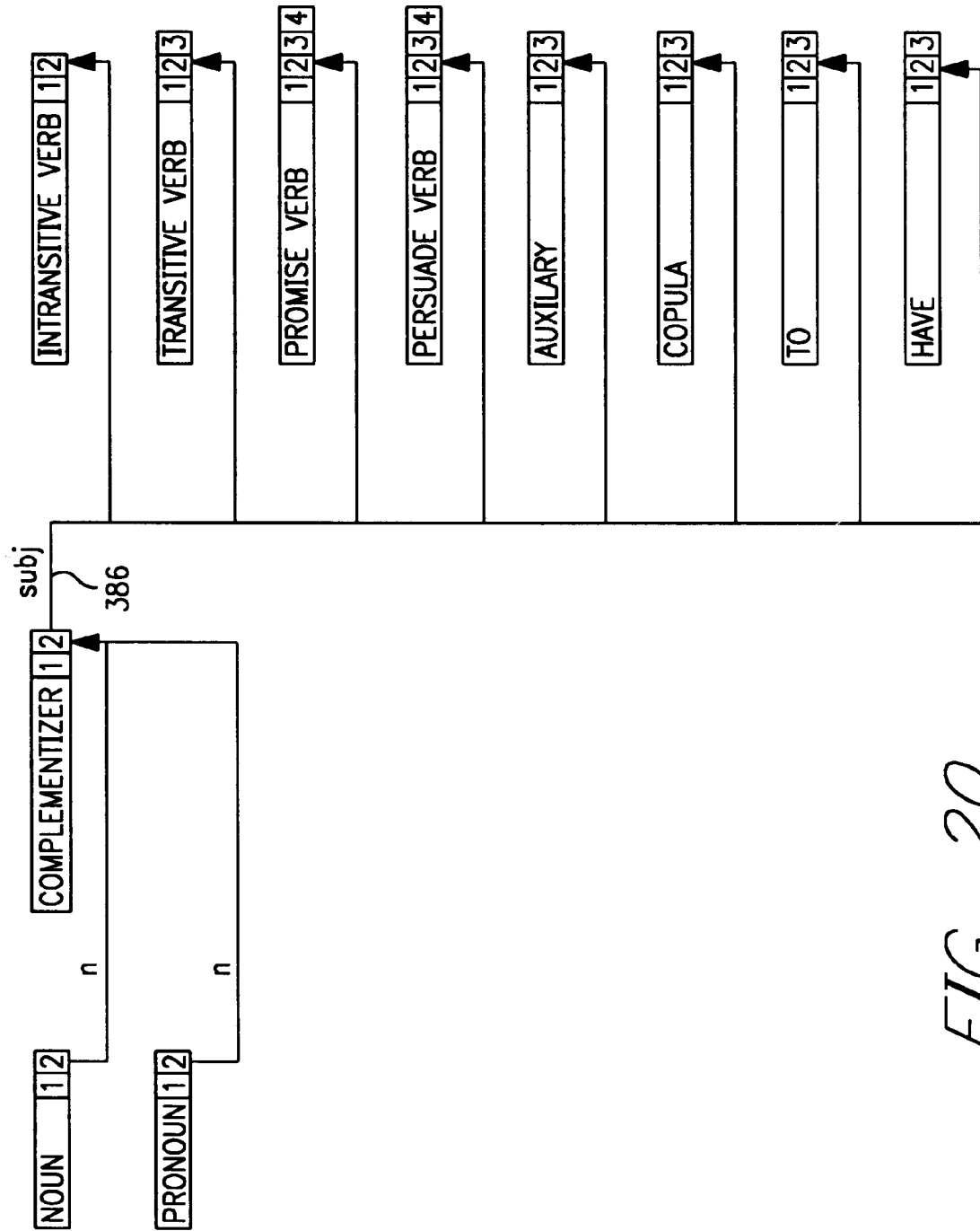

Complementizer—FIG. 20

Arrows 382 and 384 indicate bindings which may be formed between the meaning of a current complementizer and the meanings of previous words as a result of searches for the code "n" performed in response to the processing of the current complementizer. The search for the code "n" is terminated on finding the first occurrence thereof.

Processing of a complementizer results in the storage of a code "subj" in the search space 140. Arrow 386 represents possible future bindings as a result of searches for this code by future words of the different categories indicated.

Meanings With Two or More Predicates

The above description of processing with reference to Table 2 and FIGS. 3 to 20 has not dealt with processing of words whose meanings have more than one predicate. The way in which such meanings are processed will be understood by treating the high-lighted block in each of those drawings as representing the first of the predicates in the list of plural predicates in the relevant meaning. Thus, for example, the meaning of the word "turned" is:

turn(1,2,3)

past(_,1)

as can been seen from Table 1. The word "turned" is a past tense of the transitive verb "turn". The first predicate in the list for the meaning of "turned" is "turn(1,2,3)" and the argument numbers given in Table 2 and shown in FIG. 8 for transitive verbs should be taken as applying to the arguments of the predicate "turn(1,2,3)". As already noted when describing the lexicon, the insertion of the number "1" in the second argument of the predicate "past(_,1)" indicates that the value assigned to this argument will be the same as the value assigned to the first argument of the predicate "turn (1,2,3)". These comments apply to other categories of word whose meanings comprise more than one predicate.

Ambiguities The input signal processor 122 is arranged for handling ambiguities of the kind which arise when a sentence, clause or phrase contains a word which can, as a result of the grammar, be taken as being linked to two or more other words in the sentence, clause or phrase giving rise to two or more different interpretations of that sentence, clause or phrase. In some cases the ambiguous link may be between a particular word and two or more preceding words in the sentence, clause or phrase. In other cases, the ambiguous link may arise between a particular word and two or more subsequent words in the sentence, clause or phrase. An example of the former ambiguous link has already been given in discussing the sentence "activate the camera on the third floor" i.e. the word "on" is ambiguously linkable either to the word "activate" or the word "camera". An example of the latter is the sentence "activate the third camera switch". In this sentence, the word "third" could be read as qualifying the noun "switch" as a result of which the interpretation of the sentence would be "activate the third switch of the camera". Alternatively, the adjective "third" could be read as linked to or qualifying the noun "camera" in which case the interpretation of the sentence would be "activate the switch of the third camera". Thus, some words ambiguously qualify preceding words and other words ambiguously qualify future words in the sentence, clause or phrase of which they form a part. Yet further words can be linked unambiguously to two or more other words. For example, in the sentence "the switch controls the camera" the transitive verb "controls" unambiguously qualifies both the noun "switch", which forms the subject of the verb, and the noun "camera" which forms the object of the verb.

The bindings discussed above are used for defining the ambiguities which are permitted. In particular, in the example "activate the camera on the third floor" and from consideration of Table 2, it can be seen that the following binding defines the link between the meaning of the transitive verb "activate" and the meaning of the preposition "on":

909=901

It can also be seen that the following binding defines the link between the meaning of the noun "camera" and the meaning of the preposition "on":

909=907.

Thus, these two bindings together indicate the ambiguity since the value 909 which belongs to the word "on" is indicated as equated to, on the one hand, the value 901 which belongs to the word "activate" and, on the other hand, to the value 907 which belongs to the word "camera". For convenience, bindings referring to ambiguous links will be written as follows:

909=907,901.

Since some words can unambiguously qualify two or more other words, a means for distinguishing ambiguous bindings from unambiguous bindings is needed. In the present embodiment ambiguity may be identified by the fact that there are two or more bindings with common argument values on the left-hand side (whereas common argument values (if any) on the right-hand side of bindings are not indicative of there being an ambiguity). It can be seen that the two bindings 909=901 and 909=907 given above as examples follow this convention.

When designing a system according to the invention, it is thus possible to decide or determine in the grammar to be used which categories of word may qualify and/or be qualified by other categories of word and to assign accordingly an appropriate number of arguments to the meanings and to construct accordingly the instructions of table 138 to ensure that undesired ambiguities are prevented and desired ambiguities are preserved and defined.

EXAMPLE 1

The following example will more fully explain the operation of the analyser 128 and the building up of Table X.

In this Example, it is assumed that the lexicon is as set out in Table 1, table 138 contains the data set out in Table 2 and the identifiers assigned to incoming words begin at the number 900. The way in which the input sentence "the guard activated the camera on the third floor"

is processed will be described assuming that initially store 10 and sections 134, 140 and 142 of Table X have been cleared. It is also assumed that the computer 100 is arranged so that characters input via the keyboard 116 are stored in the input buffer 130 and that processing of the resulting words by the analyser module 128 is initiated by striking the conventional space bar on the keyboard.

The words are input in sequence beginning with the word "the" and ending with the word "floor" via the keyboard 106. When the space bar is pressed, the analyser module 128 takes the first word "the", accesses the input lexicon 132 and stores the corresponding meaning in the current meaning section 134 in the form "the(900,901)".

The analyser module 128 accesses table 138 to obtain instructions for dealing with determiners. The second column of Table 2 indicates that no searches should be performed in the search space 140. In any case, the search space 140 is empty, the word "the" being the first word input. Column 5 of Table 2 indicates that the search code "dn" is to be associated with the value assigned the second argument of the meaning of the determiner and that this code and its associated value should be stored in the search space 140. Thus, the analyser module 128 inserts the data "dn/901" in search space 140. At this point the contents of Table X are:

| | |
|---|---|
| current meaning: | the(900,901) |
| search space: | dn/901 |
| bindings: | nil |

Having completed the above steps in relation to the word "the", the analyser module 128 next processes the word "guard". Lexicon 132 is accessed to obtain the meaning. It can be seen from Table 1 that the meaning of a noun has two arguments and thus the analyser 128 assigns the next two numbers in the sequence of values to these arguments, these being 902 and 903. Thus, the data "guard(902,903)" is inserted in the current meaning section 134 of Table X.

The second column of Table 2 indicates that four searches of the search space 140 should be performed when a noun is received. The first search is for the search code "an". In this example, such a search code has not been inserted in search space 140 previously and thus this search results in no further action.

The second search that should be performed as a result of receipt of the noun "guard" is for the search code "dn". Since the data "dn/901" was inserted in the search space 140 when the determiner "the" was processed, this search will locate that code, as a result of which the analyser 128 will define a link between the meaning of the word "the" and the meaning of the word "guard". This link is defined by storing the binding 901=902 in the section 142 of Table X. As indicated by the data in Table 2, this binding is derived by taking the value (901) of the second argument of the meaning of the determiner and equating it with the first argument (902) of the meaning of the noun. The "R" indicates that the argument of the meaning of the noun should be placed on the right hand side of the equation which forms the binding. This search, having found the code "dn", is then terminated so that even if there were any further previous codes "dn" this search would not proceed to the stage at which they would be found. The third search to be performed following receipt of the noun "guard" as indicated by Table 2 is for the search code "obj" in the search space 140. In this example, such a search code has not been inserted in the search space 140 previously and thus the second search results in no further action. The third search to be performed is for the code "prd" and, again, this search results in no further action.

The fifth column of Table 2 indicates that the search codes "n" and "subj" each together with a value assigned to the second argument of the meaning of the noun should be stored in search space 140. First, the analyser module 128 stores the data "n/903" and then "subj/903" in the search space 140. At this point, therefore, the contents of Table X are as follows:

| current meaning: | the(900,901) |
| --- | --- |
|  | quard(902,903) |
| search space: | dn/901 |
|  | n/903 |
|  | subj/903 |
| bindings: | 901=902 |

The analyser module 128 then accesses the input lexicon 132 for the word "activated" and stores the corresponding meaning in the current meaning section 134 in the form "activate(904,905,906)" followed by "past(__,904)". The analyser module then accesses table 138 to obtain instructions for dealing with transitive verbs. The second column of Table 2 indicates that six searches should be performed in search space 140, namely searches for the search codes "aux", "adv", "subj", "sto", "whobj" and "n". The first and second search to be performed as a result of receipt of the transitive verb "activate" are for the codes "aux" and "adv" in the search space 140. In this example, such search codes have not been inserted in the search space 140 previously and thus the first and second searches result in no further action. The third search to be performed following receipt of the transitive verb "activate" as indicated by Table 2 is for the search code "subj" in the search space 140. When the noun "guard" was received, the data "subj/903" was inserted in the search space 140 and accordingly this search locates this code. Analyser module 128 thus inserts the binding 903=905 in section 142 of Table X. This search is then terminated.

The fourth and fifth searches to be performed following receipt of the transitive verb "activate" as indicated by Table 2 are the for the codes "sto" and "whobj" respectively in the search space 140. In this example, such search codes have not been inserted in the search space 140 previously and thus the fourth and fifth searches result in no further action.

The sixth search to be performed following receipt of the transitive verb "activated" as indicated by Table 2 is for the code "n" in the search space 140. When the noun "guard" was received, the data "n/903" was inserted in search space 140 and accordingly this search locates this code. Inspection of the third column of Table 2 indicates that no binding should be made as a result of locating this code but, instead, as indicated by the sixth column of Table 2, the located code will be removed from the search space 140. In addition, the sixth column of Table 2 indicates that if the search code "subj" has been found or if the search code "sto" has been found, that these codes and their associated values should be removed from the search space 140. The fifth column of Table 2 indicates that the search code "v" is to be associated with the value assigned to the first argument of the meaning of the transitive verb and that the search code "obj" is to be associated with the value of the third argument of the meaning of the transitive verb, and that these search codes and associated values should be stored in search space 140 after performance of the previously mentioned searches. Thus, after completion of those searches analyser module 128 inserts the data "v/904" and "obj/906" in search space 140. At this point the contents of Table X are:

| current meaning: | the(900,901) |
| --- | --- |
|  | guard(902,903) |
|  | activate(904,905,906) |
|  | past(__,904) |
| search space: | dn/901 |
|  | v/904 |
|  | obj/906 |
| bindings: | 901=902 |
|  | 903=905 |

Having completed the above steps in relation to the word "activate", the analyser module 128 next processes the word "the". Lexicon 132 is accessed to obtain the meaning. It can be seen from Table 1 that the meaning of a determiner has two arguments and thus analyser 128 assigns to these arguments the next two numbers in the sequence of values, these being 907 and 908. Thus, the data "the (907,908)" is inserted in the current meaning section 134 of Table X.

Analyser module 128 also accesses table 138. Table 2 shows that no searches for previous search codes in search space 140 are performed when processing determiners. However, the fifth column of Table 2 indicates that the search code "dn" together with the value assigned to the second argument of the meaning of the determiner should be stored in search space 140. Thus, the analyser module 128 stores the data "dn/908" in search space 140. The absence from the sixth column of Table 2 of any codes relating to determiners indicates that nothing should be removed from the search space 140 when a determiner is received. At this point the contents of Table X are:

| current meaning: | the(900,901) |
| --- | --- |
|  | guard(902,903) |
|  | activate(904,905,906) |
|  | past(__,904) |
|  | the(907,908) |

-continued

| | |
|---|---|
| search space: | dn/901 |
| | v/904 |
| | obj/906 |
| | dn/908 |
| bindings: | 901=902 |
| | 903=905 |

The analyser 128 next processes the word "camera". Lexicon 132 is accessed to obtain the meaning of the word "camera". Lexicon 132 indicates that "camera" is a noun and that the meaning of a noun is assigned two arguments. Analyser module 128 accordingly assigns the next two identifiers in the sequence, namely the numbers 909 and 910, to the first and second arguments of the meaning of "camera" and stores the data "camera(909,910)" in the current meaning section 134 of Table X.

The second column of Table 2 indicates that four searches of the search space 140 should be performed when a noun is received. The first search to be performed as a result of receipt of the noun "camera" is for the search code "an" in the search space 140. In this Example, such search code has not been inserted in search space 140 previously and thus the second search results in no further action.

The second search is for the search code "dn". Since the data "dn/908" was inserted in search space 140 when the determiner "the" was processed, this search will locate that code as a result of which analyser 128 will define a link between the meaning of the word "the" and the meaning of the word "camera". This link is defined by storing the binding 908=909 in section 142 of Table X. As indicated by the data in Table 2, this binding is derived by taking the value (908) of the second argument of the meaning of the determiner and equating it to the first argument (909) of the meaning of the noun. The R indicates that the argument of the meaning of the noun should be placed on the right hand side of the equation which forms the binding. This search, having found the code "dn", is then terminated so that even if there were any further previous codes "dn" this search would not proceed to the stage at which they would be found.

The third search to be performed following receipt of the noun "camera" as indicated by Table 2 is for the search code "obj" in the search space 140. When the transitive verb "activate" was received, the data "obj/906" was inserted in search space 140 and accordingly this search locates this code. Analyser module 128 thus inserts the binding 906=910 in section 142 of Table X. This search is then terminated.

The fourth search to be performed following receipt of the noun "camera" as indicated by Table 2 is for the code "prd" in the search space 140. In this example, such search codes have not been inserted in the search space 140 previously and thus the fourth search results in no further action.

The fifth column of Table 2 indicates that the search code "n" and "subj" each together with the value assigned to the second argument of the meaning of the noun should be stored in search space 140. The analyser module 128 stores the data "n/910" and "subj/910" in the search space 140. At this point, therefore, the contents of Table X are as follows:

| | |
|---|---|
| current meaning: | the(900,901) |
| | guard(902,903) |
| | activate(904,905,906) |
| | past(_,904) |
| | the(907,908) |
| | camera(909,910) |

| | |
|---|---|
| search space: | dn/901 |
| | v/904 |
| | obj/906 |
| | dn/908 |
| | n/910 |
| | subj/910 |
| bindings: | 901=902 |
| | 903=905 |
| | 908=909 |
| | 906=910 |

The next word to be processed is the word "on". The analyser module 128 accesses the lexicon 132 and stores the data "on(911,912,913)" in the current meaning section 134 of Table X.

The analyser module 128 then performs the first of the four searches indicated for prepositions in Table 2, namely a search of the search space 140 for the search code "v".

Since the data "v/904" was inserted in search space 140 when processing the transitive verb "activate", this search locates the search code "v" in search space 140. The analyser module 128 then defines the link between the meaning of the transitive verb "activate" and the meaning of the word "on", by inserting the binding 912=904 in the section 142 of Table X.

The second search performed when the received word is a preposition is for the search code "n" in the search space 140. This search locates the data "n/910" which was inserted in the search space when processing the previous word "camera" which is a noun. The analyser module 128 has thus identified that the word "on" can either qualify the word "camera" or the word "activate". Linguistically, either possibility may be correct since, as already explained above, there is, upon linguistic analysis, an ambiguity in the sentence being processed. In the present embodiment, such ambiguities are represented in the bindings. Thus, at this point, the previously inserted binding 912=904 is modified to be 912=904,910, thus preserving the ambiguity which may be resolved in future processing.

The third search, for the code dn, is then performed. This search locates the entry "dn/908". However, an instruction represented by "x" is stored in Table 2 so that no binding is formed, it being arranged that x will be different from any value which can be assigned to any of the arguments during processing, and Table 2 indicates that the entry "dn/908" should at this point be removed from the search space. The fourth search, for the code "prd", is then performed. In this example, there is no occurrence of this code in the search space 140 and thus the fourth search results in no further action.

The analyser module then inserts the entry "obj/913" in the search space 140 in accordance with the instruction in the fifth column of Table 2.

At this point, therefore, the contents of Table X are as follows:

| | |
|---|---|
| current meaning: | the(900,901) |
| | guard(902,903) |
| | activate(904,905,906) |
| | past(_,904) |
| | the(907,908) |
| | camera(909,910) |
| | on(911,912,913) |
| search space: | dn/901 |
| | v/904 |
| | obj/906 |
| | n/910 |

```
            subj/910
            obj/913
bindings:   901=902
            903=905
            908=909
            906=910
            912=904,910.
```

After the word "on" has been processed as described above, the next word, "the", is processed. From consideration of the above description and tables, it can be deduced that at completion of the processing of the word "the", the contents of Table X are as follows:

```
current meaning:   the(900,901)
                   guard(902,903)
                   activate(904,905,906)
                   past(_,904)
                   the(907,908)
                   camera(909,910)
                   on(911,912,913)
                   the(914,915)
search space:      dn/901
                   v/904
                   obj/906
                   n/910
                   subj/910
                   obj/913
                   dn/915
bindings:          901=902
                   903=905
                   908=909
                   906=910
                   912=904,910
```

As can be seen from the above, although the data "dn/915" has been added to the search space, no binding has been inserted as a result of the processing of the word "the" since, as discussed previously, determiners do not initiate searching of the search space.

Processing of the word "third" results, as can be deduced from the above description and tables, in the contents of Table X being as follows:

```
current meaning:   the(900,901)
                   guard(902,903)
                   activate(904,905,906)
                   past(_,904)
                   the(907,908)
                   camera(909,910)
                   on(911,912,913)
                   the(914,915)
                   third(916,917)
search space:      dn/901
                   v/904
                   obj/906
                   n/910
                   subj/910
                   obj/913
                   dn/915
                   an/917
bindings:          901=902
                   903=905
                   908=909
                   906=910
                   912=904,910
```

Because the word "third" is treated as an adjective by this grammar, there is again no change in the list of bindings as no binding is formed as a result of the searching which is performed. The processing of adjectives results in the search code "an" with the appropriate value being inserted in the search space.

Processing of the word "floor", which is the last word of the sentence, results in the contents of Table X being as follows:

COMPLETE TABLE X

```
current meaning:   the(900,901)
                   guard(902,903)
                   activate(904,905,906)
                   past(_,904)
                   the(907,908)
                   camera(909,910)
                   on(911,912,913)
                   the(914,915)
                   third(916,917)
                   floor(918,919)
search space:      dn/901
                   v/904
                   obj/906
                   n/910
                   subj/910
                   obj/913
                   dn/915
                   an/917
                   n/919
                   subj/919
bindings:          901=902
                   903=905
                   908=909
                   906=910
                   912=904,910
                   917=919
                   915=918
                   913=919
```

As can be seen, the processing of the word "floor" resulted in three additional bindings being added to the bindings section 148 of space 136. This completes the building of Table X for the sentence "the guard activated the camera on the third floor".

By way of summary the origin of the bindings in the bindings list is as follows:

1) The binding 901=902 has been defined as a result of the grammatical link between the first occurrence of the determiner "the" and the noun "guard" in the input sentence.
2) The binding 903=905 has been defined as a result of the grammatical link between the transitive verb "activate" and the noun "guard" in the input sentence.
3) The binding 908=909 has been defined as a result of the grammatical link between the first occurrence of the determiner "the" and the noun "camera" in the input sentence.
4) The binding 906=910 has been defined as a result of the grammatical link between the transitive verb "activate" and the noun "camera" in the input sentence.
5) The binding 912=904,910, which of course indicates an ambiguity, has been defined as a result of the ambiguous links between the word "on" and the words "camera" and "activate" in the input sentence.
6) The binding 917=919 has been defined as a result of the grammatical link between the second occurrence of the determiner "the" and the noun "floor" in the input sentence.
7) The binding 915=918 has been defined as a result of the grammatical link between the adjective "third" and the noun "floor" in the input sentence.
8) The binding 913=919 has been defined as a result of the grammatical link between the word "on" and the noun "floor" in the input sentence.

It will be understood from the above description that the representation of meaning consists of an unordered set of elements of meaning. Each such element of meaning, represented by a predicate with arguments, indicates a situation and the participants therein. The type of the situation is indicated by the predicate name and the number of arguments of the predicate.

A participant in a situation is represented by an identifier which fills one argument position of the predicate representing that situation. Each such participant bears a different role and this is reflected in the representation by the argument position filled by the identifier of that participant. Moreover, an additional argument position is filled by an identifier representing the situation itself. For example, a situation such as John seeing Mary will be represented by a predicate with three arguments where these arguments are identifies for the person John, the person Mary and the event of seeing. The name of the predicate representing this situation could be "see". If the identifier for John is "j", the identifier for Mary is "m" and the identifier of the seeing event is "s" then the situation of John seeing Mary is represented as follows:

see(s,j,m)

This predicate could be one of the elements of the meaning representation of a sentence such as "John saw Mary", where the event of seeing took place in the past. If "p" is the identifier for the situation of the seeing event being in the past then the meaning of this sentence could be represented as:

see(s,j,m)
past(p,s)

This may be referred to as the meaning representation of the sentence.

Execution of Bindings

The purpose of this step is to integrate the information represented by the bindings in Table X with each relevant element of the meaning representation. To achieve this, the analyser module 128 takes each binding in turn and, provided the binding does not indicate an ambiguity, firstly, unifies the corresponding values in the current meaning section 134 by making the value in the current meaning list which corresponds to the right-hand side of the binding have a value the same as the value on the left hand side of the binding. In addition, the analyser module 128 searches the remaining bindings in bindings section 142 for any other bindings which include the same value as the right hand side of the binding currently being executed and changes such other value to a value corresponding to that of the left hand side of the binding being executed. In other words, if the binding a=b is being executed, all occurrences of the value "b" in the current meaning section 134 and the remaining bindings are changed to the value "a".

The analyser module 128 executes the remaining bindings one by one in the same way, except for any bindings indicating ambiguities. This process will be more fully understood by consideration of the execution of the bindings of Example 1 above.

Thus, continuing with the description of Example 1 from the point at which Table X was completed as described above, in order to execute the bindings analyser module 128 takes the first binding from section 142 which in the above Example is 901=902, locates in the current meaning section 134 any occurrences of the value "902" and changes that value to the value "901". Thus, since in the above Example, the current meaning section contains the data "guard(902, 903)" this is changed to "guard (901,903)".

In addition, the analyser module 128 searches the remainder of the list of bindings (in this Example starting with the binding 903=905 and going through to the bottom of the binding list). Since there is no other occurrence of the value 902 in the bindings, no changes are made at this stage in this example in the binding list. Having completed processing of the first binding in the binding list, that binding is abandoned. Thus, at this point the contents of the current meaning section 134 and binding section 142 of Table X are as follows:

| | |
|---|---|
| current meaning: | the(900,901) |
| | guard(901,903) |
| | activate(904,905,906) |
| | past(_,904) |
| | the(907,908) |
| | camera(909,910) |
| | on(911,912,913) |
| | the(904,905) |
| | third(916,917) |
| | floor(918,919) |
| bindings: | 903=905 |
| | 908=909 |
| | 906=910 |
| | 912=904,910 |
| | 917=919 |
| | 915=918 |
| | 913=919 |

After processing of the first binding in the list in this way, analyser module 128 processes the second binding in the same way, namely the binding 903=905. This processing results firstly in the data "activate(904,905,906)" currently in the current meaning section 134 being changed to "activate(904,903,906)". There is no other occurrence of the binding 905 in the current meaning section 134. The analyser module then proceeds to process the bindings 908=909 in a similar manner resulting in the data "camera(909,910)" being changed to "camera(908,910)". There is no other occurrence of the binding 909 in the current meaning section 134. The analyser module then takes the fourth binding in the list namely the binding 906=910. This process results firstly in the data "camera(908,910)" being changed to "camera(908,906)". There is no other occurrence of the binding 910 in the current meaning section 134. The analyser module then proceeds to unify the value 910 with the value 906 in all bindings so far unprocessed, starting with the binding 912=904,910, this thus being changed to 912= 904,906. After processing the fourth binding, this binding is abandoned and the contents of the current meaning section and binding section of Table X are thus as follows:

| | |
|---|---|
| current meaning: | the(900,901) |
| | guard(901,903) |
| | activate(904,903,906) |
| | past(_,904) |
| | the(907,908) |
| | camera(908,906) |
| | on(911,912,913) |
| | the(914,915) |
| | third(916,917) |
| | floor(918,919) |
| bindings: | 912=904,906 |
| | 917=919 |
| | 915=918 |
| | 913=919 |

The next binding in the list is 912=904,906 (which in the original bindings list was 912=904,910) and this indicates an ambiguity. Bindings indicating ambiguities are not processed but are simply preserved in the bindings list and will be subject to any further unification which arises from execution of any subsequent bindings in the list.

Accordingly, the analyser module 128 takes the next binding in the list, which is 917=919, performs unification on both the current meaning list and the binding list as described above and then removes that binding from the bindings list, as a consequence of which steps the contents of the current meaning and binding sections of Table X become:

| | |
|---|---|
| current meaning: | the(900,901) |
| | guard(901,903) |
| | activate(904,903,906) |
| | past(_,904) |
| | the(907,908) |
| | camera(908,906) |
| | on(911,912,913) |
| | the(914,915) |
| | third(916,917) |
| | floor(918,917) |
| bindings: | 912=904,906 |
| | 915=918 |
| | 913=917 |

After similar processing of the remaining two bindings, namely 915=918 and 913=917 (previously 913=919), in turn as described above, the contents of the current meaning section and binding section of Table X become:

| | |
|---|---|
| current meaning: | the(900,901) |
| | guard(901,903) |
| | activate(904,903,906) |
| | past(_,904) |
| | the(907,908) |
| | camera(908,906) |
| | on(911,912,913) |
| | the(914,915) |
| | third(916,917) |
| | floor(915,913) |
| bindings: | 912=904,906 |

If, as in the above example, there are ambiguities, the analyser module 128 deals with each possible interpretation in turn.

The first interpretation is obtained by taking one of the possible equalities from the binding representing the ambiguity, unifying the identifiers in the arguments stored in Table X and then storing the resulting interpretation in table 144. Thus, taking the data of Example 1 as shown in Table X above, one of the equalities represented by the ambiguity:

912=904,906 is

912=906 and unification is performed by replacing any occurrence of the identifier 912 in the arguments of the current meaning by the identifier 906. Thus, in Example 1, the data written into table 144 is as set out below in Table B(1).

Again referring to Table X above, the other equality represented by the ambiguity:

912=904,906 is

912=904.

When the interpretation represented by this equality is processed, unification is performed by replacing any occurrence of the identifier 912 in the arguments of the current meaning by the identifier 904 and thus, in Example 1, the data written into table 144 is as set out below in Table B(2).

TABLE B(1)

the(900,901)
guard(901,903)
activate(904,903,906)
past(_,904)
the(907,908)
camera(908,906)
on(911,906,913)
the(914,915)
third(916,913)
floor(915,913)

TABLE B(2)

the(900,901)
guard(901,903)
activate(904,903,906)
past(_,904)
the(907,908)
camera(908,906)
on(911,904,913)
the(914,915)
third(916,913)
floor(915,913)

When the analyser module 128 has completed its processing of the input, it signals this fact to a dialogue manager 160. The dialogue manager then signals to an ambiguity processor 162 which is arranged to resolve the ambiguities which exist in the output of the input signal processor 122. The ambiguity processor 162 performs no part of the present invention but is capable of determining which interpretation of the input data should be processed by the output signal processor 124. In the above example, the data contained in Table B1 is chosen. The ambiguity processor 162 may be arranged to choose an interpretation at random or may carry out more sophisticated processing, for example, using a reasoner and a knowledge base. Accordingly, the ambiguity processor 162 replaces the data represented in Tables B1 and B2 in table 144 with the results of its processing. These results are represented below in Table C:

TABLE C the(900,901)
guard(901,903)
activate(904,903,906)
past(_,904)
the(907,908)
camera(908,906)
on(911,906,913)
the(914,915)
third(916,913)
floor(915,913)

At this point the ambiguity processor 162 signals to the dialogue manager that its processing is complete.

Incrementality

It will be understood from the above description that as each word is input, it is processed by the analyser module 128 without having to wait for all of the words in a group such as a phrase, clause or sentence to be received before any processing can start. It has been indicated above that, up to this point, it is assumed that each word is taken from the input buffer 130 in response to pressing of the space bar. It has also been assumed that, up to this point, the processing consists of, firstly, building up the lists of meanings in current meaning section 134 and the bindings in section 142 of memory area 136 and, secondly, execution of the bindings and that not until these two processes have been completed will any subsequent processing take place. It is practical for the invention to be arranged to operate in this way in the present embodiment. Preferably, the dialogue manager 160 included in the interface 126 is the means by which the analyser module 128 is activated to obtain the next word from the input buffer 130, the dialogue manager 160 thus being responsive to the pressing of the space bar. The dialogue manager 160 may also be responsive to the pressing of the return key and/or the full-stop (period) key for transferring the meanings and ambiguities from memory area 136 to table 144, after which memory area 136 would be cleared to prepare it for the processing of a new group of words.

Although in the above description it has been assumed that the bindings are executed only after all of them in the current group of words have been formed, it is possible and in many cases will be preferable, in order to achieve maximum processing speed, for the bindings to be executed as they are formed and for the current meanings with the bindings executed to date to be passed on for further processing without waiting for receipt and processing of all of the words in the group. When this procedure is adopted, the subsequent processing may, at any given time, be operating on the basis of the current meaning to date, but this may change as further words are processed. The possibility of such incremental operation is a significant advantage of the present invention.

Manipulation of Table 138

In the above description, it has been explained both in general terms and by way of specific example in Example 1 how the data in table 138 (Table 2) is utilised to control the processing of signals derived from words input to the system through the keyboard in order to derive the bindings which are stored in section 142 of Table X dependent upon the grammar of the input language. The data in table 138 can be manipulated to take into account other grammars and/or to meet the needs of alternative applications of the invention.

For example, the data set out in Table 2 above is such that ambiguities may be defined if the current word is a preposition. These ambiguities are defined because, as shown in Table 2 above, when the current word is a preposition:

a) a search for the search codes stored in response to more than one previous word category takes place, in particular a search for the search codes stored in response to transitive verbs, intransitive verbs, "to verbs", auxiliary verbs, copulas and "have" and a search for search codes stored in response to previous nouns or pronouns are all performed.

b) the characters 2 and L in the third and fourth columns respectively of Table 2 indicate that, firstly, the second argument of the meaning of the preposition is to be used for bindings formed as a result of these searches and, secondly, the value of the second argument of the preposition is to be placed on the left-hand side of the bindings.

If, in any particular application of the invention, it were desired to prohibit the definition of bindings as a consequence of a link between a preposition and a preceding verb, and only to permit bindings to be formed as a result of a link between the current preposition and a preceding noun, one or both of the two search instructions v or n could be omitted from the entries in column 2 of Table 2 relating to prepositions. Alternatively, if for some reason in a particular application of the invention it were desired to define unambiguous bindings between the meaning of a preposition and the meaning of a number of previous words of different categories, the instructions in Table 2 could be appropriately modified. One possible such modification would be to arrange that different arguments of the meaning of the preposition are used for the bindings defining links to previous word meanings of different categories. An alternative possible such modification would be to use the same argument of the meaning of the current preposition for defining bindings to two or more different categories of previous word meanings but rearrange the designations "L" and "R" in the table.

Thus, from the above explanation, the manner in which the data in Table 2 can be manipulated to provide for or prevent, as required, the possibility of defining ambiguous bindings between the meaning of a current word of a given category and the meaning of previous words will be understood.

The data in Table 2 can also be manipulated to provide for or prevent, as required, the possibility of bindings defining ambiguous links between a given word and two or more future words. For example, the data shown in Table 2 above permits the definition of ambiguous bindings between an adjective and two or more future nouns because each noun, as it is processed, causes a search for the search code "an" inserted in the search space 140 as a consequence of processing of any previous adjective. To prevent such ambiguous links, Table 2 could be modified by inserting the instruction an/2 in the fifth column of Table 2 in the line relating to nouns. In this way, if a noun were processed and the search locates the search code of the previous adjective, that search code would be disabled so that a binding relating to that previous adjective cannot be formed with any future further noun (or any other category of future word which, on receipt, might initiate a search for the search code of a previous adjective).

A form of ambiguity so far not discussed is that which may arise between just two words, for example, an adjective followed by a noun. For example, the phrase "good historian" could mean either a historian who is a good person or a person who is good at history. Table 2 may be manipulated to provide for the definition of such ambiguities. Such definition could be achieved by arranging that, when a noun is processed, if the search code "an" is found in the search, the resulting binding, instead of being made only with the second argument of the meaning of the noun, could be made both with the first argument and the second argument thereof. Since the result of this would be that the value associated with the stored search code "an" would be placed on the left of two bindings, one in which it is equated with the value of the first argument of the meaning of the noun and the other where it is equated with the value of the second argument of the meaning of the noun, an ambiguity would be defined in accordance with the convention described above.

Thus, the data in Table 2 can be manipulated to take into account the grammar of any language. Nevertheless, consideration of the grammar used in the illustrated embodiment of the invention will disclose that a complete grammar of the English language is not utilised but rather a simplified version of such grammar is employed. In fact, the complete grammar of a language such as English is extremely complex and it should, therefore, be understood that in practising the present invention it is not essential to take into account all of the complexities which would arise in a complete grammar but, as indeed illustrated by the preferred embodiment, simplified grammars can have considerable utility. The derivation of an embodiment of the invention which processes a language in accordance with more complex grammars, such as a more complete grammar of the English language, can nevertheless be achieved by manipulation of Table 2, if necessary after experimenting with various different possibilities.

Output Signal Processor

The output signal processor 124 is arranged to process the meaning representation produced by the input signal processor 122 and contained in table 144. From that meaning representation the output signal processor is arranged to produce output in the output natural language. The output signal processor 124 comprises a generator module 146 and a verbaliser module 148 both of which utilise a data structure 150 to store the results of each stage of the processing. The data structure 150 is built up by the generator module 146 from one or more basic elements herein termed "nodes" which are used to store data relating to the processing of each element of the meaning representation stored in table 144 by the output signal processor 124.

The generator module 146 is operable to perform the following five steps:

1. To access table 144 in response to a signal received from the dialogue manager 160 and obtain an element of meaning therefrom;
2. To obtain from a table 152, a word that represents that meaning in the output natural language and, where present in table 152, instructions for the future processing of that word, to create a new node and to store said word and instructions in that node;
3. To search the data structure 150 in accordance with a predetermined search strategy to identify an appropriate point in the data structure at which to insert the newly created node, said identification being governed by rules stored in table 154;
4. Inserting the node at the identified point in the data structure and carrying out further processing of the data structure in accordance with rules set out in table 156 and updating the data structure accordingly; and
5. Signalling to the verbaliser module 148 to indicate that the data structure 150 has been updated.

In response to the signalling of step 5 above, the verbaliser module 148 is operable to perform the following two steps:

1. To access the updated data structure 150 and process each node in a predetermined order and in accordance with instructions contained in table 158 to produce an output, from a node, which may be a word in the output language; and
2. To place any output language word so produced in the output buffer 160.

The generator module 146 obtains each element of meaning in turn from table 144 and upon obtaining each such meaning, refers to the look up table 152 herein termed an output language lexicon. The output language lexicon contains a list of all the meanings which may be processed by the generator module 146 and an indication of the basic form of the word to be used in the output natural language to represent that meaning, herein termed a string. In addition to the word corresponding to an input meaning, the output language lexicon also defines the grammatical category of the word in the output natural language. Again, as for the input signal processor 122 described above in this embodiment, although the output language lexicon need only contain a relatively small vocabulary and may only utilise words in a few categories, the output signal processor 124 is preferably arranged as a general purpose system which can be used in many different applications. For this purpose, the output language lexicon is preferably structured for containing words of the output language of the following categories:

Intransitive verbs,
Transitive verbs,
Auxiliary verbs,
Copulas,
"to" (the infinitive type of particle as used in infinitives and as a category in itself),
Adverbs,
Intensifiers,
Adjectives,
Nouns,
Prepositions,
Negations,
Quantifiers,
the verbs "promise" and "persuade" as categories in themselves herein termed "to verbs",
the verb "have" as a category in itself,
Determiners,
Pronouns,
Interjections,
Complementizers.

The above categories will be adequate for many applications. However, other categories of words may be provided for if desired.

In addition to containing an indication of the categories of the words used to represent an input meaning, the output language lexicon 152 may contain further instructions and information for use in later processing which define, for example, modifications to be made to the string to put it into the correct form for output i.e. the correct surface form.

By way of example, the contents of the output language lexicon 152 may be as set out below in Table 3:

TABLE 3

| INPUT MEANING PREDICATE | OUTPUT LANGUAGE WORD CATEGORY | SET | STRING | REQUIREMENT |
| --- | --- | --- | --- | --- |
| arrive | intransitive verb | | arrive | |
| bark | intransitive verb | | bark | |
| die | intransitive verb | | die | |
| disappear | intransitive verb | | disappear | |
| ducking | intransitive verb | | duck | |
| go | intransitive verb | | go | |
| hear | intransitive verb | | hear | |

TABLE 3-continued

| INPUT MEANING PREDICATE | OUTPUT LANGUAGE WORD CATEGORY | SET | STRING | REQUIREMENT |
|---|---|---|---|---|
| jump | intransitive verb | | jump | |
| laugh | intransitive verb | | laugh | |
| look | intransitive verb | | look | |
| roar | intransitive verb | | roar | |
| run | intransitive verb | | run | |
| walk | intransitive verb | | walk | |
| yawn | intransitive verb | | yawn | |
| activate | transitive verb | | activate | |
| change | transitive verb | | change | |
| close | transitive verb | | close | |
| cut | transitive verb | | cut | |
| deactivate | transitive verb | | deactivate | |
| extinguish | transitive verb | | extinguish | |
| illuminate | transitive verb | | illuminate | |
| lock | transitive verb | | lock | |
| secure | transitive verb | | secure | |
| see | transitive verb | | see | |
| show | transitive verb | | show | |
| turn | transitive verb | | turn | |
| unlock | transitive verb | | unlock | |
| can | auxiliary | | can | nonfinite (base) |
| will | auxiliary | | will | nonfinite (base) |
| would | auxiliary | | would | nonfinite (base) |
| copula | copula | | be | nonfinite (x) |
| persuade | to verb | | persuade | |
| promise | to verb | | promise | |
| comp | to | | to | nonfinite (base) |
| today | adverb | | today | |
| tomorrow | adverb | | tomorrow | |
| yesterday | adverb | | yesterday | |
| very | intensifier | vowel=minus | very | |
| blue | adjective | vowel=minus | blue | |
| first | adjective | vowel=minus | first | |
| infrared | adjective | vowel=plus | infrared | |
| main | adjective | vowel=minus | main | |
| new | adjective | vowel=minus | new | |
| red | adjective | vowel=minus | red | |
| second | adjective | vowel=minus | second | |
| small | adjective | vowel=minus | small | |
| sudden | adjective | vowel=minus | sudden | |
| sudden | adverb | vowel=minus | suddenly | |
| third | adjective | vowel=minus | third | |
| afternoon | noun | vowel=plus | afternoon | |
| alarm | noun | vowel=plus | alarm | |
| basement | noun | vowel=minus | basement | |
| female | noun | vowel=minus | female | |
| camera | noun | vowel=minus | camera | |
| floor | noun | vowel=minus | floor | |
| guard | noun | vowel=minus | guard | |
| historian | noun | vowel=minus | historian | |
| light | noun | vowel=minus | light | |
| machine | noun | vowel=minus | machine | |
| male | noun | vowel=minus | male | |
| midnight | noun | vowel=minus | midnight | |
| morning | noun | vowel=minus | morning | |
| noon | noun | vowel=minus | noon | |
| octopus | noun | vowel=plus | octopus | |
| owl | noun | vowel=plus | owl | |
| ox | noun | vowel=plus | ox | |
| person | noun | vowel=minus | person | |
| sensor | noun | vowel=minus | sensor | |
| situation | noun | vowel=minus | situation | |
| state | noun | vowel=minus | state | |
| video | noun | vowel=minus | video | |
| female | noun | | female | |
| male | noun | | male | |
| at | preposition | | at | |
| by | preposition | | by | |
| for | preposition | | for | |
| in | preposition | | in | |
| near | preposition | | near | |
| of | preposition | | of | |
| on | preposition | | on | |

TABLE 3-continued

| INPUT MEANING PREDICATE | OUTPUT LANGUAGE WORD CATEGORY | SET | STRING | REQUIREMENT |
| --- | --- | --- | --- | --- |
| with | preposition | | with | |
| NEG | negation | | not | |
| several | quantifier | | several | |
| perf | operation | | (perfect) | nonfinite (psp) |
| ing | operation | | (prog) | nonfinite (prp) |
| past | operation | | (past) | finite (past) |
| have | have | | have | nonfinite (psp) |
| a | determiner | definiteness= indefinite | a | |
| an | determiner | definiteness= indefinite | an | |
| the | determiner | definiteness= definite | the | |
| entity-relation | complementizer | | that | |
| entity | pronoun | | it | |
| female | pronoun | | she | |
| male | pronoun | | he | |
| something | pronoun | | something | |
| everything | pronoun | | everything | |
| hi | interjection | | hi | |
| hello | interjection | | hello | |

It will be evident from inspection of the above Table 3 that the left hand column contains a list of the predicates of the meanings which, when output by the input signal processor 122, may be processed by the output signal processor 124. The fourth column contains the basic string from which the form of the word in an output may be derived. The second column contains the category of the word in the output language. It will also be evident from inspection of the last few lines of Table 3 that there are a number of entries therein whose category is specified as an operation. The operation category relates to input meanings which, according to the grammar of the output language, indicate the tense of a verb which the operation qualifies. Accordingly, for operations, the entry in the fourth column contains an indication of the type of operation and is surrounded by brackets. No word should be output as a result of future processing of the node which represents the operation. The third and fifth columns contain further instructions and information herein termed set instructions and requirements information respectively, to be stored in a node for use in later processing of the node Node Structure As described above, the data structure 150 is built up by the generator module 146 from one or more nodes which are the data structures used to store the results of the processing of the generator and verbaliser. Each node has the following basic structure:

Node: (unique node identification number)

Links: (node identification number of two other nodes)

Features:

(a) meaning: (input meaning)

(b) category: (e.g. noun)

(c) string: (basic output language word)

(d) requirement: (form required for an associated verb)

(e) case: (nominative/accusative)

(f) definiteness: (definite/indefinite)

(g) gender: (male/female/neuter etc)

(h) number: (singular/plural)

(i) surface form: (modification of string for output)

(j) subject features: (if node represents a verb set to case of subject else blank)

(k) verb chain: (yes/no)

(l) verb form: (finite/non-finite etc)

(m) vowel: (plus/minus)

Left codes: Right codes:

The first data entry in a node, herein termed the node entry is used to store a unique number which uniquely identifies each node and is entered therein by the generator when it creates a node. The second entry, herein termed the links entry, is used in step 4 of the processing of the generator module 146 outlined above, to store the node identification numbers of other nodes in the data structure to which the present node is linked. The third entry herein termed features is an entry composed of thirteen sub-entries which are used to store information obtained from the output language lexicon 152 described above or may be used to store information during future processing of the node.

The purpose of each feature is as follows:

Feature (a), herein termed the meaning entry is used to store a copy of the input meaning which the word being represented by the node is intended to convey in the output language;

Feature (b), herein termed the category entry, is used to store an indication of the lexical category of the word which the node represents and is determined by the second column of the output language lexicon 152;

Feature (c), herein termed the string entry, is used to store a representation of the basic form of the word in the output language which the node represents and it is determined by the fourth column of the output language lexicon 152;

Feature (d), herein termed the requirement entry, is used when the node represents particular verbs or an operation to indicate the form that another verb should take, which other verb is associated with the verb or operation which the node represents;

Feature (e), herein termed the case entry, is used in some languages when the node represents a noun, pronoun or adjective which may be inflected dependent on the case;

Feature (f), herein termed the definiteness entry, is used when a node represents a determiner to indicate the type of the determiner e.g. in English, whether it is definite or indefinite;

Feature (h), herein termed the number entry, is used to store an indication of whether the word represented by the node should be used in its singular or plural form in the output language;

Feature (i), herein termed the surface form entry, is used to store the inflected form of the basic output word stored in the string entry and is determined by the processing of the verbaliser module 148 described below;

Feature (j), herein termed the subject features entry, is used in the case of verbs to store the case of the subject of that verb;

Feature (k), herein termed the verb chain entry, is used by the generator module 146 in the processing of certain combinations of verbs and will be described in more detail below;

Feature (l), herein termed the verb form entry, is used in the case of verbs to store an indication of the form which a verb should take in the output language dependent on the surrounding words e.g. finite, non-finite etc; and Feature (m), herein termed the vowel entry, is used to indicate whether the word being represented by a node begins with a vowel or a vowel sound. The entry may then be used by the verbaliser module 148 to determine whether a preceding indefinite determiner should have the surface form "a" or "an".

As each meaning is obtained by the generator module 146 from the table 144, the generator searches the meanings shown in the left hand column of Table 3 for the same predicate as that contained in the meaning and, when this is found, obtains the string from the fourth column, the output language word category from the second column and, when present, the set instructions from the third column and the requirement information from the fifth column. The entries obtained are entered into a new node.

The output language word category obtained from the second column of table 152 is stored in the category entry, the string obtained from the fourth column is stored in the string entry of the node, any entry in the fifth column is stored in the corresponding requirement entry and any set command from the third column of table 152, which is an instruction to set a particular feature to a particular state, is carried out with respect to the particular feature defined therein. Set commands can be used to set the status of any of the features and the purpose of this command will be more clearly understood from the processing of the verbaliser module 148 which will be described later.

It will noted that there are two further entries in the node namely, an entry termed Left codes and an entry termed Right codes. These entries are used to store search codes for each node which are used by the generator in step 3 to identify the words in the output natural language which should be placed to the left of the word represented by the present node and those which should be placed to the right.

As already stated above, in any language, the grammar defines the different categories of words which may qualify each other and the order in which the words are spoken or written to convey a particular meaning. For example, in the English language, an adjective precedes a noun which it qualifies. A noun may be the subject or object of a verb which qualifies the noun and if a noun is the subject of a verb, the noun usually precedes the verb. If a noun is the object of a transitive verb, the verb normally precedes the noun and so on. The analyser module 122 has established the links between the input words and produced the meaning representation stored in Table A based on any such links.

Given elements of meaning and an indication of the word or words in the output language which represent those meanings then it is possible, by referring to the grammar of the language, to identify the order in which the words should be spoken, typed or written to convey the given meaning in the given language.

Table 154 defines the search codes to be used for establishing the position of a given node representing an output word of a particular category relative to the other nodes according to the grammar of the output language used in the preferred embodiment. This table is referenced by the generator module 146 each time a node is created and the codes, corresponding to the category of output word for the node which is being created, are entered in the node. The following Table 4 represents the instructions stored in table 154:

TABLE 4

| OUTPUT LANGUAGE WORD CATEGORY | SEARCH CODES AND ARGUMENT COMBINATIONS FOR USE IN SEARCHING FOR WORDS PLACED TO THE LEFT OF THE CURRENT WORD | SEARCH CODES AND ARGUMENT COMBINATIONS FOR USE IN SEARCHING FOR WORDS PLACED TO THE RIGHT OF THE CURRENT WORD |
|---|---|---|
| noun | −an/2<br>−dn/1<br>+obj:prd/2 | +n/2<br>+subj/2 |
| pronoun | +obj:prd/2 | +n/2<br>+subj/2 |
| determiner |  | +dn/2 |
| quantifier |  | +dn/2 |
| adjective | +a/1<br>+prd/2 | +an/2 |
| intensifier | +a/1 | −a/2 |
| preposition | −n:v/2 | −obj/3 |
| intransitive verb | +v:va/1<br>−subj:vc/2<br>+va/1 | −op/1<br>+v/1 |
| transitive verb | +v:va/1<br>−subj:vc/2<br>+va/1<br>−whobj/3 | −op/1<br>−obj/3<br>+v/1 |

TABLE 4-continued

| OUTPUT LANGUAGE WORD CATEGORY | SEARCH CODES AND ARGUMENT COMBINATIONS FOR USE IN SEARCHING FOR WORDS PLACED TO THE LEFT OF THE CURRENT WORD | SEARCH CODES AND ARGUMENT COMBINATIONS FOR USE IN SEARCHING FOR WORDS PLACED TO THE RIGHT OF THE CURRENT WORD |
|---|---|---|
| "to verb" | +v:va/1<br>−subj:vc/2<br>+va/1<br>−whobj/3 | −op/1<br>−obj/3<br>−comp/4<br>+v/1 |
| auxiliary | +aux:va/1<br>−subj:vc/2<br>+va/1 | −op/1<br>+aux:v/1<br>−aux:v/3 |
| copula | +v:va/1<br>−subj:vc/2<br>+va/1 | −op/1<br>+v:aux/1<br>−prd/3<br>+v/1 |
| have | +v:va/1<br>−subj:vc/2<br>+va/1<br>−whobj/3 | −op/1<br>+v:aux/1<br>−aux:v:obj/3<br>+v/1 |
| to | +comp/1 | −v/3, +subj/2 |
| operation | +op/2 | |
| negation | −aux/2 | |
| adverb | +a/1<br>−v/2 | −va/2 |
| interjection | | |
| complementizer | −n/2 | +subj:whobj/2 |

The first column of Table 4 lists the word category of the word to be used to convey an input meaning in the output language. A second column lists the corresponding search codes and argument combinations to be used by the generator to identify nodes representing output words which should be placed to the left of the word represented by the current node in the output language. The third column lists search codes and argument combinations to be used by the generator to identify nodes representing words which should be placed to the right of the word represented by the current node in the output language. The way in which these search codes and argument combinations are determined for a given word category will be described further from consideration of the grammar and word order used for the output language of the present embodiment. FIGS. 21 to 39 show, for each word category in the output language the possible grammatical links which may exist between the words of each category. In addition, the categories of words are arranged in columns, each column being positioned relative to the word category in question in a particular figure so as to model the required word order in the output language of the preferred embodiment.

Figure 21:
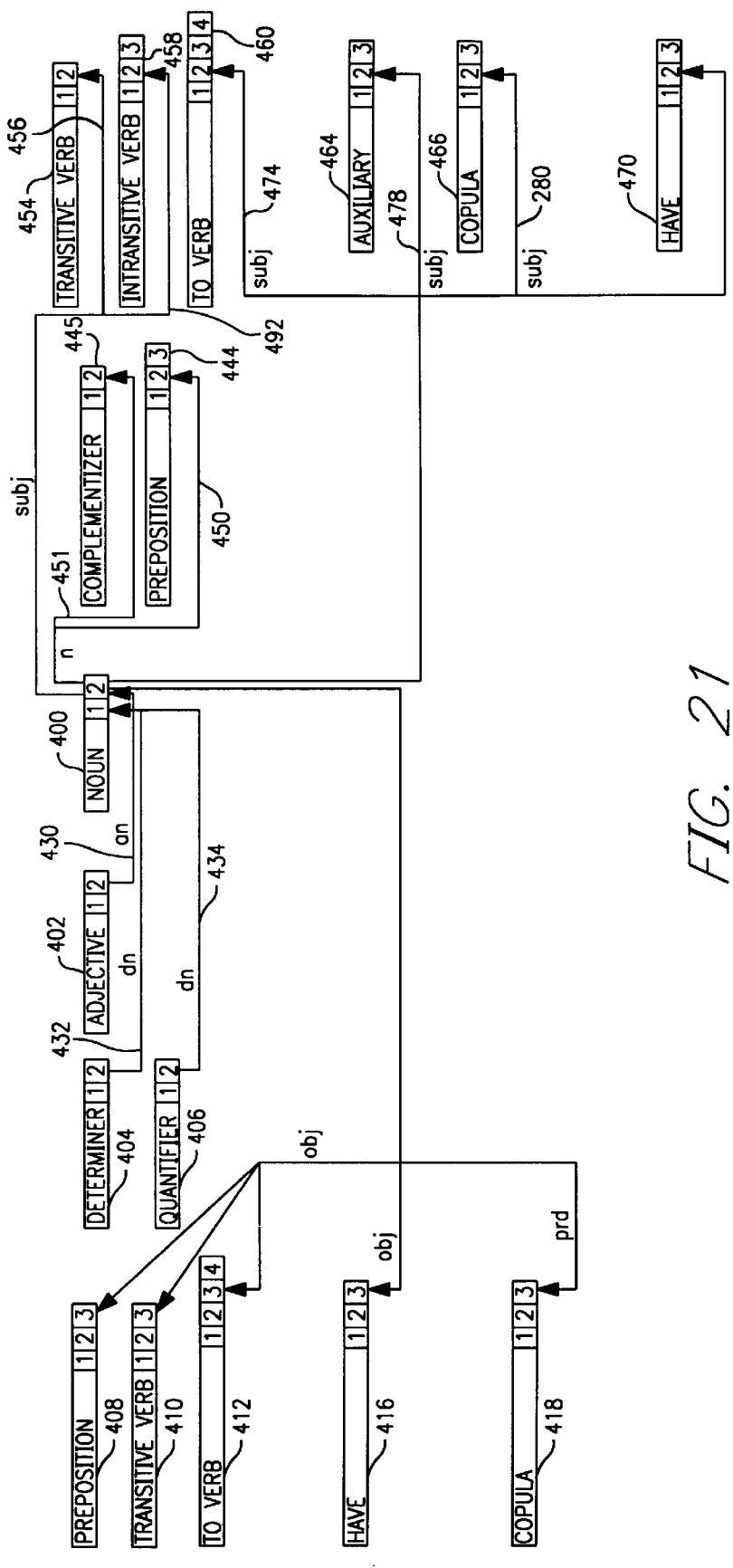

Nouns—FIG. 21

With reference to FIG. 21, in the output language grammar of the present embodiment, a noun is qualified by an adjective by a link 430 from the second argument of the adjective to the second argument of the noun, and as shown in FIG. 21, block 402 represents the adjective and is placed immediately to the left of block 400 which represents the noun. Also, if the noun 400 is qualified by a determiner 404 or a quantifier 406 by a link from the second argument of the determiner or quantifier to the first argument of the noun then the determiner or quantifier should be placed to the left of the noun and to the left of any adjective which qualifies the noun as described above. Similarly, if any of the word categories shown in blocks 408 to 418 in the third column to the left of the noun are qualified by the noun indicated by the links 436 and 438 from the second argument of the noun to the categories of words in the third column to the left, then words of those category should be placed to the left of the noun and to the left of any determiner, quantifier, or adjective which qualifies the noun as described above. Taking the columns of word categories to the right of the noun 400 in FIG. 21 it will be seen that the first column to the right contains prepositions and complementizers and if these are qualified by the noun, that qualification being indicated by a link from the second argument of the noun to the second argument of the preposition or complementizer then words of those categories should be placed immediately to the right of the noun in the output language Any words of the categories indicated in the second column in blocks 454 to 471 to the right of the noun are qualified by the noun as indicated by a link from the second argument of the noun to the second argument of the words of those categories. As indicated in FIG. 21, any such word should be positioned to the right of the noun and to the right of any preposition or complementizer qualified by the noun as described above.

These positional relationships are modelled in the data structure 150 by the ordering of the nodes contained therein which is established by the generator in accordance with the search code and argument combinations entered in each node from Table 4.

As shown in the third column of Table 4, the processing of a node which represents an adjective results in a code "+an" together with the second argument of the meaning thereof being stored in the right codes section of the node, the processing of a node representing a determiner or quantifier results in the code "+dn" together with the second argument of the meaning thereof being stored in the right code section of the node for that word, processing of a preposition, transitive verb, "to verb", or "have" results in the code "−obj" along with the third argument of the meaning thereof being stored in the right code section of the node representing the word of that category and processing of a copula results in the code "−prd" together with the third argument of the meaning thereof being stored in the right codes section of the node representing a word of that category. In addition, processing of prepositions or complementizers results in the code "−n" together with the second argument of the meaning of the word being stored in the left code section of the node representing the word and processing of an intransitive verb, transitive verb, "to verb", auxiliary verb, copula or "have" results in the code "–subj:vc" together with the second argument of the meaning thereof being stored in the left code section of the node representing that word.

Inspection of Table 4 shows that when a noun is processed the code "–an" together with the second argument, the code "–dn" together with the first argument and the code "+obj:prd" together with the second argument of the meaning of the noun are stored in the left code section of the node representing the noun. The third column of Table 4 shows that the code "+n" together with the second argument and the code "+subj" again together with the second argument of the meaning of the noun are stored in the right code section of the node for the noun.

Accordingly, if, for example, the generator has processed a preposition, determiner, adjective and complementizer it will have created a node for each word, referenced Table 4 to obtain the search code and argument combinations for each node and stored each node in the data structure 150, which at this point will appear as follows, each box representing a node (the features of each node, except the meaning entry, are omitted at this point for ease of explanation. In addition, the meaning entry for each node comprises the word category for each word instead of the input meaning predicate.):

---

Node: 1
meaning: preposition (912,902,907)
Left codes:                     Right codes:
–n:v/902                        –obj/907
Node: 2
meaning: determiner (904,905)
Left codes:                     Right codes:
                                +dn/905
Node: 3
meaning: adjective (906,907)
Left codes:                     Right codes:
+a/906                          +an/907
+prd/907
Node: 4
meaning: complementizer (908,907)
Left codes:                     Right codes:
–n/907                          +subj:whobj/907

---

As described in outline above, when the generator module 146 has created a node and entered data in it from the lexicon 152 and table 154, it then carries out a search in the data structure 150 for nodes to which the current node being processed can be linked. The searches are carried out for matching search code and argument combinations and, in order for two to match, each of the following criteria must be met:

1. One of the codes must be from the left codes of one node and the other code must be from the right codes of another node;
2. One code must begin with a "+" and the other code must begin with a "–";
3. Each code must include the same search code letters. (It will be seen from inspection of Table 4 above that some search codes include two or more sets of search code letters separated by colons. In these cases only one of the sets of search code letters needs to be matched); and
4. Each same search code must include an identical argument.

The generator starts by attempting to find a match between the code at the top of the list of the left codes of the node currently being processed and the code at the top of the list of right codes of the most recently processed node before the current node. If the first code in the list of right codes of the most recently processed node does not match the generator moves to the next code in that list. If no matches are found for the first left code of the current node in the right codes of the most recently processed node then the generator takes the next code in the list of left codes for the current node and attempts to find a match between that code and, again, the right codes of the most recently processed node starting at the top of that list. The generator continues searching in this manner until all the left codes of the current node have been searched for in the right codes of the most recently processed node and, if this is unsuccessful it proceeds to search for a match between the first code in the list of right codes for the current node and the left codes of the most recently processed node. If this is unsuccessful, the search continues with an attempt to match the next right code of the current node against the left codes of the most recently processed node. Again, this strategy is performed until a match is found or all the right codes of the current node have been searched for in the left codes of the most recently processed node. If no match is found, then the generator follows the same search strategy using the next most recently processed node.

Accordingly, from inspection of the left and right codes of nodes 1 to 4 above it will be evident that there are no matching codes and therefore after the processing of these nodes, no two nodes will have been linked together.

If, in the above example, the generator next processes a transitive verb then the generator will reference Table 4 accordingly and produce a node for the transitive verb in which the data will appear as follows (again all but the meaning entry of the features are omitted for ease of explanation).

---

Node: 5
meaning: transitive verb (910,907,909)
Left codes:                     Right codes:
+v:va/910                       –op/910
–subj:vc/907                    –obj/909
+va/910                         +v/910
–whobj/909

---

From inspection of the left codes of node 5 it will be seen that a match exists between the second left code "–subj:vc/907" of node 5 and the right code "+subj:whobj/907" of node 4, thereby indicating that the transitive verb represented by node 5 which is qualified by the complementizer represented by node 4 should be placed to the right of the complementizer in the output language.

Finding a match in this manner triggers the fourth step of the processing of the generator module 146 which is to link the nodes having the matching codes. This is carried out by creating a new node, node 6, which is used to define the link between node 4 and node 5 by having in its links entry the numbers 5 and 4, the number 5 preceding the number 4 indicating that the word represented by node 5 is placed to the left of the word represented by node 4 in the output language.

In the case of a node which forms a link in this manner, the codes for new node 6 are not obtained from table 154 but, instead, are derived from processing of the codes of nodes 4 and 5. The codes are processed by copying the left and right codes from nodes 4 and 5 into the left and right codes of new node 6 in a predetermined manner. The left codes of the node which represents the leftmost word are copied into the left codes of the node forming the link followed by a copy of the left codes of the node representing the rightmost word, starting from the code in the list after which the match was made. Next, the right codes of the node representing the rightmost word are copied into the right codes of the node representing the link followed by a copy of the right codes of the node representing the leftmost word, starting from the code in the list after which the match was made. Where the left or right codes of a node only comprise the matched code, no codes will be copied from that list. The matched code is only copied to the codes of the node forming the link in the case where a specific instruction to do so appears in Table 156. In this case, the matched code is the first from the list to be copied to the parent node. In addition, each copied node has an indication of its origin (i.e. the node from which it has been copied). The following Table 5 represents the instructions stored in table 156:

search code which matched (the term "verb category" is used to refer to intransitive verbs, transitive verbs, "to verbs", "have", auxiliary verbs or copulas). The third column may define one or more operations to be carried out on the features of the node or nodes of a matching code and the fourth column defines operations to be carried out on the matched codes in each node.

Node 5 represents a transitive verb, node 4 represents a complementizer and the matching search codes were of the type "subj". Accordingly it will be seen from inspection of Table 5 that the applicable instruction is contained in the eighteenth line thereof, the fourth column containing no operation to be carried out on the matched code.

TABLE 5

| WORD CATEGORIES MATCHED | TYPE OF SEARCH CODE MATCHED | ENTRIES TO BE SET OR CHECKED | OPERATIONS ON MATCHED CODES |
| --- | --- | --- | --- |
| determiner and noun | dn | set vowel entries to be same or fail | |
| quantifier and noun | dn | set number entry of noun to "plural" or fail | add matched noun code to parent's codes |
| adjective and noun | an | set vowel entry of noun to be that of adjective | add matched noun code to parent's codes |
| noun and preposition | n | | add matched noun code to parent's codes |
| noun and complementizer | n | | |
| noun and auxiliary verb | subj | set number entries to be same or fail; and set subject entry of the auxiliary verb to case of noun or fail | rename matched noun code "vc" and add to parent's codes |
| noun and auxiliary verb | vc | check that verb chain entry of auxiliary is plus or fail; and set number entries to be same or fail | add matched noun codes to parent's codes |
| noun and verb category | vc | check that verb chain entry of verb category is plus or fail; and set number entries to be same or fail | |
| noun and verb category | subj | set number entries to be same or fail; and set subject entries of verb to case of noun or fail; and if noun is accusative set verb form of verb to nonfinite (base) | |
| noun and verb category/ preposition | obj | set case of noun to accusative or fail | |
| to and verb category | v | set verb form of verb category to form defined by requirement entry in to | |
| auxiliary verb and verb category | v/aux | set verb form entry of verb category/auxiliary to form defined by required in auxiliary or fail; set verb chain of verb category/auxiliary to plus; and check number entries agree or fail. | |
| adverb and verb category | v | | add matched verb category code to parent's codes |
| verb category and adverb | v | | add matched verb category code to parent's codes |
| verb category and preposition | v | | add matched verb category code to parent's codes |
| verb category/auxiliary and operation | op | set verb form of verb category or auxiliary to form defined by required in operation and set surface form of operation to blank | |
| intensifier and adjective | a | set vowel entry of adjective to that of intensifier | |
| any other | any other | | |

The first column of Table 5 indicates the word categories of the two nodes matched and the second column defines the After the above processing in the case of new node 6 in the above example the contents of this node will be as follows:

```
Node: 6
Links: 4 + 5
Left codes:                 Right codes:
-n/907 from node 4          -op/910 from node 5
+va/910 from node 5         -obj/909 from node 5
-whobj/909 from node 5      +v/910 from node 5
```

In the above case only one pair of matching codes existed in the relevant lists of search codes. However, in some cases, more than one match may exist in which case the instruction in the fourth column of Table 5 relevant to the first pair of matched codes is ignored and the instruction applicable to the second match applied to the processing of the search codes for the node representing the link. In addition, the point in the lists of codes after which codes are copied to the relevant list for the parent, is the point at which the final match was made. The instruction in the third column of Table 5 for each match are carried out on the relevant node and in the order in which the matched codes were found.

FIG. 40(*a*) is a diagrammatic representation of the state of the data structure 150 after the above processing. The nodes are represented by circles with the node number indicated inside and any links between them represented by lines joining the circles. FIG. 40(*a*) shows nodes 1, 2 and 3 unlinked, whilst nodes 4 and 5 are linked via node 6. The combination of nodes 4, 5 and 6 forms a binary tree. Both a single node and binary tree such as that described above are herein collectively termed fragments. When the new fragment is a single node created as a result of a new input and an attempt is being made to match it against existing fragments made up of single nodes in the data structure 150 then the search strategy carried out by the generator is as described above. Similarly when the current fragment is made up of a number of nodes then the top node is taken and a search is carried out amongst remaining fragments in the data structure 150 for nodes having matching codes, taking the most recently processed fragment first and continuing if no match is found with the next most recently processed fragment. If the generator attempts to find a match between the current fragment and a previously processed fragment, the previous fragment being made up of a number of nodes, then the search strategy is extended. In this case, the top node of the current fragment is taken and a search is carried out in the top node of the previously processed fragment. If this search is unsuccessful the generator then takes the right child of the top node and attempts to find matching codes there. If this attempt to find a match is unsuccessful then the generator takes the next right daughter if present or else the left daughter of the top node and attempts to find a match in the codes of that node. The search continues in this rightmost depth-first manner until either a match is found or all nodes in the fragment have been searched. If no match is found and the current fragment is made up of a number of nodes then the generator takes the fragment searched and taking the codes of the top node thereof searches for a match in the current fragment in a similar rightmost depth-first manner but excluding any searches of the codes of the top node. Again, this strategy continues until either all the nodes have been searched or a match is found. In the above example, it will be evident from inspection of the top node of the newly created fragment, node 6, that nodes 1, 2 and 3 which remain unlinked in the data structure, do not contain matching codes.

If, in the above example, a noun is then processed by the generator 146, that noun being qualified by the previously processed determiner and adjective and qualifying the previously processed preposition, complementizer and transitive verb in the manner described above with reference to FIG. 21 then, in the present embodiment, the generator will reference Table 4 accordingly and produce a node for the noun in which the data will appear as follows (again all but the meaning entry of the features are omitted for ease of explanation):

```
Node: 7
meaning: noun (905,907)
Left codes:              Right codes:
-an/907                  +n/907
-dn/905                  +subj/907
+obj:prd/907
```

It will be seen from inspection of the left and right codes of node 7 that a number of matches are possible between the codes therein and the respective codes of nodes 1, 2, 3 and 6. The generator begins the search by taking the top node of the most recently processed fragment, node 6. It will be seen from inspection of the left codes of node 7 and the right codes of node 6 that no match exists and, accordingly, the generator then takes the right codes of node 7 and attempts to find a match with one of those codes with the left codes of node 6. A match is found between the code "+n/907" from node 7 and the code "-n/907" from node 6 (which is indicated as having been derived from node 4).

In response to finding these matching codes, the generator creates a new node, node 8, which is used to define a link between nodes 6 and 7 and which will have entered in its links entry, the numbers 6 and 7, the number 7 preceding the number 6 indicating that the word represented by node 7 is placed to the left of the words represented by node 6 in the output language. Node 7 represents a noun and the matched code from node 6 was derived from node 4 which represents a complementizer and the search code letters were "n". Accordingly, when the generator refers to Table 5, the fifth entry therein is applicable. Since the fourth column of Table 5 contains no instruction, the matched codes in nodes 6 and 7 are not added to the parent node. The generator then creates the codes for new node 8 by copying the left codes of node 7 into the left codes of node 8 followed by a copy of the left codes of node 6 and copying the right codes of node 6 into the right codes of node 8 followed by a copy of the right codes of node 7. When this processing is complete the contents of node 8 are as follows:

```
Node: 8
Links: 7 + 6
Left codes:                  Right codes:
-an/907 from node 7          -op/910 from node 5
-dn/905 from node 7          -obj/909 from node 5
+obj:prd/907 from node 7     +v/910 from node 5
+va/910 from node 5          +subj/907 from node 7
-whobj/909 from node 5
```

FIG. 40(*b*) is a diagrammatic representation of the state of the data structure after the above processing. FIG. 40(*b*) shows nodes 1, 2 and 3 unlinked whilst nodes 4 to 8 are combined to form a new single fragment.

The generator continues processing by taking the topmost node of the newest fragment, node 8 and attempting to find a match for the first left code "-an/907" thereof. The generator first searches the right codes of the most recently processed unconnected node, node 3 where a match is found with the code "+an/907". Accordingly, the generator creates a new node, node 9 and enters in its links entry the entry "3+8".

Node 3 represents an adjective and the matched code in node 8 was derived from node 7 which represents a noun and therefore the generator accesses the third instruction in Table 5, the fourth column of which instructs it to add the matched code from node 8 to the appropriate location of the codes of new node 9. Table 5 also contains an instruction in the third column in response to which the generator sets the vowel entry of node 6 to be the same as the vowel entry of node 3 and this will be explained in more detail below.

The generator then creates the codes for new node 9 by copying the left codes of node 3 followed by the left codes of node 8, including the matched code, into the left codes of new node 9 and copying the right codes of node 8 but none from node 3 since the only code was the matched code, into the right codes of new node 9. After the above processing the contents of node 9 are as follows:

```
Node: 9
Links: 3 + 8
Left codes:                 Right codes:
+a/906 from node 3          -op/910 from node 5
+prd/907 from node 3        -obj/909 from node 5
-an/907 from node 7         +v/910 from node 5
-dn/905 from node 7         +subj/907 from node 7
+obj:prd/907 from node 7
+va/910 from node 5
-whobj/909 from node 5
```

Figure 40A:
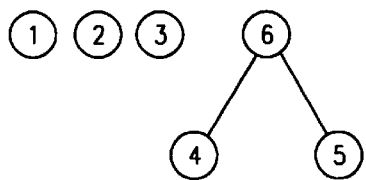
Figure 40B:
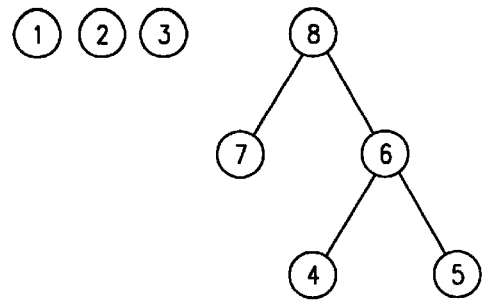
Figure 40C:
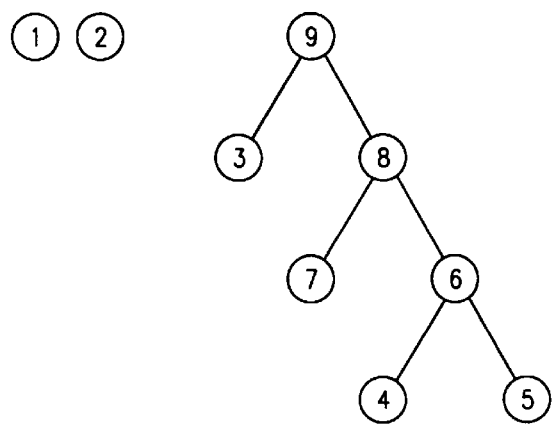

FIG. 40(c) shows, in diagrammatic form, the state of the data structure 150 after the above processing described above. The data structure 150 now comprises two unconnected nodes followed by a fragment having node 9 as its top node.

The generator continues processing, taking each left code in turn on the top node, node 9, and searching for a matching code in the right codes of the most recently processed unconnected node, node 2. From consideration of the left codes of node 9 it will be seen that a match is found when the code "–dn/905" is processed and accordingly the generator creates a new node, node 10, to form a link between node 2 and node 9. Node 10 has in its links entry the entry "2+9" indicating that node 2 should be placed to the left of node 9 in the data structure 150. Node 2 represents a determiner and the matched code in node 9 was derived from node 7 which represents a noun and accordingly the generator uses the first rule in Table 5 to process the matched codes. The fourth column of Table 5 contains no instructions relating to the matched codes and accordingly, the generator proceeds to create the codes for new node 10 by copying the left codes from node 9 after the point in the list of codes at which the match was made, into the left codes of new node 10 and the right codes of node 9 into the right nodes of new node 10. In response to the instruction in the third column of Table 5, the generator sets the vowel entry of node 21 representing the determiner and node 7 representing the noun to be the same value. If these values are already set to conflicting entries (i.e. one set to "plus" and the other set to "minus") then the linking of node 2 and 9 will fail and the generator will continue searching for a matching code from the point at which it found the current match. After the above processing the contents of node 10 are as follows:

```
Node: 10
Links: 2 + 9
Left codes:                 Right codes:
+obj:prd/907 from node 7    -op/910 from node 5
```

-continued

```
+va/910 from node 5         -obj/909 from node 5
-whobj/909 from node 5      +v/910 from node 5
                            +subj/907 from node 7
```

Figure 40E:
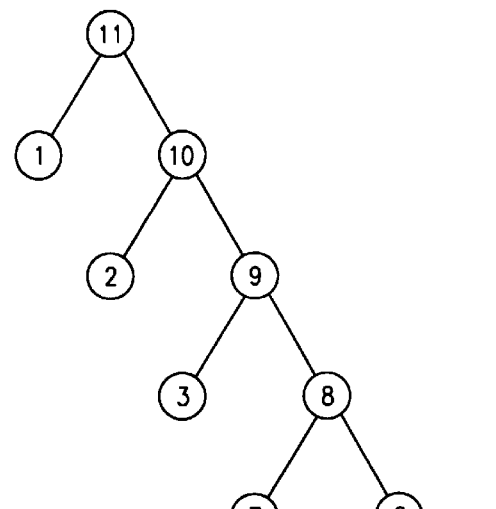
Figure 40D:
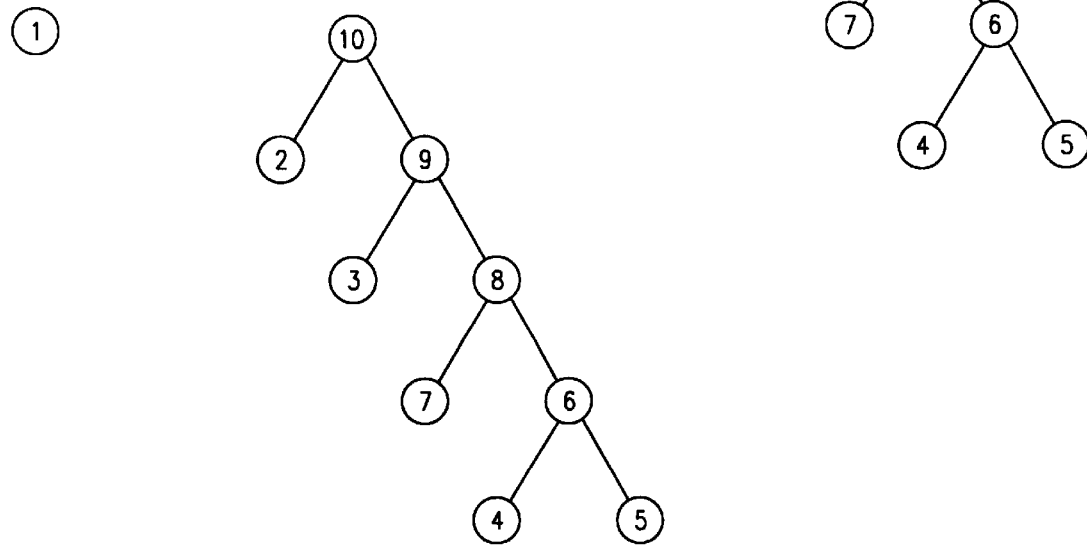

FIG. 40(d) shows, diagrammatically, the state of the data structure 150 after the above processing. The data structure 150 now comprises a single unconnected node, node 1 and a newly updated fragment having node 10 as its top node. The generator module 146 continues processing by taking the first left code of the top node of the most recently created fragment, node 10 and searches for a matching code in the remaining unconnected node, node 1. It will be seen from inspection of these codes that a match is found in the first search between the code "+obj:prd/907" from node 10 and "–obj/907" from node 1. Node 1 represents the preposition and the matched code in node 10 was derived from node 7 which represents a noun and accordingly the generator references the eighteenth rule in Table 5, the fourth column of which contains no instruction for processing the matched codes. The generator then creates the codes for new node 11 by copying the left code from node 1 followed by the left codes of node 10 into the left codes of node 11 and copying the right codes of node 10 into the right codes of node 11. After the above processing the contents of node 11 are as follows:

```
Node: 11
Links: 1 + 10
Left codes:                 Right codes:
-n:v/902 from node 1        -op/910 from node 5
+va/910 from node 5         -obj/909 from node 5
-whobj/909 from node 5      +v/910 from node 5
                            +subj/907 from node 7
```

FIG. 40(e) shows, diagrammatically, the state of the data structure 150 after the above processing which now comprises a single fragment.

From the processing described above it will be clear that nodes carry out one of two functions i.e. to represent a word in the output language or to link two other nodes together, with no single node carrying out both these functions. In addition, inspection of the diagrammatically represented fragments shown in FIGS. 40(a) to 40(e) will show that after each stage in the processing the ordering of the connected nodes models the ordering that the words represented by each node should have in the output language. With reference to FIG. 40(e), node 7 which represents a noun has at its nearest leftmost node, node 3 which represents an adjective, the second node to the left of node 7, node 2 represents a determiner and the third node to the left from node 7, node 1 represents a preposition. Also, the first node to the right of node 7, node 4 represents a complementizer and the second node to the right, node 5, represents a transitive verb. Accordingly it can be seen that the tree-structure of the fragment shown in FIG. 40(e) models the order of the word categories shown in FIG. 21 relative to the noun and does so regardless of the order in which the meanings are input. Inspection of FIGS. 40(a) to 40(e) shows that each fragment maintains this order at each stage of the processing. It will also be noted from the first line in Table 4 that the search codes for a noun and indeed any category, are in order of proximity of the word categories with which a link may be made, with the code at the top of the list being for the closest word.

The processing of a node representing a noun may result in a match between a right code "subj" of the noun with a left code of an auxiliary verb. In this case, the generator module will use the sixth rule in Table 5 of which the fourth column instructs the generator to rename the "subj" code in the node representing the noun to "vc" and add it to the right codes of the node which will form the link between the two matched nodes. In addition, the third column of Table 5 instructs the generator to set the number entry of the nodes from which the matched codes were derived to be the same and to set the subject feature entry of the node representing the auxiliary to the entry contained in the case entry of the node representing the noun. If either of these operations is not possible then the processing of these matched nodes fails and the generator resumes its search for a matching code. The fact that a noun is linked to an auxiliary verb on the right indicates the possibility that a chain of verbs may exist in the output, i.e. one or more auxiliary verbs each qualifying the previous auxiliary verb, followed by a main verb qualifying the rightmost auxiliary verb, with each verb in the chain qualifying a common subject. The combination of a noun and auxiliary verb indicates that the noun may be the common subject of such a verb chain and accordingly its "subj" code is added to the codes of its parent, thereby making it available to future processed verbs in the verb chain. In addition, the code is modified to "vc" to provide a restriction on the nodes with which it may make a link. The restriction is such that a match on this code will only succeed if the corresponding node in which the match is made represents a verb which forms part of the verb chain. A verb is identified as forming part of the verb chain only when the verb chain feature is set to "plus". This occurs when processing results in a match with a node representing a word of a verb category or another auxiliary verb, using the code "v" or "aux". In this case, the generator will utilise the twelfth entry of Table 5. The third column of Table 5 for this entry instructs the generator to set the verb form entry of the node representing the verb category or rightmost auxiliary matched, to the state defined by the required entry in the node representing the leftmost auxiliary being processed. The generator sets the verb chain entry of the node representing the verb category or rightmost auxiliary to "plus" and sets the number features of each node to be the same. If the list of codes in which the above match was found also contains a match involving the code "vc" with a corresponding code in the list of codes for the auxiliary verb, then, if the rightmost verb is an auxiliary verb, the generator will also use the seventh entry in Table 5 to process the matched nodes further. The third column of Table 5 instructs the generator to check that the verb chain entry of the node representing the rightmost auxiliary verb is set to "plus" or else the processing of the matched code fails. This ensures that the rightmost auxiliary verb is only linked to the common subject if the rightmost auxiliary verb has formed part of the verb chain. In addition, the third column also instructs the generator to set the number entry of the matched nodes to be the same. If either of these checks fails then the processing of the matched code is aborted. In addition, the fourth column of Table 5 instructs the generator to add the matched code derived from the node representing a noun to the node representing the link between the matched node thereby allowing subsequently processed verbs to be linked to the common subject if they form part of the verb chain.

If the second matched code "vc" is derived from a node representing a transitive verb, intransitive verb, "to verb" or "have", the main verb in the verb chain, then the generator uses the eighth entry in Table 5 to process the features of the matched nodes. The third column of Table 5 instructs the verbaliser to check that the verb chain entry of the rightmost verb is set to "plus" thereby ensuring that the verb is part of the verb chain. The third column also instructs the generator to set the number entries of each node to the same value. The fourth column of Table 5 contains no instructions for adding the matched "vc" code to the relevant codes of the node forming a link thereby preventing any further linking to the right of the main verb via the "vc" code to the common subject of the verb chain since the main verb is the rightmost element of any such chain.

The processing of a noun may result in a match with a node representing a preposition using the code "n". In this case, in order to process the matched codes, the generator references the fourth entry in Table 5, the fourth column of which instructs the generator to add the code relating to the noun to the codes of the node which represent the links between the two matched nodes.

Figure 22:
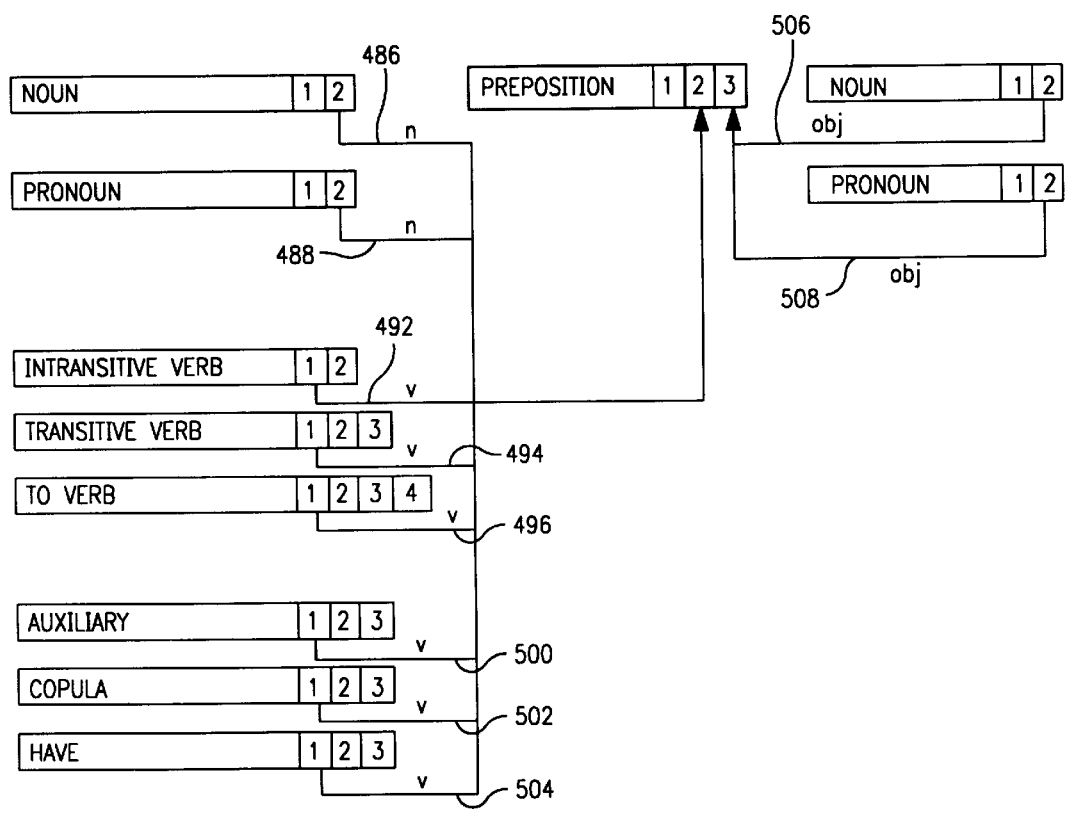

Preposition—FIG. 22

Consideration of FIG. 22 shows that in the output language grammar of the present embodiment, a preposition is preceded by a noun or pronoun qualifying the preposition by a link 486 or 488 from the second argument of the noun or pronoun to the second argument of the preposition. Also, a preposition may be qualified by a link 492, 494, 496, 500, 502 or 504 from the first argument of an intransitive verb, transitive verb, "to verb", auxiliary verbs, copulas or "have" respectively, again to the second argument of the preposition. As shown in FIG. 22, each word of these categories should be placed immediately to the left of the preposition in the output language. Inspection of column 2 of Table 4 shows that the left codes of a node representing a preposition contain the code "-n:v/2", inspection of the third column of Table 4 for nouns and pronouns shows that a node representing a word of that category will have the code "+n/2" in its right codes and, similarly, intransitive verbs, transitive verbs etc will, according to the third column of Table 4, have the code "+v/1" in their right codes.

As shown in FIG. 22, in the output language of the present embodiment a preposition which is qualified by a link 506 or 508 to its third argument from the second argument of a noun or pronoun will have the word of that category placed immediately to its right. The third column of Table 4 shows that a node representing a preposition will have the code "-obj/3" in its right codes, the corresponding code being present in the left codes of a noun or pronoun as shown in the relevant entries in Table 4.

Figure 23:
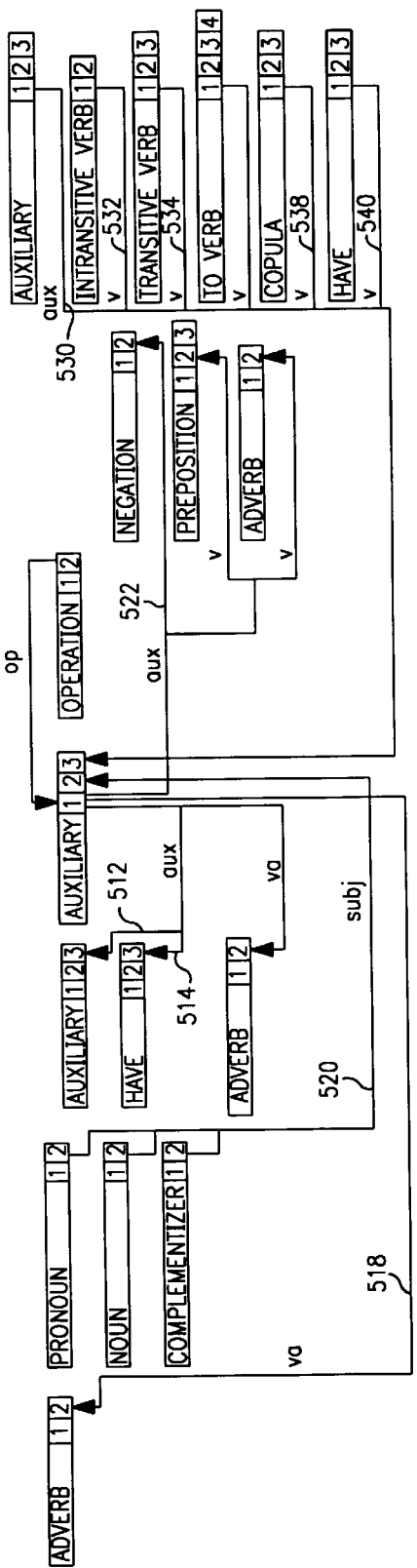

Auxiliary Verbs—FIG. 23

FIG. 23 shows that in the grammar of the embodiment if an auxiliary verb qualifies another auxiliary verb, adverb or "have" by a link from the first argument of the auxiliary verb to the third argument of the auxiliary verb or "have" and the second argument of the adverb, then that word should be placed immediately to the left of the qualifying auxiliary verb in the output language. If the auxiliary verb is qualified on its second argument by a pronoun, noun or complementizer by the second argument of a word of that category then words of those categories should be placed to the left of the auxiliary verb and to the left of an auxiliary verb, adverb or "have" which is qualified by the auxiliary verb. In addition, if the auxiliary verb qualifies an adverb as shown by arrow 518 in FIG. 23, then this word could be placed furthest to the left from the auxiliary verb in the output language. Similarly, an operation which, by its second argument qualifies the first argument of the auxiliary verb should be placed immediately to the right, a negation, adverb or preposition whose second argument is qualified by the first argument of the auxiliary should be placed next to the right, an intransitive verb, transitive verb, "to verb", auxiliary verb, copula or "have" which qualify, by their first argument, the third argument of the auxiliary should be placed furthest to the right. The entry in Table 4 for auxiliary verbs defines for the left codes of a node representing that auxiliary verb a list of search code and argument combinations in order of the proximity of the word category with which a link may be made. The same is true for the entry in Table 4 for the right codes of the auxiliary verb.

If the processing of an auxiliary verb results in a match between a right code of that node and the left code of a node representing an operation, the match using the code "op", then, when the generator module inspects Table 5 for a rule applicable to the combination of two nodes of these types, it will find the sixteenth entry. The third column of the sixteenth entry in Table 5 instructs the generator module to set the verb form entry of the auxiliary verb to the form defined in the required entry in the node representing the operation and to set the surface form entry of the node representing the operation to a blank.

Figure 24:
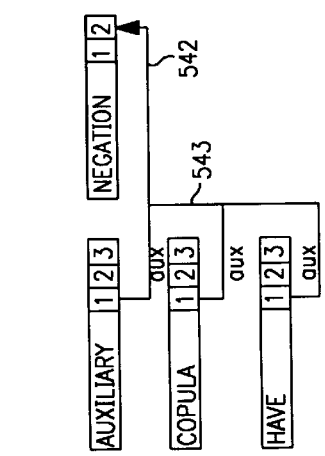

Negation—FIG. 24

Consideration of FIG. 24 shows that in the output language grammar of the present embodiment, a negation may be preceded by an auxiliary verb, copula or "have" which qualify the negation by a link 542 or 543 from the first argument of the auxiliary verb, "have" or copula respectively to the second argument of the negation. Inspection of the entry in Table 4 for negation shows that the code "–aux/2" is placed in the left codes of a newly created node representing a negation and that the code "+aux/1" will be entered in the right codes of a node representing an auxiliary verb and the code "+v:aux/1 will be entered in the right codes of a node representing a copula or "have". Accordingly, processing of a negation will locate these codes when present and create a link between the node representing the negation and the node representing the auxiliary verb or copula, with the node representing the auxiliary verb, "have" or copula being placed to the left of the node representing the negation. The codes for the new node forming the link will be processed in accordance with the instruction contained in the last entry in Table 5.

Figure 25:
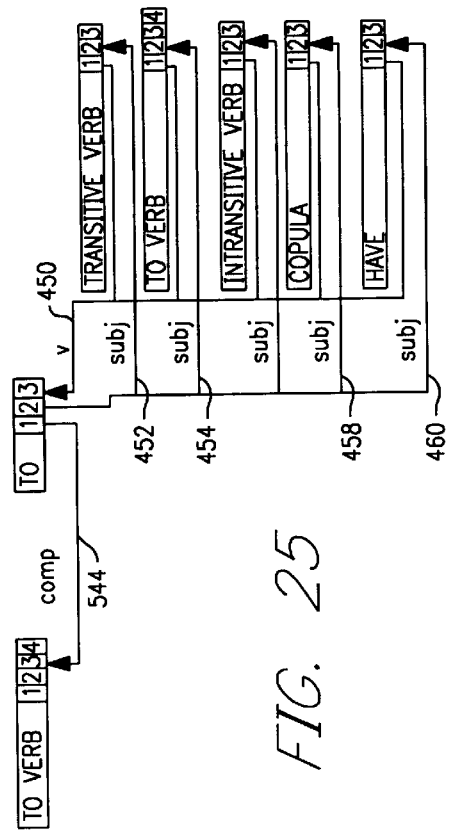

"To"—FIG. 25

Consideration of FIG. 25 shows that in the output language grammar of the present embodiment, the infinitival complement "to" is preceded by "to verbs", which the infinitival complement qualifies by a link from its first argument to the third argument of the meaning of the "to verb". In addition, the infinitival complement may be followed by an intransitive verb, transitive verb, "to verb", copula or "have" each of which may qualify the infinitival complement by a link 450 from the third argument of meaning of the infinitival complement to the first argument of the meaning of each of those categories. In addition, each of these verbs may be qualified by the infinitival complement by a link 452 to 460 from the second argument of the infinitival complement to the second argument of the verb. Inspection of the entry in Table 4 for "to" shows that a node representing the infinitival complement will have the code "+comp/1" in its left code and the codes "+subj/2" and "–v/3" in its right codes. Inspection of the relevant entries in Table 4 for the categories of words which precede the infinitival complement as described above with reference to FIG. 25 shows that nodes representing words of these categories will, in their right codes, have the code "–comp/3". Similarly nodes representing words of the categories which, as described above and with reference to FIG. 25, follow the infinitival complement clause will have the code "+subj/2" or "+v/1" in their left codes.

A match between the right code of an infinitival complement and the left code of a transitive verb, intransitive verb, "to verb", copula or "have" involving the code "subj" will result in the generator 146 using the eleventh entry in Table 5 to generate the search codes for the new node which will represent the link between the matched nodes. Column 3 of this entry indicates that the verb form entry of the node representing the verb category from which the matched code was derived should be set to the entry defined in the required entry in the node representing infinitival complement.

Figure 26:
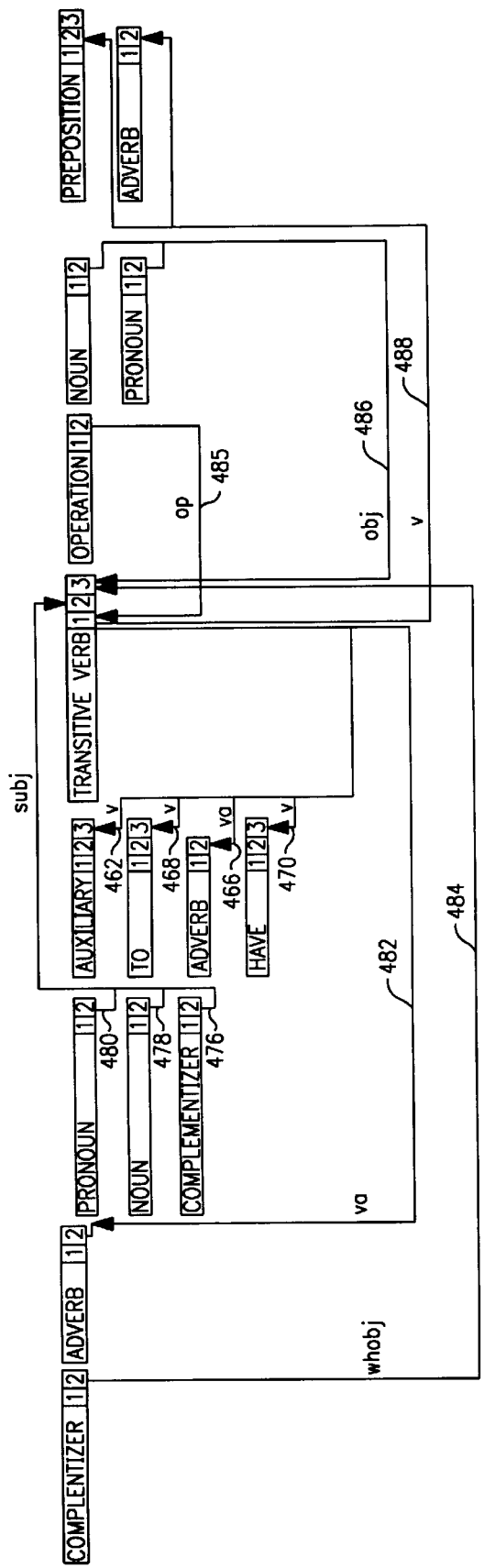
Figure 33:
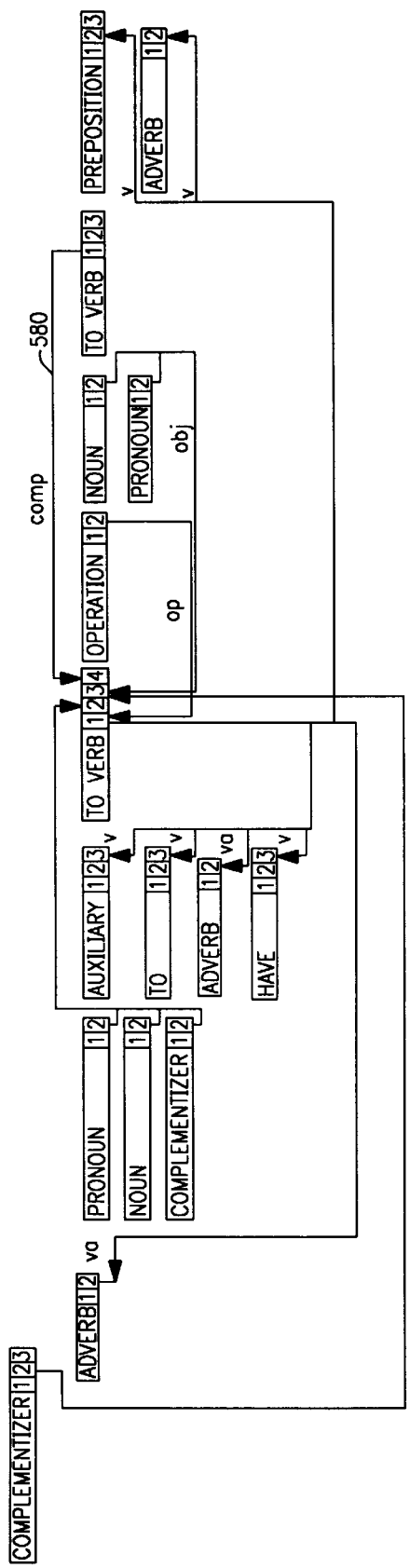
Figure 34:
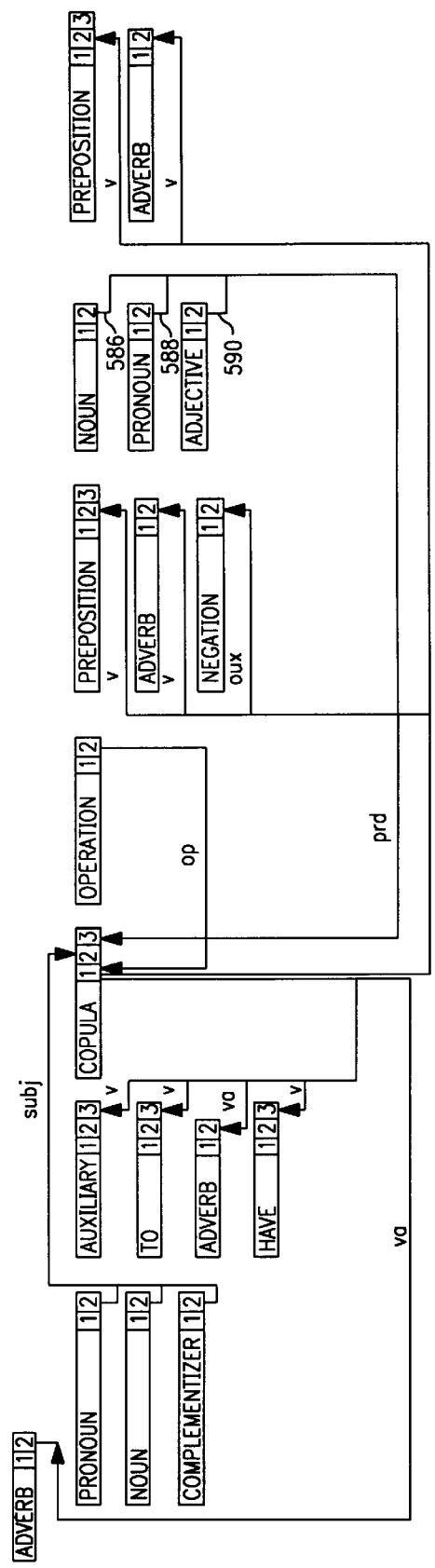
Figure 35:
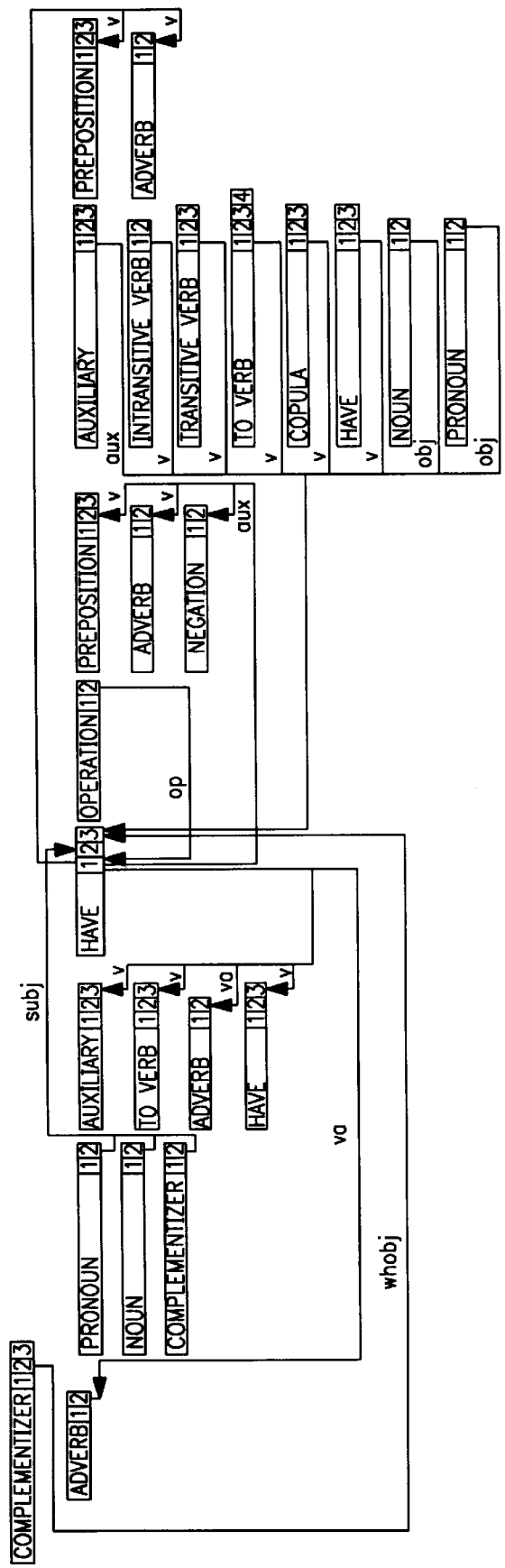
Figures 36, 37:
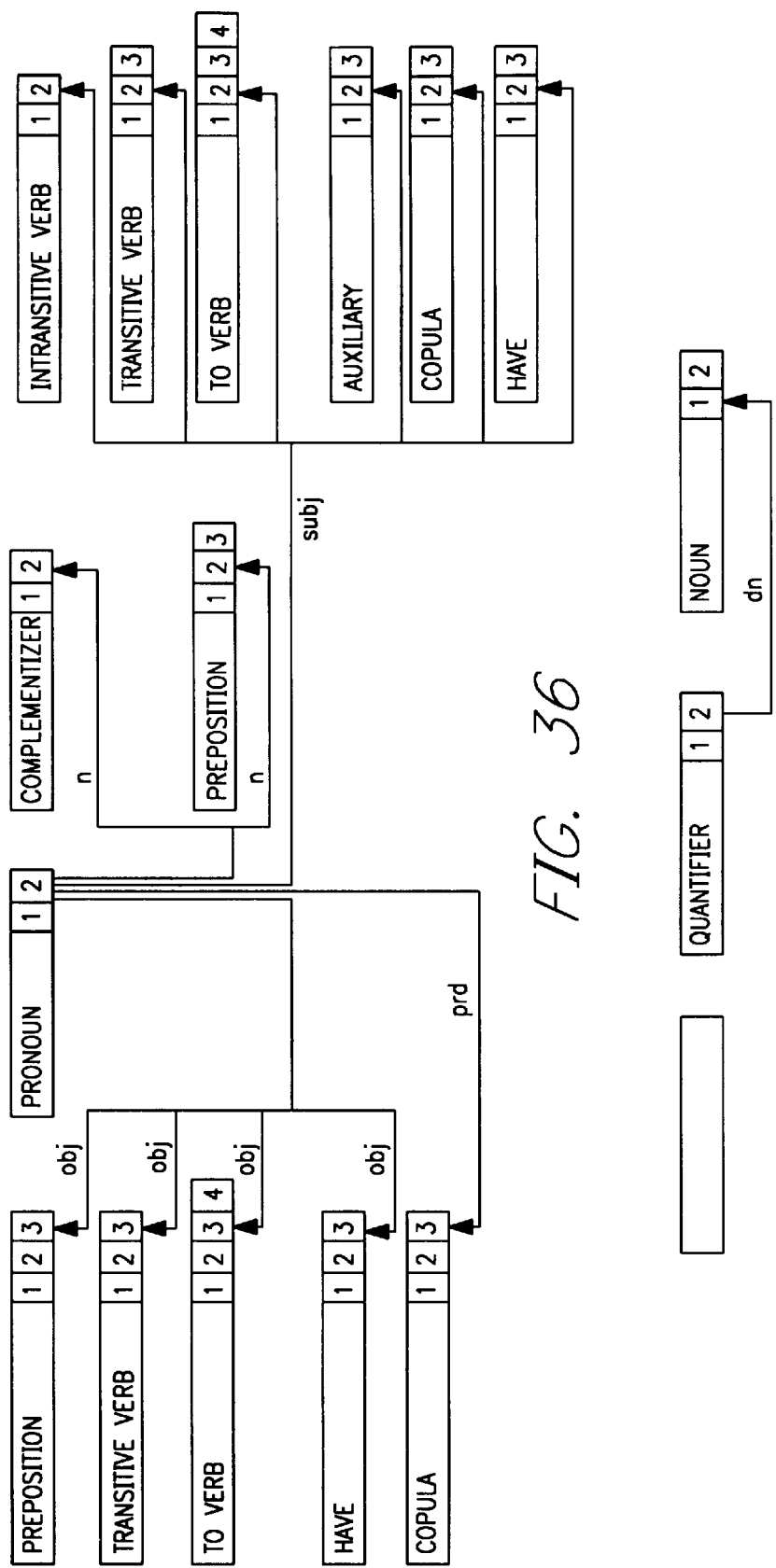
Figure 38:
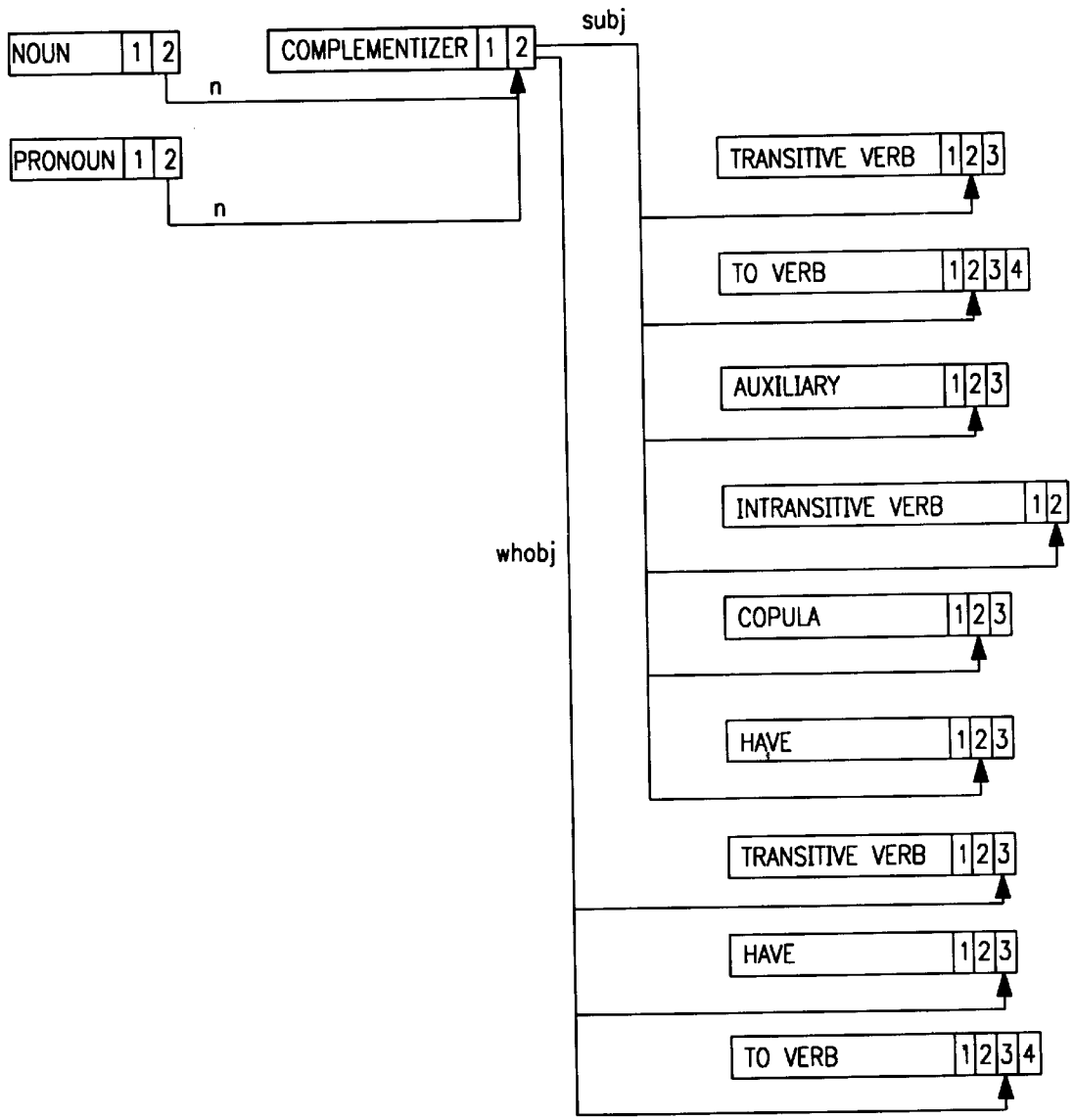
Figure 39:
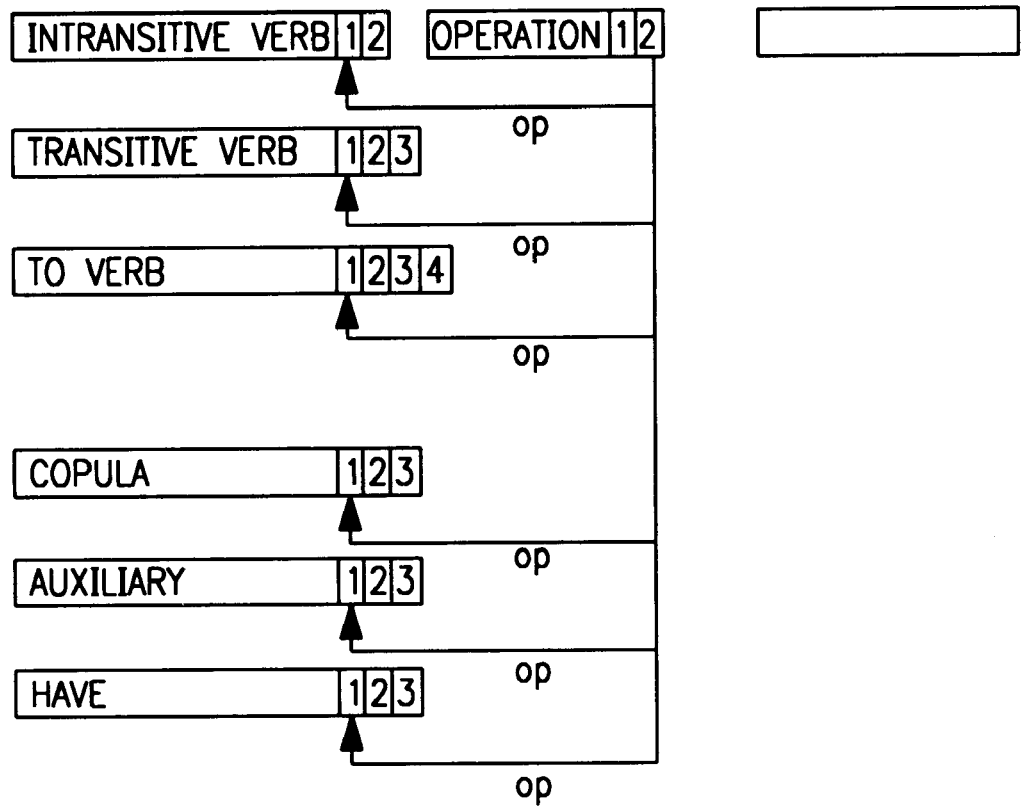

Transitive Verbs—FIG. 26

FIG. 26 shows that in the output language grammar of the present embodiment, a transitive verb may be immediately preceded by an auxiliary verb, "to", adverb or "have" which it qualifies by a link 462, 464, 466 or 470 between the first argument of its meaning and the last argument of the meaning of a word of each of those categories. A transitive verb is less immediately preceded by nouns, pronouns or complementizers which qualify the transitive verb by a link 476, 478, 480 from an argument of their meanings to the second argument of the meaning of the transitive verb. A transitive verb may be more distantly preceded by a second occurrence of an adverb which is qualified by a link 482 from the first argument of the meaning of the transitive verb to the last argument of the meaning of the adverb. A transitive verb may be most distantly preceded by a complementizer which qualifies the transitive verb by a link 484 from the second argument of the complementizer to the third argument of the meaning of the transitive verb.

As shown in FIG. 26, a transitive verb may be immediately followed by an operation which qualifies the transitive verb by a link 485 between its second argument and the first argument of the transitive verb. The transitive verb may then be followed by any noun or pronoun which qualify the verb by a link 486 between the third argument of the meaning of the transitive verb and the second argument of the meaning of words of those categories. A transitive verb will be most distantly followed by the prepositions or adverbs which it qualifies by a link 488 between the first argument of its meaning and the second argument of the meaning of the preposition or adverb. Inspection of Table 4 shows that when a transitive verb is processed the code "+v:va" together with the first argument, the code "–subj:vc" together with the second argument, the code "+va" together with the first argument and the code "–whobj" together with the third argument of the meaning of the transitive verb are stored in the left codes section of the node representing the transitive verb. The third column of Table 4 shows that the code "–op" together with the first argument, the code "–obj" together with the third argument and the code "+v" together with the first argument of the meaning of the transitive verb are stored in the right code section of the node for the transitive verb. Further inspection of Table 4 will show that corresponding codes are entered in the nodes for the categories of words which may be linked to a transitive verb and that the codes are listed in order of relative distance of those categories of words to the left or to the right of the transitive verb in the output language.

Inspection of the entry in Table 4 for a transitive verb shows that the left codes may, using the code "subj", match with the right codes derived from a node representing a noun, pronoun or complementizer. In processing the matched search codes the generator will use the ninth entry in Table 5 in which the third column instructs the generator to set the number entry of the nodes from which the matching codes were derived to be the same, to set the subject features entry of the node representing the transitive verb to be the same as the case entry of the node representing the noun and, if the case entry of the noun is accusative then set the verb form entry of the node representing the verb to "nonfinite(base)". If any of these operations are not possible then processing of the node forming the link is aborted and searching continues for an alternative matching code.

Processing of a transitive verb may also result in a match between a right code of the transitive verb and the left code of a noun or pronoun involving the code "obj". In this case the generator module 146 will reference the tenth entry in Table 5. The third column instructs the generator to set the case entry of the node representing the noun to the accusative". If this entry has already been set to something other than "accusative" then processing of the matched nodes is abandoned and searching continues for an alternative matching code.

Processing of a transitive verb may result in the matching of a left code of the transitive verb with an auxiliary verb, adverb or "have" using the code "v". In these cases, the generator will use the thirteenth, fourteenth and fifteenth entries accordingly in Table 5 for which the fourth columns instruct the generator to add the code derived from the transitive verb to the codes of the node representing the link between the matched nodes. There are no instructions in the third column of Table 5 to set or check any of the features of the matched nodes. Processing the transitive verb may result in the matching of a left code of the transitive verb with "to" using the code "v".

In this case the generator will use the eleventh entry in Table 5 in which the third column instructs the generator to set the verb form entry of the transitive verb to that defined in the requirement entry in the node representing to. There are no instructions in the fourth column of Table 5 to indicate that any search code should be added to the codes of the parent node.

Intransitive Verb—FIG. 27

FIG. 27 shows the relative positions defined by the output language grammar of the word categories which qualify and are qualified by intransitive verbs. In the case of intransitive verbs, these are similar to transitive verbs as shown in FIG. 26 except that the word categories in the second column to the right of the intransitive verb in FIG. 26 are omitted since these categories of words do not qualify an intransitive verb. In addition, a transitive verb is not qualified by a complementizer as indicated by the link 484 in FIG. 26. Accordingly, an intransitive verb may be followed by an operation which qualifies it by a link from the second argument of the operation to the first argument of the meaning of the intransitive verb and be more distantly followed by any preposition or adverb which the intransitive verb qualifies by a link from the first arguments of its meaning to the second arguments of the meaning of either of those word categories. Inspection of the entry in Table 4 for an intransitive verb shows that the appropriate codes are entered in the left and right code sections of a node representing an intransitive verb, those codes being listed in order of relative distance from the intransitive verb of those categories of words which may be linked to it.

Determiners—FIG. 28

FIG. 28 shows that in the output language grammar of the present embodiment, a determiner is immediately followed by any noun which it qualifies by a link 506 from the second argument of its meaning to the first argument of the meaning of the noun. Inspection of the entry in Table 4 for a determiner shows that the appropriate codes are entered in the left and right code sections of a node representing a determiner, those codes being listed in order of relative distance from the determiner of those categories of words which may be linked to it.

Adjectives—FIG. 29

FIG. 29 shows that in the present embodiment adjectives are immediately preceded by an intensifier or copula which the adjective qualifies by, in the case of an intensifier, a link 510 from the first argument of the meaning of the adjective to the second argument of the meaning of the intensifier, and in the case of a copula, a link 512 from the second argument of the meaning of the adjective to the third argument of the meaning of the copula. In addition, adjectives may be immediately followed by a noun which is qualified by the adjective by a link 514 from the second argument thereof to the second argument of the meaning of the noun. Inspection of the entries in Table 4 for each of these word categories will show that the appropriate codes are entered in the left and right codes for each respective category so that searches will result in the correct matches. Inspection of the entry in Table 4 for an adjective shows that the appropriate codes are entered in the left and right code sections of a node representing an adjective, those codes being listed in order of relative distance from the adjective of those categories of words which may be linked to it.

A match between the right codes of an intensifier and the left codes of an adjective involving the code "a" will result in the processor referencing the seventeenth entry in Table 5 in which the third column determines that the vowel entry of the adjective be set to that of the vowel entry of the node representing the intensifier.

FIGS. 30 to 39

Each of these Figures shows the relative positions of the remaining word categories to the words which they qualify or are qualified by. The way in which these word categories are processed will be clear from consideration of FIGS. 30 to 39 along with the contents of Tables 4 and 5.

The Verbaliser Module 148

The verbaliser module 148 is described above as being operable to perform two steps in response to a signal from the generator module 146. These two steps may be divided into the following six steps:

1. To receive a signal from the generator module 146 indicating that the generator module has completed the updating of the data structure 150 by creating a new fragment therein;
2. Accessing the data structure, identifying the new fragment;
3. Identifying each leaf node (i.e. a node representing a word rather than a link) in the new fragment in turn, taking the leftmost first;
4. For each leaf node identified in step 3 above utilising instructions and rules stored in Table 158 to determine the form that the word represented by the node should take in the output language;
5. Placing the form of the word determined in 4 above in the output buffer 160; and
6. Awaiting the next instruction from the generator module 146.

For the purpose of this description it will be assumed that the generator module 146 has signalled to the verbaliser module 148 that the data structure 150 has been updated and that the updated data structure comprises a single new fragment which is that shown diagrammatically in FIG. 40(*e*). The second step of the verbaliser module is to take each leaf node in turn starting with the leftmost first. Accordingly, with reference to FIG. 40(*e*), the verbaliser will process node 1 first followed by nodes 2, 3, 7, 4 and and for each node in turn, carry out steps 4 and 5 outlined above. In step 4 the verbaliser module references the output language morphological instructions held in Table 158, the contents of which are, in the present embodiment, represented by the following Table 6:

TABLE 6

Rule 1 - for determiners

If category is determiner then:-
  if definiteness is indefinite then
    if vowel feature is plus then set surface form to "an"
    if vowel feature is not set to plus then set surface form to "a"; and
  else if definiteness is definite or not set then set surface form to string.

Rule 2 - for nouns

If category is noun then:-
  if number is plural then
    if string is in the noun exception Table 2(a) then copy Table entry to surface form entry and output buffer else copy string + s to surface form entry and output buffer
  else if number is singular or not set then copy string to output buffer.

2a - noun exception table

| string | surface form |
|---|---|
| ox | oxen |

Rule 3 - for verb categories

If finite(var) <u>assume</u> finite(present)
If non-finite(var) <u>assume</u> non-finite(base)
If undefined/unknown <u>assume</u> finite(present)
and
If non-finite(base) copy string to output buffer else look-up in verb Table 3(a).

| 3a VERB TABLE string | finite(present) and singular | finite(present) and plural | finite(past) | nonfinite(past participle) |
|---|---|---|---|---|
| arrive | arrives | arrive | arrived | arrived |
| bark | barks | bark | barked | barked |
| die | dies | die | died | died |
| disappear | disappears | disappear | disappeared | disappeared |
| duck | ducks | duck | ducked | ducked |
| go | goes | go | went | gone |
| hear | hears | hear | heard | heard |
| jump | jumps | jump | jumped | jumped |
| laugh | laughs | laugh | laughed | laughed |
| look | looks | look | looked | looked |
| roar | roars | roar | roared | roared |
| run | runs | run | ran | run |
| walk | walks | walk | walked | walked |
| yawn | yawns | yawn | yawned | yawned |
| activate | activates | activate | activated | activated |
| change | changes | change | changed | changed |
| close | closes | close | closed | closed |
| cut | cuts | cut | cut | cut |
| deactivate | deactivates | deactivate | deactivated | deactivated |
| extinguish | extinguishes | extinguish | extinguished | extinguished |
| illuminate | illuminates | illuminate | illuminated | illuminated |
| lock | locks | lock | locked | locked |
| secure | secures | secure | secured | secured |
| see | sees | see | saw | seen |
| show | shows | show | showed | shown |
| turn | turns | turn | turned | turned |
| unlock | unlocks | unlock | unlocked | unlocked |
| will | will | will | — | — |
| would | would | would | — | — |
| persuade | persuades | persuade | persuaded | persuaded |
| promise | promises | promise | promised | promised |
| be | is | are | was | been |
| can | can | can | could | — |
| have | has | have | had | had |
| buy | buys | buy | bought | bought |

The verbaliser module 148 accesses the first part of Table 6 and utilises one of the three rules stored therein dependent on the category of the word being represented by the node currently being processed.

If the node currently being processed represents a determiner then the first rule is used and, accordingly, the verbaliser accesses the definiteness entry of the node and if the entry therein is "indefinite", the verbaliser accesses the vowel entry of the node and if the entry therein is "plus" then the word "an" will be placed in the output buffer 160. If however, the vowel entry is set to "minus" or not set then the word "a" will be placed in the output buffer 160. If the definiteness entry is set to definite then, instead, the surface form entry will be set to be the string entry and will be copied to the output buffer 160.

If the node currently being processed represents a noun then the verbaliser module 148 will use the second rule in the first part of Table 6 and access the number entry of the node. If the number entry is set to "plural" then the string entry is accessed and used to reference the third part of Table 6 herein termed the "noun table". If the string entry is matched in the first column of the noun table then the surface form entry of the node is set to the form indicated (as the plural form) in the second column of the noun table and then copied to the output buffer 160. If the "string" entry is not identified in the first column of the noun table then the surface form entry is set to the same as the string entry with the letter "s" added to it. The surface form entry is also copied to the output buffer 160. If, however, the number entry is not set or set to "singular" then the surface form entry is not set but the "string" feature is copied to the output buffer 160.

If the node currently being processed by the verbaliser represents a word from a verb category then the third rule of Table 6 is used by the verbaliser. In accordance with the third rule, the generator module accesses the verb form entry of the node and if the entry contained therein is not fully defined, i.e. either finite(var), non-finite(var) or undefined, then the verbaliser module assumes the value determined by the first three lines of rule 3. If the actual or assumed value is non-finite(base) then the string entry for that node is copied to the output buffer 160. However, if the verb form entry is set to, or assumed to be, some other value then sub-table 3a of Table 6 is accessed which, herein, is termed the verb table. The verb table is referenced by taking the string entry of the node and matching against the entries in the first column of the verb table and then using the verb form entry and accessing the second, third or fourth columns of the tables according to that entry to determine the appropriate form of the verb to be copied to the output buffer 160. The surface form entry of a node representing a verb is only set in the cases where the verb form is fully set i.e. the verbaliser has not had to assume its setting. This enables the verbaliser to save recalculating the surface form in cases where the node representing the verb is reprocessed, examples of which are explained in more detail later.

When each node is processed, the string entry is copied to the output buffer 160 and may be displayed on the display 108, printed on the printer 110 or supplied to the output speech interface 120. When the verbaliser has processed each node in the fragment in this manner then it awaits the next signal from the generator indicating that a further update has been made to the data structure 150.

The following continuation of Example 1 will more fully explain the operation of the generator module 146, the building up of the data structure 150 and the processing by the verbaliser module 148 of the data structure to produce output in the output buffer 160.

In this continuation of the example, it is assumed that the output language lexicon 152 is as set out in Table 3, Tables 154 and 156 contain the data set out in Tables 4 and 5 respectively and Table 158 contains the data set out in Table 6. The input meaning is as set out in Table C above which is repeated below for ease of reference and it is assumed that the data structure 150 is empty.

TABLE C the(900,901)
guard(901,902)
activate(912,902,909)
past(913,912)
the(904,905)
camera(905,909)
on(908,909,910)
the(911,914)
third(915,910)
floor(914,910)

When the dialogue manager 160 signals to the generator module 146 that the data has been entered in Table C, the generator module 146 accesses Table C and obtains the first meaning therein namely "the(900,901)". The generator then creates a new node, node 1, and stores the input meaning in feature (a) thereof and then accesses the output language lexicon 152 for the predicate "the" and stores the corresponding output language word category in feature (b) and the corresponding string in feature (c) of node 1. In addition, the output language lexicon 152 contains in the third column thereof a set instruction, to set the definiteness entry, feature (f) and accordingly "definite" is stored in that feature of node 2. The generator then accesses Table 154 to obtain the left and right codes for a node representing a determiner. The second column of Table 4 indicates that no codes are entered in the left codes entry of the new node 1. As a result of the entries in the third column of Table 4 the code "+dn/901" is stored in the right codes entry of node 1. New node 1 is then stored in the data structure 150 which at this point, contains only node 1 and therefore searches for matching codes in other nodes are not carried out. The contents of the data structure 150 are represented diagrammatically in FIG. 41(a) in which the circle with a number one inside represents node 1, the contents of which are as follows:

| Node: | 1 |
|---|---|
| Links: | — |
| Features: | |
| (a) meaning: | the(900,901) |
| (b) category: | determiner |
| (c) string: | the |
| (d) requirement: | |
| (e) case: | |
| (f) definiteness: | definite |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| | +dn/901 |

The generator 146 next processes the meaning "guard (901,902)", creating a new node, node 2, and storing the meaning in feature (a) thereof. The output language lexicon 152 indicates that the category of the output word which will represent the meaning is "noun" and the string is "guard" and these entries are stored in features (b) and (c) of new node 3 respectively. In addition, the output language lexicon 152 indicates in the third column that the entry "minus" should be stored in the vowel entry, feature (m). The generator then accesses the entry for nouns in Table 154 to obtain the left and right codes for new node 2. The second column of Table 3 indicates that the code "−an/902", "−dn/

901" and "+obj:prd/902" should be stored in the left codes and the codes "+n/902" and "+subj/902" should be stored in the right codes of node 2. The contents of node 2 are as follows:

| Node:            | 2            |
|------------------|--------------|
| Links:           | —            |
| Features:        |              |
| (a) meaning:     | guard (901,902) |
| (b) category:    | noun         |
| (c) string:      | guard        |
| (d) requirement: |              |
| (e) case:        |              |
| (f) definiteness: |             |
| (g) gender:      |              |
| (h) number:      |              |
| (i) surface form: |             |
| (j) subject features: |         |
| (k) verb chain:  |              |
| (l) verb form:   |              |
| (m) vowel:       | minus        |
| Left codes:      | Right codes  |
| −an/902          | +n/902       |
| −dn/901          | +subj/902    |
| +obj:prd/902     |              |

As described above, the creation of a new node initiates a search for nodes in the data structure 150 which have codes which match those of the new node. The first search is for the code "−an/902" and the generator first looks at the right codes of the most recently processed node in the data structure 150, namely node 1. It will be seen from the inspection of the codes of node 1 that there is no matching code therein. Accordingly, the generator module takes the next search code in the list of left search codes of node 2 "−dn/901" and, again, searches for a matching code in the right codes of node 1 where a match is found. Accordingly, the generator 148 creates a new node, node 3, to represent the link between nodes 1 and 2. The fact that a code from the right codes of node 1 has matched a code from the left codes of node 2 indicates that node 2 should be placed to the right of node 1 in the data structure and, accordingly, the link between these nodes is represented in the links entry of new node 3 by the storage therein of the entry "1+2".

Node 1 represents a determiner and node 2 represents a noun and accordingly the generator accesses the corresponding entry in Table 156 to obtain the instructions for generating the left and right codes of new node 3. There are no special instructions in the fourth column of Table 5 and accordingly the generator module creates the codes for new node 3 by copying the left codes of node 1 into the left codes of new node 3 along with an indication of the node from which the code was derived i.e. "from node 1", followed by the left codes from node 2 starting at the code after the matched code. The right codes of new node 3 are created by copying the right codes of node 2 followed by the right codes of node 1, starting at the code after the matched code. Since there are no codes after the matched code in the right codes of node 1, none are copied in this case. Additionally, the third column of Table 5 instructs the generator to set the vowel entries, feature (m) of each of the matched nodes to be the same and accordingly, since the vowel feature of node 2 is already set to "minus", the same entry is stored in the vowel feature of node 1.

Figure 41I:
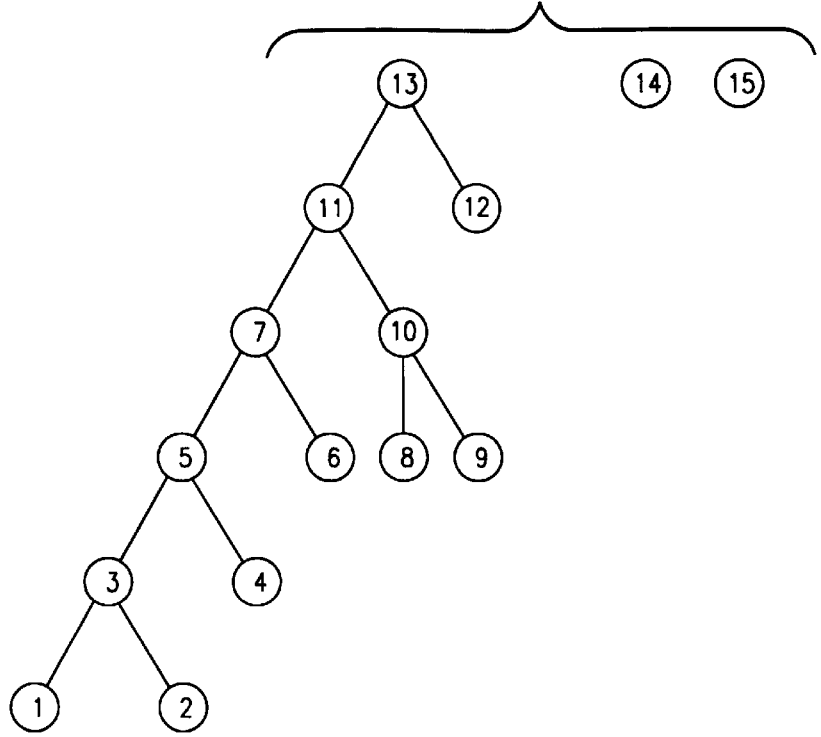

Nodes 1 and 2 are now linked together by new node 3, the three nodes forming a fragment in the data structure, which may be represented diagrammatically as shown in FIG. 41(b). The contents of new node 3 are as follows:

| Node:            | 3            |
|------------------|--------------|
| Links:           | 1 + 2        |
| Features:        |              |
| (a) meaning:     |              |
| (b) category:    |              |
| (c) string:      |              |
| (d) requirement: |              |
| (e) case:        |              |
| (f) definiteness: |             |
| (g) gender:      |              |
| (h) number:      |              |
| (i) surface form: |             |
| (j) subject features: |         |
| (k) verb chain:  |              |
| (l) verb form:   |              |
| (m) vowel:       |              |
| Left codes:      | Right codes: |
| +obj:prd/902 from node 2 | +n/902 from node 2 |
|                  | +subj/902 from node 2 |

Since the data structure now comprises a single fragment no further searches are carried out and the generator module 146 accesses Table C and obtains the next meaning therein namely "activate(912,902,909)". The generator then creates a new node, node 4, and stores the input meaning in feature (a) thereof and then accesses the output language lexicon 152 for the predicate "activate" and stores the corresponding output language word category in feature (b) and the corresponding string in feature (c) of new node 4. The generator then accesses Table 154 to obtain the left and right search codes for a node representing a transitive verb. The second column of Table 4 indicates that the first left code "+v:va" should be associated with the value assigned to the first argument of the meaning of the transitive verb, the second left code "−subj:vc" should be associated with the value of the second argument, the third left code "+va" should be associated with the value of the first argument and the fourth left code "−whobj" should be associated with the value of the third argument of the meaning of the transitive verb. Accordingly, the codes "+v:va/912", "−subj:vc/902", "+va/912" and "−whobj/909" are entered in the left codes entry of new node 4. Similarly, as a result of the entries in the third column of Table 4, the codes "−op/912", "−obj/909" and "+v/912" are stored in the right codes entry of new node 4. The contents of node 4 are as follows:

| Node:            | 4                   |
|------------------|---------------------|
| Links:           | —                   |
| Features:        |                     |
| (a) meaning:     | activate(912,902,909) |
| (b) category:    | transitive verb     |
| (c) string:      | activate            |
| (d) requirement: |                     |
| (e) case:        |                     |
| (f) definiteness: |                    |
| (g) gender:      |                     |
| (h) number:      |                     |
| (i) surface form: |                    |
| (j) subject features: |                |
| (k) verb chain:  |                     |
| (l) verb form:   |                     |
| (m) vowel:       |                     |
| Left codes:      | Right codes:        |
| +v:va/912        | −op/912             |
| −subj:vc/902     | −obj/909            |
| +va/912          | +v/912              |
| −whobj/909       |                     |

Creation of the new node initiates a search for nodes in the data structure 150 which have codes which match those of the new node. The generator takes the left codes of node 4 starting with the code at the top of the list and inspects the right codes of the latest processed node, node 3 for a matching code. It will be seen from inspection of the left codes of node 4 and the right codes of node 3 that a match will be found between the second left code of node 4 and the second right code of node 3. Accordingly, the generator 148 creates a new node, node 5 to represent the link found between nodes 3 and 4. The fact that a right code of node 3 matched a left code of node 4 indicates that node 3 should be placed to the left of node 4 in the data structure and accordingly the entry "3+4" is entered in the links entry of new node 5. The matched code in node 3 was derived from node 2 which represents a noun and node 4 represents a transitive verb and accordingly the generator accesses the corresponding entry in Table 156 to obtain instructions for generating the contents of new node 5. Since the entry involved the code "subj" the ninth entry in Table 5 is applicable which, in the third column of Table 5, instructs the generator to set the number entry of each node to be the same, the subject entry of the node representing the verb to be the same as the case entry of the node representing the noun and, if the said case entry is "accusative" then to set the verb form entry of the node representing the verb to "non-finite(base)".

The generator then creates the codes for new node 5 by copying the left codes of node 3 into the left codes of node 5 followed by a copy of the left nodes of node 4 starting after the matched code. Similarly the right codes for node 5 are created by copying the right codes from node 4 followed by the right codes of node 3 starting after the matched code.

Accordingly, node 4 has been linked to the previous fragment contained in the data structure 150, by node 5, forming a new fragment in the data structure which is represented diagrammatically in FIG. 41(c). The contents of node 5 are as follows:

| Node: | 5 |
|---|---|
| Links: | 3 + 4 |
| Features: | |
| (a) meaning: | |
| (b) category: | |
| (c) string: | |
| (d) requirement: | |
| (e) case: | |
| (f) definiteness: | |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| +obj:prd:/902 from node 2 | −op/912 from node 4 |
| +va/912 from node 4 | −obj/909 from node 4 |
| −whobj/909 from node 4 | +v/912 from node 4 |

Since all the nodes have been linked together into one fragment, no further searches can be carried out and accordingly the generator takes the next meaning "past(913,912)" from Table C and creates a new node, node 6, entering the meaning in feature (a) thereof. The generator 146 then refers to the output language lexicon 152 and obtains the output language word category "operation" and the string "past" and enters them in feature (b) and (c) respectively of new node 6. The generator 146 then refers to Table 154 to obtain the search codes for a node representing an operation and accordingly enters the code "+op/912" in the left codes and no code in the right codes of new node 6. The generator then initiates a search for a code which matches the only left code of node 6 and searches first in the right codes of the most recently processed node in the current fragment, node 5. It will be seen from inspection of the right codes of node 5 that a match exists with the first code therein and accordingly the generator creates a new node, node 7 to represent the link between the matched nodes. The new node 7 has the entry "5+6" entered in its links entry indicating the nodes which it links and that node 5 should be placed to the left of node 6 in the data structure 150. The matched code in node 5 was derived from node 4 which represents a transitive verb and node 6 represents an operation and, since the matched code included the code "op", the sixteenth entry in Table 5 is used by the generator to process the matched nodes. The third column of Table 5 instructs the generator to set the verb form entry of the node representing the verb i.e. node 4 to that defined by the requirement entry in node 6. Accordingly, the feature (1) of node 4 is set to "finite(past)" and additionally the surface form entry of the node representing the operation is set to a blank.

The search codes for node 7 are then generated by copying the left codes of node 5 into the left codes of node 7 and the right codes, starting after the matched code, from node 5 into the right codes of node 7. Accordingly, new node 6 has been linked to the current fragment in the data structure 150 by node 7 and the contents of the data structure at this point are represented diagrammatically in FIG. 41(d). The contents of nodes 6 and 7 are as follows:

| Node: | 6 |
|---|---|
| Links: | — |
| Features: | |
| (a) meaning: | past(913,912) |
| (b) category: | operation |
| (c) string: | (past) |
| (d) requirement: | finite(past) |
| (e) case: | |
| (f) definiteness: | |
| (g) gender: | |
| (h) number: | |
| (i) surface form: | blank |
| (j) subject features: | |
| (k) verb chain: | |
| (l) verb form: | |
| (m) vowel: | |
| Left codes: | Right codes: |
| +op/912 | |
| Node: | 7 |
| Links: | 5 + 6 |
| Features: | |
| (a) meaning: | |
| (b) category: | |
| (c) string: | |
| (d) requirement: | |
| (e) case: | |
| (f) definiteness: | |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| +obj:prd/902 from node 2 | −obj/909 from node 4 |
| +va/912 from node 4 | +v/912 from node 4 |
| −whobj/909 from node 4 | |

Since all the nodes have been linked together into one fragment, no further searches can be carried out and, therefore, the generator takes the next meaning "the(904, 905)" from Table C and creates a new node, node 8, entering the meaning in feature (a) thereof. The generator 146 then refers to output language lexicon 152 and obtains the output language word category "determiner" and the string "the"

and enters them into features (b) and (c) respectively and in addition sets the definiteness entry to "definite" in accordance with the set instruction in the third column of Table 152. The generator 146 then refers to Table 154 to obtain the search codes for a node representing a determiner and accordingly enters the code "+dn/905" in the right codes of node 8. Node 8 is now complete and the creation of this node initiates a search for a code which matches the first left code. Since node 8 has no left codes then the search begins with the first and only right code "+dn/905". It will be clear from inspection of the left codes of each node of the current fragment in the data structure that no match exists for the first right code of node 8 and accordingly node 8 is stored in the data structure 150 which, at this point, contains two fragments and is represented diagrammatically in FIG. 41(e). The contents of node 8 are as follows:

```
Node:                    8
Links:                   —
Features:
   (a) meaning:          the(904,905)
   (b) category:         determiner
   (c) string:           the
   (d) requirement:
   (e) case:
   (f) definiteness:     definite
   (g) gender:
   (h) number:
   (i) surface form:
   (j) subject features:
   (k) verb chain:
   (l) verb form:
   (m) vowel:
Left codes:              Right codes:
                         +dn/905
```

The generator then accesses the next meaning in Table C namely "camera(905,909)" and creates a new node, node 9, entering the meaning in feature (a) thereof. The generator 146 then refers to the output lexicon 152 and in accordance with the entry therein enters "noun" in the category entry, "camera" in the string entry and sets the vowel entry to "minus". The generator then refers to Table 154 to obtain the search codes and accordingly enters the codes "−an/909", "−dn/905" and "+obj:prd/909" in the left codes of node 9 and the codes "+n/909" and "+subj/909" in the right codes thereof. The creation of the new node initiates a search for matching codes starting with the first left code of new node 9 and searching the right code of the latest processed fragment, which in this case, is node 8. Inspection of the left codes of node 9 and the right codes of node 8 shows that a match exists between the second left code of node 9 and the only right code of node 8. Accordingly, the generator creates a new node, node 10 to represent a link between the matched nodes 8 and 9 and the generator then stores the entry "8+9" in the links entry of new node 10 accordingly. Since node 8 represents a determiner and node 9 represents a noun the generator uses the first entry in Table 5 in its processing of the matched nodes and in accordance with the instructions therein sets the vowel entries of each node to be the same. Since the vowel entry of node 9 is already set to "minus" then the vowel feature of node 8 is set to the same. The generator then creates the search codes for new node 10 by copying the left codes of node 9 starting after the matched code into the left codes of node 10 and copying the right codes of node 9 into the right codes of node 10. At this point, the state of the data structure 150 is represented diagrammatically in FIG. 41(f)(i) in which it will be seen that the data structure comprises two fragments. The contents of nodes 9 and 10 are as follows:

```
Node:                    9
Links:                   —
Features:
   (a) meaning:          camera(905,909)
   (b) category:         noun
   (c) string:           camera
   (d) requirement:
   (e) case:
   (f) definiteness:
   (g) gender:
   (h) number:
   (i) surface form:
   (j) subject features:
   (k) verb chain:
   (l) verb form:
   (m) vowel:            minus
Left codes:              Right codes:
−an/909                  +n/909
−dn/905                  +subj/909
+obj:prd/909
Node:                    10
Links:                   8 + 9
Features:
   (a) meaning:
   (b) category:
   (c) string:
   (d) requirement:
   (e) case:
   (f) definiteness:
   (g) gender:
   (h) number:
   (i) surface form:
   (j) subject features:
   (k) verb chain:
   (l) verb form:
   (m) vowel:
Left codes:              Right codes:
+obj:prd/909 from node 9 +n/909 from node 9
                         +subj/909 from node 9
```

The creation of new node 10 initiates a search for another node with which it may link. The only left code of node 10 is inspected and a search carried out in the most recently processed fragment, starting with the top node thereof, node 7. It will be seen from inspection of the right codes of node 7 that a match exists between the code "−obj/909" derived from node 4 and the left code "+obj:prd/909" derived from node 9 which is the left code of node 10. Accordingly, the generator creates a new node, node 11 with the entry "7+10" stored in the links entry thereof to indicate that node 7 is linked to node 10 with node 7 being placed to the left of node 10 in the data structure 150. Since the matched code in node 7 was derived from node 4 which represents a transitive verb and the matched code in node 10 was derived from node 9 which represents a noun and the codes matched included search code letters "obj" then the generator references the tenth entry in Table 5 to obtain instructions for the further processing of the matched nodes. In accordance with the third column of Table 5 the generator sets the case entry of the node representing the noun, node 9, to "accusative". The search codes for new node 11 are then created by copying the left codes of node 7 into the left codes of node 11 and copying the right codes of node 10 followed by the right code of node 7 after the matched code into the right codes of node 11. Processing of node 11 is then complete at this point and the data structure 150 contains a single fragment which is shown diagrammatically in FIG. 41(f)(ii). The contents of node 11 are as follows:

| | |
|---|---|
| Node: | 11 |
| Links: | 7 + 10 |
| Features: | |
| (a) meaning: | |
| (b) category: | |
| (c) string: | |
| (d) requirement: | |
| (e) case: | |
| (f) definiteness: | |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| +obj:prd/902 from node 2 | +n/909 from node 9 |
| +va/912 from node 4 | +subj/909 from node 9 |
| −whobj/909 from node 4 | +v/912 from node 4 |

Since all the nodes have been linked together into one fragment, no further searches can be carried out and accordingly the generator takes the next meaning "on (908,909, 910)" from Table C and creates a new node, node 12 entering the meaning in feature (a) thereof. The generator 146 then refers to the output language lexicon 152 and obtains the output language word category "preposition" and the string "on" and enters them into the features (b) and (c) respectively of new node 12. The generator 146 then refers to table 154 to obtain the search codes for a node representing a preposition and accordingly enters the code "−n:v/909" in the left codes and "−obj/910" in the right codes of new node 12. New node 12 is now complete and has the following contents:

| | |
|---|---|
| Node: | 12 |
| Links: | — |
| Features: | |
| (a) meaning: | on (908,909,910) |
| (b) category: | preposition |
| (c) string: | on |
| (d) requirement: | |
| (e) case: | |
| (f) definiteness: | |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| −n:v/909 | −obj/910 |

Figure 41J:
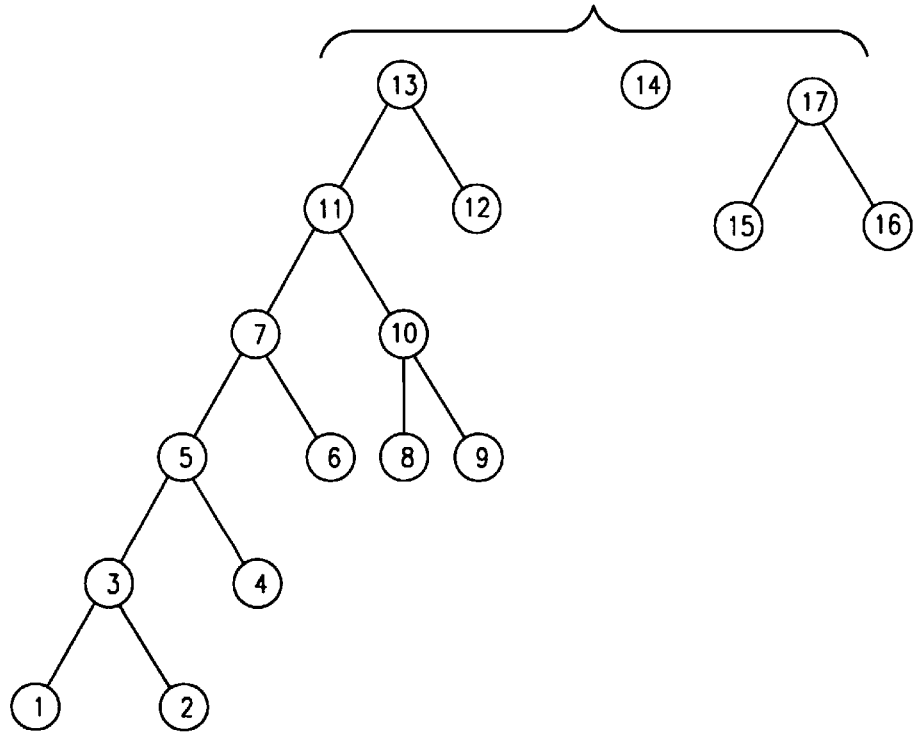

The creation of new node 12 initiates a search for a code which matches the first left code "−n:v/909" of the new node, starting at the right codes of the top node, node 11 of the latest created fragment in the data structure 150. Inspection of the right codes of node 11 shows that the first right code "+n/909" matches the first left code of new node 12 and accordingly the generator creates a new node, node 13 to form a link between the matched nodes 11 and 12. The new node 13 has the entry "11+12" entered in its links entry to indicate the nodes which it links and that node 11 should be placed to the left of node 12. Node 12 represents a preposition and the matched code in node 11 is derived from node 9 which represents a noun and the matched code included the code "n". Accordingly, the generator uses the last entry in Table 5 which instructs no special processing of the matched codes. The codes of new node 13 are then created by copying first the left codes of node 11 followed by the left codes of node 12 excluding the matched code into the left codes of new node 13 and then copying the right codes of node 12 followed by the right codes, excluding the matched code, from node 11 into the right codes of node 13. Since all nodes are now contained in this single fragment, no further searching is carried out and the fragment contained at this point in data structure 150 is shown diagrammatically in FIG. 41(*g*). The contents of node 13 are as follows:

| | |
|---|---|
| Node: | 13 |
| Links: | 11 + 12 |
| Features: | |
| (a) meaning: | |
| (b) category: | |
| (c) string: | |
| (d) requirement: | |
| (e) case: | |
| (f) definiteness: | |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| +obj:prd/902 from node 2 | −obj/910 from node 12 |
| +va/912 from node 4 | +n/909 from node 9 |
| −whobj/909 from node 4 | +subj/909 from node 9 |
| | +v/912 from node 4 |

The generator module 146 then takes the next meaning from Table C "the (911,914)" and creates a new node, node 14, storing the meaning in feature (a) thereof. The generator then references the output language lexicon 154 to obtain the output language word category and the string "the" for entry into features (b) and (c) respectively of new node 14. The generator then references the entry for determiners in Table 4 and as a result, enters no codes in the left codes of node 14 and the code "+dn/914" in the right codes of node 14. Since node 14 contains no left code then the first right code is taken and a search is carried out in the left codes of each node of the fragment contained in data structure 150, starting with node 13 and proceeding to node 12 and then to nodes 11, 10, 9, 8, 7, 6, 5, 4, 3, 2 and 1, finding no match. The current processing of node 14 is therefore complete and it is stored unlinked, in the data structure 150, the contents thereof being represented diagrammatically in FIG. 41(*h*). The contents of node 14 are as follows:

| | |
|---|---|
| Node: | 14 |
| Links: | — |
| Features: | |
| (a) meaning: | the(911,914) |
| (b) category: | determiner |
| (c) string: | the |
| (d) requirement: | |
| (e) case: | |
| (f) definiteness: | definite |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| | +dn/914 |

The generator module 146 then takes the next meaning "third (915,910)" from Table C and stores it in the meaning entry of a new node, node 15. The generator then references the output language lexicon 152 for the entry corresponding to the predicate of the meaning stored in feature (a) and obtains therefrom the output language word category "adjective" and the string "third" and stores them in features (b) and (c) respectively. In addition, as seen from the third column of Table 3 the output language lexicon also contains a set command to store "minus" in the vowel entry. The generator then references table 154 for the entry relating to adjectives and, in accordance with the second column of Table 5 inserts the codes "+a/915" and "+prd/910" into the left codes of new node 15 and, in accordance with the third column of Table 4 stores the code "+an/910" in the right codes of new node 15. The generator then takes the left codes of node 15 and, starting with node 14 inspects the right codes of that node in an attempt to find a matching code. No matching code exists in the right codes of node 14 and therefore the generator moves to the left codes of node 14 and, again, finds no matching code. The generator then moves to the top node of the next most recently processed fragment, node 13 and compares the left codes of node 15 against the right codes of node 13 finding no match and then the right codes of node 15 against the left codes of node 13, again, finding no match. The generator proceeds in this manner with node 12, 11, 10, 9, 8, 7, 6, 5, 4, 3, 2 and 1 finding no match. Accordingly, no linking occurs between the new node 15, node 14 or the fragment containing nodes 1 to 13 and the new node 15 is stored in the data structure which is represented diagrammatically at this point by FIG. 41(j). The contents of node 15 are as follows:

| | | |
|---|---|---|
| Node: | 15 | |
| Links: | — | |
| Features: | | |
| (a) meaning: | third(915,910) | |
| (b) category: | adjective | |
| (c) string: | third | |
| (d) requirement: | | |
| (e) case: | | |
| (f) definiteness: | | |
| (g) gender: | | |
| (h) number: | | |
| (i) surface form: | | |
| (j) subject features: | | |
| (k) verb chain: | | |
| (l) verb form: | | |
| (m) vowel: | | |
| Left codes: | Right codes: | |
| +a/915 | +an/910 | |
| +prd/910 | | |

The generator then takes the last meaning from Table C, namely "floor(914,910)" and creates a new node, node 16, inserting the new meaning in feature (a) thereof. The generator then references the output language lexicon 152 to obtain the output language word category "noun" and the string "floor" and enters them into features (b) and (c) respectively. In addition, the entry in the output language lexicon 152 for the meaning "floor" has, in the third column of the table, a set command to store the entry "minus" in the vowel entry, feature (m) of new node 16. The generator then references the entry for nouns in Table 4 to establish the codes to be inserted in new node 10, the second column determining that the codes "−an/910", "−dn/914" and "+obj:prd/910" are stored in the left codes of node 16 whilst the codes "+n/910" and "+subj/910" are stored in the right codes thereof. The generator then begins searching taking the left codes and searching the right codes of node 15 for a match which, inspection of the right codes of node 15 will show is present. Accordingly, a new node 17 is formed which creates a link between nodes 15 and 16 having stored in its links entry "15+16" indicating that node 15 should be placed to the left of node 16. Node 15 represents an adjective and node 16 represents a noun and the matched code was "an" and accordingly the generator refers to the third entry in Table 4, the fourth column of which instructs the generator to add the matched code from node 16 to node 17. The generator creates the codes for new node 17 by copying into its left codes firstly the left codes of node 15 followed by the left codes of node 16 including the matched code since it must be added as defined by the fourth column of Table 5. The right codes of node 17 are created by copying the right codes of node 16 and none from node 15 since the only right code which is present is the matched code. The data structure now comprises three fragments as shown diagrammatically in FIG. 41(j)(i). At this point, the contents of nodes 16 and 17 are as follows:

| | |
|---|---|
| Node: | 16 |
| Links: | — |
| Features: | |
| (a) meaning: | floor(914,910) |
| (b) category: | noun |
| (c) string: | floor |
| (d) requirement: | |
| (e) case: | |
| (f) definiteness: | |
| (g) gender: | |
| (h) number: | |
| (i) surface form: | |
| (j) subject features: | |
| (k) verb chain: | |
| (l) verb form: | |
| (m) vowel: | minus |
| Left codes: | Right codes: |
| −an/910 | +n/910 |
| −dn/914 | +subj/910 |
| +obj:prd/910 | |
| Node: | 17 |
| Links: | 15 + 16 |
| Features: | |
| (a) meaning: | |
| (b) category: | |
| (c) string: | |
| (d) requirement: | |
| (e) case: | |
| (f) definiteness: | |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| +a/915 from node 15 | +n/910 from node 16 |
| +prd/910 from node 15 | +subj/910 from node 16 |
| −an/910 from node 16 | |
| −dn/914 from node 16 | |
| +obj:prd/910 from node 16 | |

The generator module 146 then takes the left codes of new node 17 and begins searching the codes of the nodes of each of the other fragments starting with node 14 from the most recently processed fragment. It will be clear from the inspection of the right codes of node 14 that a match exists between the fourth left code of node 17 and the first right code of node 14. A new node, node 18 is created having the entry "14+17" in its links entry thereby indicating that the node 14 is linked to node 17 with node 14 being placed to the left of node 17 in the data structure 150. Node 14 represents a determiner and the matched code in node 17 was derived from node 16 which represents a noun and the match involved the code "dn". Accordingly, the third column of the first entry in Table 5 is referenced which indicates that the vowel feature of the nodes from which the matched codes were derived should be set to the same value and, since the vowel entry of node 16 from which the matched code from node 17 was derived is set to "minus" then the vowel entry of node 14 is set to "minus". The left codes of node 14 are empty and therefore the left codes for new node 18 are created by copying the left codes of node 17 from the point in the list of codes after which the match was made and therefore only one code "+obj:prd/910 from node 16" is copied. The right codes of node 18 are created by copying the right codes of node 17 "+n/910 from node 16" and "+subj/910 from node 16" to the right codes of node 18. At this point in the processing the data structure 150 comprises two fragments which are shown diagrammatically in FIG. 41(*j*)(ii) and the content of node 18 is as follows:

| Node: | 18 |
|---|---|
| Links: | 14 + 17 |
| Features: | |
| (a) meaning: | |
| (b) category: | |
| (c) string: | |
| (d) requirement: | |
| (e) case: | |
| (f) definiteness: | |
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| +obj:prd/910 from node 16 | +n/910 from node 16 |
| | +subj/910 from node 16 |

The creation of the new node 19 initiates a search for a code which matches the first left code of that new node. The right codes of node 13 are searched first and a match found with the first code therein. A new node 19 is created which has in its links entry the entry "13+18" indicating that the node 13 should be placed to the left of the node 18 in the data structure 150. The matched code in node 13 was derived from node 12 which represents a preposition and the matched code in node 18 was derived from node 16 which represents a noun and the code involved in the match was "obj". Accordingly, the tenth entry in Table 5 is used by the generator to process the matched codes and the fourth column of this entry contains no instructions. The third column of this entry instructs the generator to set the case entry of the node representing the noun to "accusative". Accordingly, the new codes for new node 19 are generated by copying the left codes from node 13 and none from node 18, since the only code which is present is the matched code. The right codes of new node 19 are created by copying the right codes of node 18 followed by the right codes of node 13 after the point at which the match was made, into the right codes of new node 19. The data structure 150 now comprises a single fragment as shown in FIG. 41(*j*)(iii) and accordingly no further searches are carried out. The contents of node 19 are as follows:

| Node: | 19 |
|---|---|
| Links: | 13 + 18 |
| Features: | |
| (a) meaning: | |
| (b) category: | |
| (c) string: | |
| (d) requirement: | |
| (e) case: | |

-continued

| (f) definiteness: | |
|---|---|
| (g) gender: | |
| (h) number: | |
| (i) surface form: | |
| (j) subject features: | |
| (k) verb chain: | |
| (l) verb form: | |
| (m) vowel: | |
| Left codes: | Right codes: |
| +obj:prd/902 from node 2 | +n/910 from node 16 |
| +va/912 from node 4 | +subj/910 from node 16 |
| −whobj/909 from node 4 | +n/909 from node 9 |
| | +subj/909 from node 9 |
| | +v/912 from node 4 |

The processing of the meanings in Table C by the generator module 146 is now complete. At this point, the generator module may signal to the verbaliser module that the data structure 150 has been updated.

The verbaliser module starts processing the data structure 150 by finding the leftmost leaf node, node 1. The verbaliser then uses the entry in feature (b) to reference the output language morphological instructions in Table 158. Node 1 represents a determiner as defined in feature (b) thereof and accordingly the verbaliser module uses the first rule in Table 6. Since feature (f) contains the entry "definite" then in accordance with the rule, the string "the" is copied to the output buffer 160. At this point in the processing the contents of node 1 are as follows:

| Node: | 1 |
|---|---|
| Links: | — |
| Features: | |
| (a) meaning: | the(900,901) |
| (b) category: | determiner |
| (c) string: | the |
| (d) requirement: | |
| (e) case: | |
| (f) definiteness: | definite |
| (g) gender: | |
| (h) number: | |
| (i) surface form: | |
| (j) subject features: | |
| (k) verb chain: | |
| (l) verb form: | |
| (m) vowel: | minus |
| Left codes: | Right codes: |
| | +dn/901 |

The verbaliser module then moves to the next leaf node, node 2. This node represents a noun and accordingly the second rule in Table 6 is used by the verbaliser. Since the number entry of node 2 is not set the verbaliser copies the string entry to the output buffer 160. At this point in the processing, the contents of node 2 are as follows:

| Node: | 2 |
|---|---|
| Links: | — |
| Features: | |
| (a) meaning: | the(901,902) |
| (b) category: | noun |
| (c) string: | guard |
| (d) requirement: | |
| (e) case: | |
| (f) definiteness: | |
| (g) gender: | |
| (h) number: | |
| (i) surface form: | |
| (j) subject features: | |
| (k) verb chain: | |

-continued

|  |  |
|---|---|
| (l) verb form: | |
| (m) vowel: | minus |
| Left codes: | Right codes: |
| −an/902 | +n/902 |
| −dn/901 | +subj/902 |
| +obj:prd/902 | |

The verbaliser then moves to the next leaf node to the right of the last processed node, namely node 4. Node 4 represents a transitive verb and accordingly, the third rule part of Table 6 is used to determine the form of the words to be placed in the output buffer 160. In accordance with the third rule, since the verb form entry of node 4 is set to "finite(past)", the verbaliser references the verb table using the entry in the string entry to reference the fourth column thereof. It will be seen from inspection of the verb table that the fourth column defines the surface form for the present node as "activated". The verbaliser copies this entry into the surface form entry and also to the output buffer 160. The processing of node 4 is now complete and at this point the contents are as follows:

|  |  |
|---|---|
| Node: | 4 |
| Links: | — |
| Features: | |
|   (a) meaning: | activate (912,902,909) |
|   (b) category: | transitive verb |
|   (c) string: | activate |
|   (d) requirement: | |
|   (e) case: | |
|   (f) definiteness: | |
|   (g) gender: | |
|   (h) number: | |
|   (i) surface form: | activated |
|   (j) subject features: | |
|   (k) verb chain: | |
|   (l) verb form: | finite(past) |
|   (m) vowel: | |
| Left codes: | Right codes: |
| +v:va/912 | −op/912 |
| −subj:vc/902 | −obj/909 |
| +v/912 | +v/912 |
| −whobj/909 | |

The verbaliser then moves to the next leaf node to the right of the last processed node, namely node 6. Node 6 represents an operation as defined in feature (b) thereof. As described above, operations are, in the present embodiment, used to determine the tense of a verb which the operation qualifies and therefore a node representing an operation does not represent a word in the output language in the present embodiment. Accordingly, no entry should be made in the output buffer 160 as a result of the processing of the present node. The verbaliser carries out no further processing of node 6, the contents of which are unchanged and as set out below:

|  |  |
|---|---|
| Node: | 6 |
| Links: | — |
| Features: | |
|   (a) meaning: | past(913,912) |
|   (b) category: | operation |
|   (c) string: | (past) |
|   (d) requirement: | finite(past) |
|   (e) case: | |
|   (f) definiteness: | |
|   (g) gender: | |
|   (h) number: | |
|   (i) surface form: | blank |

-continued

|  |  |
|---|---|
| (j) subject features: | |
| (k) verb chain: | |
| (l) verb form: | |
| (m) vowel: | |
| Left codes: | Right codes: |
| +op/912 | |

The verbaliser then moves to the next leaf node to the right of the last processed node, namely node 8. Node 8 represents a determiner as defined in feature (b) thereof and accordingly the verbaliser module uses the first rule in Table 6. Since feature (f) contains the entry "definite" then in accordance with the rule the string "the" is copied to the output buffer 160. At this point in the processing the contents of node 8 are as follows:

|  |  |
|---|---|
| Node: | 8 |
| Links: | — |
| Features: | |
|   (a) meaning: | the(904,905) |
|   (b) category: | determiner |
|   (c) string: | the |
|   (d) requirement: | |
|   (e) case: | |
|   (f) definiteness: | definite |
|   (g) gender: | |
|   (h) number: | |
|   (i) surface form: | |
|   (j) subject features: | |
|   (k) verb chain: | |
|   (l) verb form: | |
|   (m) vowel: | minus |
| Left codes: | Right codes: |
|  | +dn/905 |

The verbaliser module then moves to the next leaf node, node 9. This node represents a noun and accordingly the second rule, for nouns, in Table 6 is used by the verbaliser and since the number entry of node 3 is not set the verbaliser copies the string entry to the output buffer 160. At this point in the processing the contents of node 9 are as follows:

|  |  |
|---|---|
| Node: | 9 |
| Links: | — |
| Features: | |
|   (a) meaning: | camera (905,909) |
|   (b) category: | noun |
|   (c) string: | camera |
|   (d) requirement: | |
|   (e) case: | accusative |
|   (f) definiteness: | |
|   (g) gender: | |
|   (h) number: | |
|   (i) surface form: | |
|   (j) subject features: | |
|   (k) verb chain: | |
|   (l) verb form: | |
|   (m) vowel: | minus |
| Left codes: | Right codes: |
| −an/909 | +n/909 |
| −dn/905 | +subj/909 |
| +obj:prd/909 | |

The generator module then moves to the next leaf node, node 12 which represents a preposition and, since there is no specific rule in Table 6 the verbaliser determines the surface form by copying the string entry to the buffer 160, thereby completing processing of this node. The contents of this node are then as follows:

|                        |                   |
| ---------------------- | ----------------- |
| Node:                  | 12                |
| Links:                 | —                 |
| Features:              |                   |
| (a) meaning:           | on(908,909,910)   |
| (b) category:          | preposition       |
| (c) string:            | on                |
| (d) requirement:       |                   |
| (e) case:              |                   |
| (f) definiteness:      |                   |
| (g) gender:            |                   |
| (h) number:            |                   |
| (i) surface form:      |                   |
| (j) subject features:  |                   |
| (k) verb chain:        |                   |
| (l) verb form:         |                   |
| (m) vowel:             |                   |
| Left codes:            | Right codes:      |
| -n:v/909               | -obj/910          |

The verbaliser module then moves to the next leaf node to the right of node 12, namely node 14 which represents a determiner. The verbaliser uses rule 1 of Table 6 and since the definiteness entry of this node is set to "definite", the verbaliser copies the string entry to the output buffer 160. This completes the processing of this node at which point the contents are as follows:

|                        |                   |
| ---------------------- | ----------------- |
| Node:                  | 14                |
| Links:                 | —                 |
| Features:              |                   |
| (a) meaning:           | the (911,914)     |
| (b) category:          | determiner        |
| (c) string:            | the               |
| (d) requirement:       |                   |
| (e) case:              |                   |
| (f) definiteness:      | definite          |
| (g) gender:            |                   |
| (h) number:            |                   |
| (i) surface form:      |                   |
| (j) subject features:  |                   |
| (k) verb chain:        |                   |
| (l) verb form:         |                   |
| (m) vowel:             | minus             |
| Left codes:            | Right codes:      |
|                        | +dn/914           |

The verbaliser then moves to the next leaf node to the right of node 14, namely node 15, which represents an adjective and since there are no specific rules for determining the surface form entry for adjectives the verbaliser processes this node by copying the string entry into the output buffer 160. At this point the processing of node 15 is complete and its contents are as follows:

|                        |                   |
| ---------------------- | ----------------- |
| Node:                  | 15                |
| Links:                 | —                 |
| Features:              |                   |
| (a) meaning:           | third(915,910)    |
| (b) category:          | adjective         |
| (c) string:            | third             |
| (d) requirement:       |                   |
| (e) case:              |                   |
| (f) definiteness:      |                   |
| (g) gender:            |                   |
| (h) number:            |                   |
| (i) surface form:      |                   |
| (j) subject features:  |                   |
| (k) verb chain:        |                   |
| (l) verb form:         |                   |
| (m) vowel:             | minus             |
| Left codes:            | Right codes:      |

-continued

|                |              |
| -------------- | ------------ |
| +a/915         | +an/910      |
| +prd/910       |              |

The verbaliser then moves to the next leaf node to the right of node 15, namely node 16 which represents a noun. Accordingly the verbaliser module uses the second rule in Table 6 and since the number entry is not set the surface form is determined by copying the string entry to the output buffer 160. At this point the processing of node 16 is complete and the contents thereof are as follows:

|                        |                   |
| ---------------------- | ----------------- |
| Node:                  | 16                |
| Links:                 | —                 |
| Features:              |                   |
| (a) meaning:           | floor(914,910)    |
| (b) category:          | noun              |
| (c) string:            | floor             |
| (d) requirement:       |                   |
| (e) case:              | accusative        |
| (f) definiteness:      |                   |
| (g) gender:            |                   |
| (h) number:            |                   |
| (i) surface form:      |                   |
| (j) subject features:  |                   |
| (k) verb chain:        |                   |
| (l) verb form:         |                   |
| (m) vowel:             | minus             |
| Left codes:            | Right codes:      |
| -an/910                | +n/910            |
| -dn/914                | +subj/910         |
| +obj:prd/910           |                   |

The processing of the data structure 150 by the verbaliser module 148 is now complete since all leaf nodes have been processed and the contents of the output buffer are as follows:

"the guard activated the camera on the third floor"

The contents of the output buffer 160 can be printed on the display 108 or printer 110 or supplied to the output speech interface 120 for creating a speech signal for supply to the loud speaker 112, representing the output words.

Incrementality

It will be understood from the description of the processing of the analyser module 128 above, that preferably the processing is carried out incrementally so that the analyser module 128 does not have to wait for all of the words in an input before it can begin processing. Similarly, it is also preferable for the generator module 146 to process the meanings from Table 144 each time the dialogue manager 160 transfers meanings thereto and it may also be preferable for the verbaliser module 148 to process the data structure 150 each time it is updated by the generator module 146.

In order for the verbaliser module 148 to process the data structure 150 incrementally it is necessary, to avoid repeating any previous processing, for the verbaliser module to be able to determine the node or nodes which at any given point in the processing it has yet to process. To enable the verbaliser module to process the data structure in this way, each node may be provided with a further data entry, herein termed the verbalised entry which is set to "no" when a node is created by the generator module 146 and set to "yes" by the verbaliser module when it completes processing of that node. In subsequent processing of the data structure 150 the verbaliser, by inspection of the verbalised entry can determine whether or not it has previously processed that node. In addition to setting the verbalised entry to "yes" when each leaf node has been processed, the verbaliser also sets the same entry in the node which forms a link between two nodes or fragments when the leaf nodes or daughters have been verbalised, thereby enabling the verbaliser module to determine, by the inspection of the top node of a fragment, whether or not that fragment has been previously processed. Processing in this manner avoids the need for the verbaliser to search each leaf node of a fragment to establish whether or not all leaf nodes have been verbalised.

The use of the verbalised entry will now be described with reference to FIGS. 42(a) to 42(c) which are diagrammatic representations of the first few nodes entered in the data structure 150 as a result of the processing of the generator described above for Example 1. In the example shown in FIGS. 42(a) to 42(c), the generator module 146 signals to the verbaliser module 148 each time it updates the data structure 150 so that the verbaliser module 148 can process the contents of the data structure 150 on an incremental basis. Accordingly, when the generator module first signals to the verbaliser, the data structure contains a single node as shown diagrammatically in FIG. 42(a). This fragment has yet to be processed by the verbaliser and so is processed accordingly and the word "the" is placed in the output buffer 160 and the verbalised entry in node 1 is set to "yes".

FIG. 42(b) is a diagrammatic representation of the data structure 150 when the generator next signals to the verbaliser module. The "v" in the circle representing node 1 indicates that the "verbalised" entry for that node is set to "yes" since that node has already been processed by the verbaliser. Accordingly, the verbaliser does not reprocess node 1 but moves to node 2, the processing of which results in the word "guard" being placed in the output buffer and the verbalised entry being set to "yes". In addition, the verbaliser also sets the verbalised entry of node 3 to "yes" thereby allowing the verbaliser module, in future processing, to determine that all the leaf nodes below node 3 have been previously processed without having to inspect the verbalised entry of each of those nodes in turn.

FIG. 42(c) shows the state of the data structure 150 after the next update by the generator is signalled to the verbaliser. The data structure comprises a single fragment in which new node 4 has been linked via node 5 to previously processed node 3. The verbaliser, on inspection of node 3 determines that all leaf nodes below node 3 have been processed. The verbaliser then inspects the next right leaf node, new node 4, whose "verbalised" entry indicates that it has not yet been processed by the verbaliser module. Accordingly, the verbaliser module processes this node entering the word "activate" in the output buffer 160 and setting the verbalised entry of node 3 accordingly. In addition, the verbaliser also sets the verbalised entry of node 5 to "yes" thereby allowing the verbaliser module, in future processing, to determine that all of the leaf nodes below node 5 have been previously processed.

In the above example, the meanings are presented to the generator module 146 in the same order in which the words representing those meanings should be placed in the output language according to the grammar thereof. However, some inputs may not be in the same order as required for the outputs. It will be appreciated from the above description that this situation may result in nodes or fragments which have already been processed by the verbaliser being re-ordered in the data structure 150 as a result of the processing of the generator. Accordingly a further entry may be provided in each node, herein termed the repair entry. This entry is set to "yes" when the generator detects that fragments or nodes in the data structure 160 which have already been processed by the verbaliser module require further processing. When the verbaliser module processes a node, if the repair entry is set to "yes" then this overrides the verbalised entry and the verbaliser proceeds to reprocess the relevant fragment, thereby resulting in the output being repeated in its corrected order preceded by the characters " . . . er . . . " indicating in the output that a repair operation has been carried out. The repair entry is set by the generator in the following circumstances which will be illustrated with reference to FIGS. 43(a) to 43(g).

With reference to FIG. 43(a)(i), the first example occurs when the data structure 150 contains a single node for example representing the noun "camera" which has been processed by the verbaliser to produce the word "camera" in the output. The generator next processes node 2 which represents a determiner and which is linked to the left of node 1 via new node 3 as shown in FIG. 43(a)(ii). Since a new node which has not yet been processed by the verbaliser has been placed to the left of a node which has been processed by the verbaliser, the node which dominates these two nodes has its repair entry marked "yes" accordingly so that the verbaliser will reprocess node 1 after processing new node 2. The verbaliser module will place in the output buffer 160 " . . . er . . ." signifying that a repair has been made followed by the words "the" and "camera". The output from the verbaliser resulting from the processing of the above example will be as follows:

" . . . camera . . . er . . . the camera"

The second situation in which the repair entry is used is when the data structure 150 contains two nodes which are unlinked and which have both been processed by the verbaliser module. This is represented diagrammatically by FIG. 43(b)(i) in which node 1 represents the determiner "the" and node 2 represents the adverb "quickly". If the next node to be processed by the generator is a noun, for example "switch", this will be represented by node 3 and may be linked to node 1 via new node 4. At this point, a new node has been added to the data structure to the right of node 1 but to the left of node 2 as shown diagrammatically in FIG. 43(b)(ii). In this situation, the generator marks the repair entry of the node forming the link between nodes 1 and 3 accordingly so that when the verbaliser module processes the current data structure, it reprocesses node 1 which is now linked to node 3. The output of the verbaliser as a result of processing in the above example will, therefore, be as follows:

"the . . . quickly . . . er . . . the switch"

As will be seen in the above example when the verbaliser processes two unconnected fragments it inserts the output " . . . " between the output relating to each fragment so as to indicate that the fragments are unconnected at that point in the processing.

The third situation in which the generator sets a repair entry occurs when the data structure 150 contains two nodes which have already been processed by the verbaliser as shown in FIG. 43(c)(i) in which, for example, the first node represents the determiner "the" and the second node represents the preposition "in". Subsequent processing of node 3 which, for example, represents the noun "basement" and which becomes linked via new node 4 to the right of the preposition represented by node 2, and, in turn, to node 1 representing the determiner "the" being inserted between nodes 2 and 3 by new node 5, results in node 4 having its repair entry marked "yes" accordingly. In this example, and as shown diagrammatically in FIG. 43(c)(ii), the order of nodes 2 and 1 has been reversed by the linkage of the new node 3 to node 2 via node 4 and the subsequent linking of node 1 to node 3 via new node 5. Marking the fragment for repair in node 4 results in nodes 2 and 1 being reprocessed by the verbaliser module before it processes new node 3. The output from the verbaliser module as a result of processing the above example will be as follows:

"the . . . in . . . er . . . in the basement"

The next example of the use of the repair entry occurs when the data structure 150 as shown diagrammatically in FIG. 43(*d*)(i), comprises a fragment of three nodes, and a single unconnected node. Each node has been processed by the verbaliser and, for example, node 1 represents the verb "switch", node 2 represents the adverb "quickly" and node 4 represents the determiner "the". Subsequent processing by the generator of new node 5 which, for example, represents the noun "light" may result in a single fragment being formed which is shown diagrammatically in FIG. 43(*d*)(ii). FIG. 43(*d*)(ii) shows that the node 5 is combined by node 6 with node 4 representing the determiner and node 6 has, in turn, combined with node 1 via new node 7 thereby inserting node 5, which has yet to be processed by the verbaliser, to the left of node 2 which has already been processed. Accordingly, node 3 has its repair entry marked "yes" so that when this fragment is processed by the verbaliser, the previously processed nodes 1 and 4 are reprocessed before node 5 which will then be processed before the verbaliser reprocesses node 2. The output from the verbaliser in this example will then appear as follows:

"switch quickly . . . er . . . switch the light quickly"

In the fifth example of the use of the repair entry, the data structure is as shown in FIG. 43(*e*)(i) and comprises two unconnected nodes, the first node representing the determiner "the" and the second node representing the adjective "first", both nodes having been processed by the verbaliser module 148. Subsequent processing via the generator of a node 3 which, for example, represents the noun "floor" results in the creation of a single fragment in the data structure as shown in FIG. 43(*e*)(ii) in which new node 3 is combined via node 4 with node 2 and node 4 has in turn combined via node 5 with node 1. It will be seen from inspection of FIG. 43(*e*)(ii) that two previously unconnected verbalised nodes have been connected to the left of the new node and, therefore, the node at the end of the fragment, node 5 has the appropriate entry stored in its "repair" entry. Accordingly, when the fragments shown in FIG. 43(*e*)(ii) is passed to verbaliser module, previously processed nodes 1 and 2 will be reprocessed before new node 3. The output resulting from the processing of the above example will be as follows:

"the . . . first . . . er . . . the first floor"

The sixth example of the use of the repair entry is when the data structure contains a single node which has been processed by the verbaliser and during that processing, the verbaliser has assumed the value of a particular feature of that node. Assumed entries may be indicated by the entry "assumed" being placed in the entry in question along with the actual entry, thereby indicating that the actual entry therein may be overridden in future processing by the verbaliser. FIG. 43(*f*)(i) shows this state of the data structure 150 at this point, node 1 representing a verb, for example "activate" in which the verb form entry has been assumed during the processing of this node by the verbaliser, to be "finite(present)". In subsequent processing, the generator module may process an input which results in the creation of a new node, node 2, which represents an operation and is linked via node 3 to node 1 as shown in FIG. 43(*f*)(ii). The combination of nodes 2 and 1 may result in the assumed feature in node 1 being overridden by a set command and, if this is the case, node 3 is marked for repair so that node 1 can be reprocessed by the verbaliser module taking into account the newly defined feature. If node 2 is a tense operator which determines that the verb form entry of the node which it qualifies should be "finite(past)" then the output as a result of the processing of the verbaliser of the above example will be as follows:

"activates . . . er . . . activated"

The seventh example of the use of the repair entry arises when lexical ambiguity occurs. Inspection of the output language lexicon shown above in Table 3 shows that the input meaning "sudden" can either be processed as an adjective or an adverb. In this case, the generator module is arranged to duplicate the data structure 150 so as to represent each possibility and, accordingly, preserve the ambiguity until it is resolved. The ambiguity may be resolved when, as a result of the processing of a future node, one of the possibilities is successful in linking into a fragment when the other is not. In this case the generator may discard the other possibility or maintain some or all of them.

If more than one possibility is sent to the verbaliser, the fragment or fragments to be verbalised may be chosen either randomly or using some rule, for example, the possibility which comprises the smallest number of fragments. Once a possibility has been chosen the verbaliser may either discard all the possibilities except the chosen possibility, maintain all the possibilities but verbalising only the chosen possibilities and choosing a most successful possibility each time the data structure is verbalised or the erbaliser may discard all possibilities except those which comprise the same number of nodes as the chosen possibility. In the case where the data structure includes a number of fragments which have the same number of nodes, the verbaliser may be arranged to choose the successful possibility at random. In some applications of the present invention it may be preferable to process each possibility which results from an ambiguity in turn, providing the user with a number of alternative outputs.

When one of a number of possibilities is chosen for processing by the verbaliser then the remaining possibilities have their repair flags set so that if, as a result of future processing, one of those possibilities is preferred then the appropriate reprocessing of the newly chosen possibility is carried out.

FIG. 43(*g*) shows, diagrammatically, the state of the data structure as a result of the lexical ambiguity which arises from the input meaning sudden which can be treated either as an adverb or an adjective. The first possibility, that it is an adverb, is represented on the left hand side of FIG. 43(*g*)(i) while the second possibility, that it is an adjective, is represented on the right hand side of that figure. The verbaliser chooses, randomly, to verbalise the first possibility as shown in FIG. 43(*g*)(i). However, in subsequent processing, the generator module may process a noun, which is not successful in forming a link with node 2 which represents an adjective but is successful in forming a link with the node 2 which represents an adverb. Accordingly, the second possibility becomes the successful one and a fragment as shown in 43*g*(ii) is created having the repair entry in its top node, node 5, marked "yes" so that the verbaliser will carry out the repair process for this new fragment. Accordingly, the output as a result of the processing of the verbaliser of the above example will be as follows:

"the . . . suddenly . . . er . . . the sudden impact"

Output Style of the Verbaliser Module

Preferably, the verbaliser module is arranged to output the results of its processing in accordance with a number of alternative styles, which may be selected by the user. In the preferred embodiment styles are as follows:

1) Verbose Style—When the verbaliser module operates according to this style it will verbalise the contents of the data structure 150 each time it is updated by the generator module;
2) Succinct Style—When operating according to this style, the verbaliser module is arranged to wait until the generator module has finished processing its complete input before proceeding to process the contents of the data structure 150;
3) Coherent Style—When operating according to this style, the verbaliser will only process the contents of the data structure 150 if it comprises a single fragment.
4) Complete Style—When operating according to this style, the verbaliser carries out checks in the current data structure firstly to check that it only comprises a single fragment and secondly that there are no nodes missing from the fragment which are linguistically required. The linguistically required elements are, for example, a determiner which qualifies a singular noun or the subject or the object of a verb or preposition. The verbaliser will only process the contents of the data structure if it comprises only a single fragment which includes all linguistically required elements.

In the present embodiment a determiner which qualifies a noun, the object of a verb or preposition and the subject of a verb are all treated as elements of the data structure which are linguistically required. If a node contains a search code which includes the search code letters "-dn", "-subj" or "-obj" (herein termed "obligatory codes") then that node is required to be linked to a node representing one of the above-mentioned linguistically required elements. The verbaliser establishes whether or not the linguistically required element has been linked to a node by taking the next search code in the list of search codes in which an obligatory code is found and checking whether that next search code is included in the corresponding search code list of the parent node (i.e. the node creating the link between the current node and the rest of the fragment). If the next code is present in the parent node then this indicates that the obligatory element has been matched and so that a node representing the linguistically required element has been included in the current fragment. If the next code is not present in the corresponding list of codes for the parent then this indicates that the linguistically required element has not been included in the current fragment and therefore the current fragment will not be verbalised. The verbaliser searches for missing elements by taking the right codes of the left daughter of the top node of a fragment and checking these codes in the manner described above against the right codes of the top node and also compares the left codes of the right daughter with the left codes of the top node. The verbaliser carries out these searches in a leftmost depthfirst manner until either a missing element is found at which point the search is terminated and the verbaliser processing of the fragment aborted or until all sub-trees have been checked at which point the fragment may be processed further by the verbaliser.

In some cases, fragments may be created which have only been partially verbalised. For example, a non-verbalised fragment with a missing obligatory element may become linked to a fully verbalised fragment. Since an obligatory element is missing, the verbaliser would not verbalise the newly-formed fragment and accordingly the top node thereof would have its verbalised entry set to "no". If, in subsequent processing, this fragment is linked to the right of another un-verbalised fragment then, inspection of the top node of the right fragment reveals no information which will allow the generator to detect that some of the leaf nodes have been verbalised and therefore that a repair operation needs to be carried out on the newly created fragment. Accordingly, a further entry may be made in the features of each node herein termed the "some verbalised" entry which, is set to "no" when a node is created and changed to "yes" when the generator combines fragments comprising nodes which have not been verbalised. Therefore, in the above described situation, when the fragment having the missing obligatory element is combined to the right of another fragment which has not been verbalised, the generator is able to detect, by inspection of the "some verbalised" entry, that the top node of the newly created fragment should have its repair entry set to "yes". This avoids the need for the generator to search each fragment for any nodes which may have been previously processed by the verbaliser.

5) Required Element Substitution Style—When operating according to this style, the verbaliser carries out the processing as for the complete style above and when a linguistically required element is found to be missing, the verbaliser adds a substitute for that element to the data structure and proceeds to find whether any further linguistically required elements are missing and dealing with any found in the same manner. In addition to checking search codes of a daughter with its parent, the verbaliser, when operating in this mode, also inspects the search codes of the top node to identify whether or not any obligatory codes are contained therein. If an obligatory code is located in the left codes or right codes of the top node then the verbaliser creates a new node representing a substitute for the linguistically required element, to be linked to the top node.

In the present embodiment the verbaliser uses the following table to create a substitute for a linguistically required element which is identified as missing from the current data structure. The contents of this table are as follows:

| OBLIGATORY CODE | CATEGORY | STRING |
|---|---|---|
| dn | determiner | a |
| obj | pronoun | something |
| subj | pronoun | something |

In order to create a substitute element the verbaliser uses the above table to determine the category and string which should be contained in the substitute element and instructs the generator to reprocess the current fragment and add to it a new node having the category and string defined in the above table and, as with any normal node, having search codes as defined in Table 4. When each missing linguistically required element located in the data structure has been processed in this manner, the data structure can then be fully processed by the verbaliser module.

When operating according to this style, the processing of a generator is also modified to take into account the substitute elements in the data structure. Each node which represents a substitute element has an additional feature herein termed the "substitute entry", which is set to "yes" when the node is created. Processing of the generator is then modified so that when searches for matching codes are being carried out as a result of a new fragment being created or inputted then the generator also checks the substitute entry. If the substitute entry is set to "yes" then the generator establishes whether or not the new node can be exchanged for the substituted node and if so, the substituted node is discarded and the fragment reformed with the new node using the normal processing of the generator as described above and the repair entry of the top node of the fragment set to "yes".

Although in the embodiment described above, separate tables 132 and 138 have been provided respectively for the input lexicon, indicating for each input word its category and meaning, and Table 2 indicating instructions for dealing with each category, it is possible within the scope of the invention to combine the data in these two tables into a single table. In this case, the middle column of Table 1 would be replaced by the instructions in Table 2. Similarly, in the embodiment described above separate tables 152 and 154 have been provided respectively for the output language lexicon, indicating for each input meaning its corresponding word in the output language, and Table 4 indicating instructions for dealing with each category of output word, again, it is possible within the scope of the invention to combine the data in these two tables into a single table. In this case, the second column of Table 3 will be replaced by the relevant instructions from the second and third columns of Table 4.

Although the above embodiment of the invention illustrated has utilised the English language for the input language and the output language it will be clear to those skilled in the art that any language, including languages which are not natural languages, could be processed. For example, the order of the lists of search codes in table 154 for each node may be changed to take into account different relative word orders in other languages. The features of a node may be modified to take into account features of other languages and the instructions in the third column of Table 5 for matching features may be modified accordingly. It will also be clear to those skilled in the art that although a tree structure is used any data structure which is capable of maintaining the relative order of the information carried by each node may be suitable e.g. an embedded list.

The embodiment of the invention described above may, for example, be arranged to provide an interface between systems which operate according to different grammars. It will be further understood that either the input signal processor or the output signal processor may be arranged to process one or more other languages simultaneously by providing the appropriate grammar and lexicon information and modified data structures where necessary. Embodiments of the invention may be constructed to operate with other languages such as Japanese or Dutch, to translate between these languages and one or more other languages.

Figure 44:
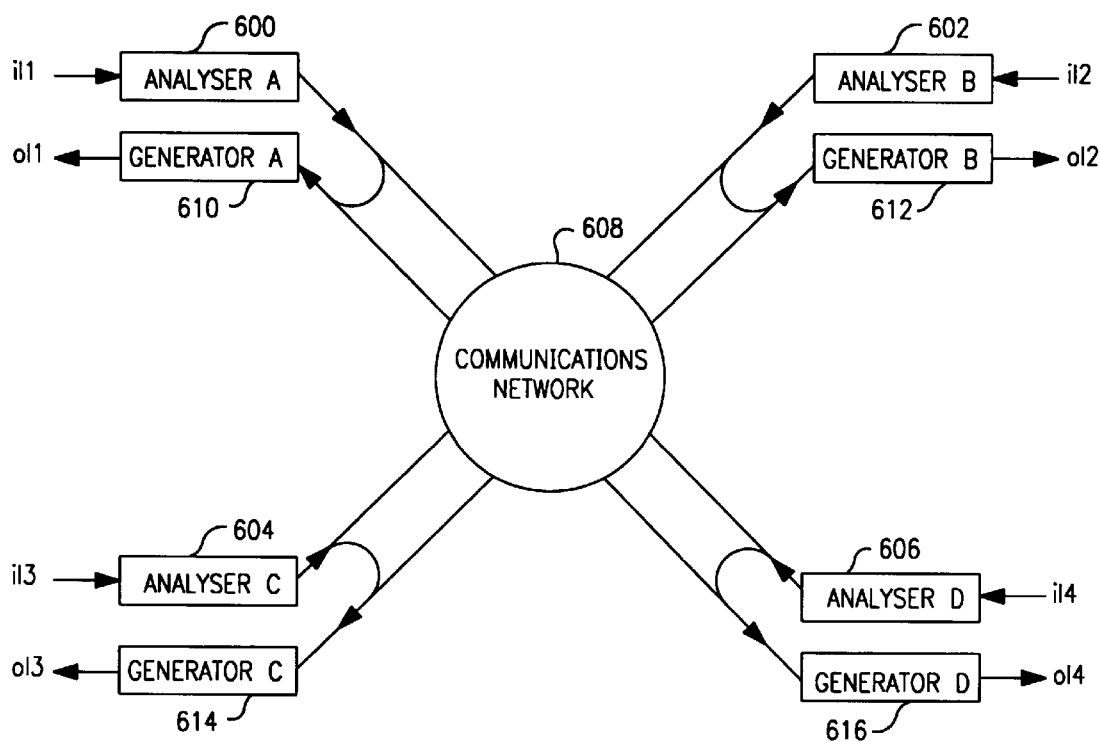
FIG. 44 is a diagram illustrating an application of an embodiment of the invention in block form.

An application of the present invention is shown diagrammatically in FIG. 44 in which a communication system may be used to provide simultaneous translation from a first language into a plurality of other languages. The system comprises four language analysers 600,602,604 and 606 each operable to analyse an input language (il1, il2, il3 and il4 respectively) and produce an output in the form of the meaning representation described above with reference to the first embodiment. Each analyser 610,612,614 and 616 is capable of broadcasting the meaning representation via a communications network 608 to one or more of the generators. Each generator 610,612,614 and 616 is arranged to generate output which represents the meaning received via the communications network 608 into an output language (ol1, ol2, ol3 and ol4 respectively).

If, in the above system, the input language il1 of analyser A 600 is English, the output language ol2 of generator B 612 is German, the output language ol3 of generator C 614 is Japanese and the output language ol4 of generator D 616 is Dutch, then, by broadcasting the meaning representation derived by analyser A 600 of any input in input ol1, simultaneous translation thereof into German, Japanese and Dutch can be provided by generator B 612, generator C 614 and generator D 616 respectively.

The communications network may be enclosed within a single computer system or may provide communications between a plurality of computer systems with an analyser and generator pair in each such system. Each computer system may form an element of greater systems such as a facsimile machine or electronic mail system and, in cases where only transmission or reception of broadcast information is required, the analyser or generator respectively may be omitted from such a system.

Although the invention is conveniently implemented by software, for example, utilising the language Prolog, other languages may be utilised for implementing the invention and, further, the invention may be implemented partly or completely by hardware and/or so-called firmware. For example, the contents of Tables 1, 2, 3, 4 and 5 could, instead of being implemented by software, be stored in ROM or could be implemented by hardwire digital circuitry although in the latter case the system would be much more complex.

I claim:

1. Data processing apparatus for generating, from a plurality of data units corresponding to a string of elements of a first language, a string of elements of a second language representative of the meaning of the string of elements of the first language, each data unit being indicative of the meaning of a corresponding element of the first language and including one or more identifiers related to one or more identifiers of one or more other said data units, said apparatus comprising:

(a) instruction means for storing processing instructions dependent on grammatical rules of the second language; and (b) processing means for providing said elements of said second language in dependence upon the meaning indicated by said data units and for ordering said elements in said string of elements in said second language in dependence upon said meaning indicated by said data units, upon said related identifiers and upon said instructions stored in said instruction means.

2. Apparatus according to claim 1, wherein said data units comprise predicates and arguments, said arguments being used for said identifiers.

3. Apparatus according to claim 2, wherein a said identifer of one said data unit is related to a said identifier of another said data unit by assigning a common value to said related identifiers.

4. Apparatus according to claim 1, in combination with input means for receiving a natural language input and parser means for deriving said data units from said natural language input.

5. Apparatus according to claim 4, arranged for translating from a first natural language to a second natural language.

6. Apparatus according to claim 1, in combination with means for deriving said data units from a data source without the intervening step of generating said string of elements of said first language.

7. Apparatus according to claim 1 wherein said processing means is operable to create for at least some of said data units respective nodes containing selected search codes dependent upon the lexical category of the element of the second language corresponding to the data unit, to perform a search of said nodes utilising said search codes and said related identifiers and to order said elements of said second language in dependence upon the results of said search.

8. Apparatus according to claim 7, wherein one argument is selected for each of said data units in dependence upon the search code for which the search has succeeded.

9. Apparatus according to claim 7, wherein said instructions prescribe the order of said elements corresponding to one said data unit and another said data unit related to said search code in dependence upon the search code.

10. Apparatus according to claim 7, wherein the search is performed in reverse order starting from the last node.

11. Apparatus according to claim 7, wherein the search is terminated upon finding the first occurrence for each search code.

12. Apparatus according to claim 7, wherein said processing means is operable to store search codes for a future search with respective arguments in a search space.

13. Apparatus according to claim 7, wherein said processing means is operable to remove search codes from said search space in dependence upon the lexical category of the element of the second language.

14. A data processing method for generating, from a plurality of data units corresponding to a string of elements of a first language, a string of elements of a second language representative of the meaning of the string of elements of the first language, each data unit being indicative of the meaning of a corresponding element of the first language and including one or more identifiers related to one or more identifiers of one or more other said data units, said method comprising the steps of:

(a) storing processing instructions dependent on grammatical rules of the second language; and (b) providing said elements of said second language in dependence upon the meaning indicated by said data units and ordering said elements in said string of elements in said second language in dependence upon said meaning indicated by said data units, upon said related identifiers, and upon said instructions stored in said storing step.

15. A method according to claim 14, wherein said data units comprise predicates and arguments, said arguments being used for said identifiers.

16. A method according to claim 15, wherein a said identifer of one said data unit is related to a said identifier of another said data unit by assigning a common value to said related identifiers.

17. A method according to claim 14, further comprising the steps of receiving a natural language input and parsing to derive said data units from said natural language input.

18. A method according to claim 17, for translating from a first natural language to a second natural language.

19. A method according to claim 14, further comprising the step of deriving said data units from a data source without the intervening step of generating said string of elements of said first language.

20. A method according to claim 14 wherein said processing step includes the step of creating for at least some of said data units respective nodes containing selected search codes dependent upon the lexical category of the element of the second language corresponding to the data unit, performing a search of said nodes utilising said search codes and said related identifiers and to order said elements of said second language in dependence upon the results of said search.

21. A method according to claim 20, wherein one argument is selected for each of said data units in dependence upon the search code for which the search has succeeded.

22. A method according to claim 20, wherein said instructions prescribe the order of said elements corresponding to one said data unit and another said data unit related to said search code in dependence upon the search code.

23. A method according to claim 20, wherein the search is performed in reverse order starting from the last node.

24. A method according to claim 20, wherein the search is terminated upon finding the first occurrence for each search code.

25. A method according to claim 20, wherein said search codes for a future search are stored with respective arguments in a search space.

26. A method according to claim 14, wherein said search codes are removed from said search space in dependence upon the lexical category of the element of the second language.

27. A storage medium or device having stored therein a computer program comprising instructions for the performance of the data processing method of claim 14.

* * * * *

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

Page 1 of 10

It is certified that error appears in the above-identified patent and that said Letters Patent is hereby corrected as shown below:

SHEET 2 Of The Drawings

In Figure 2, in box 158, "MORPHOLIGICAL" should read --MORPHOLOGICAL--.

SHEET 15 Of The Drawings

In Figure 20, "AUXILARY" should read --AUXILIARY--.

SHEET 19 Of The Drawings

In Figure 26, "COMPLENTIZER" should read --COMPLEMENTIZER--.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

COLUMN 7

Line 10, "spoken. Where" should read --spoken. ¶Where--.

COLUMN 12

Line 64, "a intransitive" should read --an intransitive--.

COLUMN 13

Line 19, "and a" should read --and--.

COLUMN 15

Line 54, "particle" should read --particle,--.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

COLUMN 16

Line 10, "above" should read --above,--.
Line 12, "formed" should read --are formed--.

COLUMN 17

Line 29, ""at"." should read --"a".--.

COLUMN 18

Line 10, "Arrow" should read --Arrows--.

COLUMN 19

Line 13, "Ambiguities The" should read --Ambiguities ¶ The--.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

COLUMN 21

Line 64, "are the for the" should read --are for the--.

COLUMN 22

Line 12, "that" should be deleted.

COLUMN 23

Line 58, "140. At" should read --140. ¶At--.

COLUMN 27

Line 14, "identifies" should read --identifiers--.
Line 65, "903)" this" should read --903)", this--.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

COLUMN 28

Line 37, "list" should read --list,--.

COLUMN 29

Line 34, "third (916,917)" should read --third (916,913)--.

COLUMN 35

Table 3, "loo'k" should read --look--.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

COLUMN 37

Line 30, "processed, by" should read --processed by--.
Line 46, "of the" should read --of the node.--.
Line 47, "node" should be deleted.

COLUMN 38

Line 28, "else" should read --or else--.
Line 33, "entry" should read --entry,--.
Line 40, "entry" should read --entry,--; and "features" should read --features,--.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

Column 38 (continued)

Line 45, "entry" should read --entry,--.
Line 56, "it is" should read --is--.

COLUMN 41

Line 66, "category" should read --categories--.

COLUMN 43

Line 20, "follows," should read --follows:--.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

COLUMN 47

Line 20, "instruction" should read --instructions--.

COLUMN 53

Line 31, ""+v:aux/1" should read --"+v:aux/1"--.

COLUMN 54

Line 34, "qualify" should read --qualifies--.

COLUMN 55

Line 12, "accusa-" should read --"accusa- --.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

<u>Column 55 (continued)</u>

Line 32, "to." should read --"to".--.

<u>COLUMN 56</u>

Line 67, "and and" should read --and 5 and--.

<u>COLUMN 80</u>

Line 26, "erbaliser" should read --verbalizer--.

UNITED STATES PATENT AND TRADEMARK OFFICE
CERTIFICATE OF CORRECTION

PATENT NO. : 5,943,643

DATED : August 24, 1999

INVENTOR(S): EVELYN VAN DE VEEN

It is certified that error appears in the above-identified patent and that said Letters Patent is hereby corrected as shown below:

COLUMN 81

Line 12, "fragment" should read --fragment;--.

Signed and Sealed this

Fifth Day of September, 2000

Attest:

Q. TODD DICKINSON

Attesting Officer                Director of Patents and Trademarks